(12) United States Patent
Yoshikawa et al.

(10) Patent No.: US 12,155,855 B2
(45) Date of Patent: Nov. 26, 2024

(54) PREDICTION IMAGE GENERATION METHOD, IMAGE CODING METHOD, IMAGE DECODING METHOD, AND PREDICTION IMAGE GENERATION APPARATUS

(71) Applicant: PANASONIC INTELLECTUAL PROPERTY MANAGEMENT CO., LTD., Osaka (JP)

(72) Inventors: Satoshi Yoshikawa, Hyogo (JP); Hisao Sasai, Osaka (JP); Kengo Terada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/558,755

(22) Filed: Dec. 22, 2021

(65) Prior Publication Data
US 2022/0116641 A1 Apr. 14, 2022

Related U.S. Application Data

(63) Continuation of application No. 16/700,377, filed on Dec. 2, 2019, now Pat. No. 11,240,522, which is a
(Continued)

(30) Foreign Application Priority Data

Nov. 13, 2014 (JP) ................................ 2014-231098

(51) Int. Cl.
*H04N 11/02* (2006.01)
*H04N 19/50* (2014.01)
(Continued)

(52) U.S. Cl.
CPC ........... *H04N 19/50* (2014.11); *H04N 19/176* (2014.11); *H04N 19/182* (2014.11); *H04N 19/46* (2014.11)

(58) Field of Classification Search
CPC ...................................................... H04N 19/50
(Continued)

(56) References Cited

U.S. PATENT DOCUMENTS 5,103,305 A 4/1992 Watanabe
5,751,362 A 5/1998 Lee
(Continued)

FOREIGN PATENT DOCUMENTS

JP 2012-129791 A 7/2012
WO 1997/027707 A1 7/1997
WO 2013/145589 A1 10/2013

OTHER PUBLICATIONS

Benjamin Bross et al, "High Efficiency Video Coding (HEVC) text specification draft 10 (for FDIS & Last Call)" Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013 JCTVC-L1003_v34.
(Continued)

*Primary Examiner* — Leron Beck
(74) *Attorney, Agent, or Firm* — GREENBLUM & BERNSTEIN, P.L.C.

(57) ABSTRACT

A decoder includes a memory and a processor coupled to the memory. The processor is configured to obtain first information from a bitstream, the first information indicating a number of first points in a current picture. The processor is also configured to determine second information provided for each of the first points based on the first information, the second information indicating a difference between a coordinate value of a first point and a coordinate value of a
(Continued)

corresponding second point, the corresponding second point being included in a reference picture. The processor is further configured to generate a prediction image of a current block by performing an affine prediction according to the determined second information.

4 Claims, 53 Drawing Sheets

Related U.S. Application Data continuation of application No. 15/785,756, filed on Oct. 17, 2017, now abandoned, which is a continuation of application No. 14/630,120, filed on Feb. 24, 2015, now abandoned.

(60) Provisional application No. 61/954,759, filed on Mar. 18, 2014.

(51) Int. Cl.
   *H04N 19/176* (2014.01)
   *H04N 19/182* (2014.01)
   *H04N 19/46* (2014.01)

(58) Field of Classification Search
   USPC ........................................ 375/240.01–240.29
   See application file for complete search history.

(56) References Cited

U.S. PATENT DOCUMENTS

| | | |
|---|---|---|
| 6,415,056 B1 | 7/2002 | Boon |
| 9,438,910 B1 | 9/2016 | Han et al. |
| 2004/0146109 A1 | 7/2004 | Kondo et al. |
| 2007/0071289 A1 | 3/2007 | Takeguchi et al. |
| 2007/0274687 A1 | 11/2007 | Varekamp et al. |
| 2008/0175491 A1 | 7/2008 | Kondo |
| 2008/0187175 A1* | 8/2008 | Kim ............... G06V 10/754 382/209 |
| 2008/0240248 A1 | 10/2008 | Lee et al. |
| 2011/0170604 A1 | 7/2011 | Sato et al. |
| 2011/0243233 A1 | 10/2011 | Alshina et al. |
| 2011/0292045 A1* | 12/2011 | Nakamura ........ G06T 15/00 345/419 |
| 2012/0069902 A1 | 3/2012 | Yamori |
| 2013/0089260 A1 | 4/2013 | Pires et al. |
| 2013/0108176 A1 | 5/2013 | Shiiyama |
| 2013/0322543 A1 | 12/2013 | Sugio et al. |
| 2014/0049607 A1* | 2/2014 | Amon ................ H04N 19/61 348/43 |
| 2014/0050411 A1 | 2/2014 | Lee |
| 2014/0079131 A1 | 3/2014 | Sugio et al. |
| 2014/0211993 A1 | 7/2014 | Ishii |

OTHER PUBLICATIONS

Chao Pang, Joel Sole, Liwei Guo, Marta Karczewicz, and Rajan Joshi, "Non-RCE3: Intra Motion Compensation with 2-D MVs" [online], Joint Collaborative Team on Video Coding (JCT-VC) of ITU-T, SG 16, WP 3 and ISO/IEC JTC 1/SC, 29/WG 11, 14th Meeting: Vienna, AT, Jul. 25-Aug. 2, 2013, [JCTVC-N0256], Retrieved from the Internet: URL: http://phenix.int-evry.fr/jct/, Aug. 2, 2013, pp. 1-12.

* cited by examiner

TARGET IMAGE

*FIG. 43*

| |
|---|
| VIDEO STREAM (PID = 0x1011 MAIN VIDEO IMAGE) |
| AUDIO STREAM (PID = 0x1100) |
| AUDIO STREAM (PID = 0x1101) |
| PRESENTATION GRAPHIC STREAM (PID = 0x1200) |
| PRESENTATION GRAPHIC STREAM (PID = 0x1201) |
| INTERACTIVE GRAPHIC STREAM (PID = 0x1400) |
| VIDEO STREAM (PID = 0x1B00 SUB VIDEO IMAGE) |
| VIDEO STREAM (PID = 0x1B01 SUB VIDEO IMAGE) |

FIG. 46
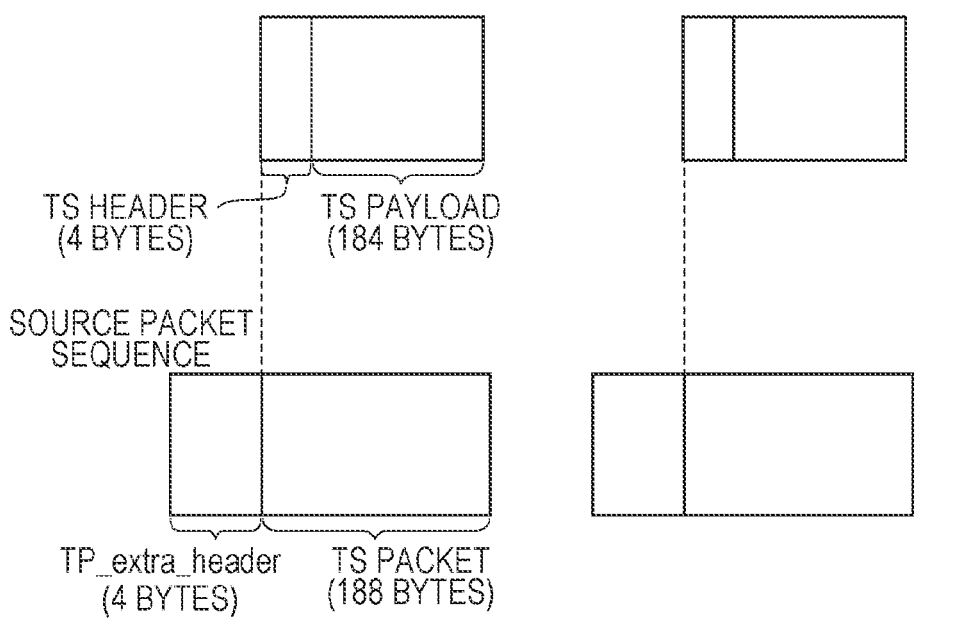
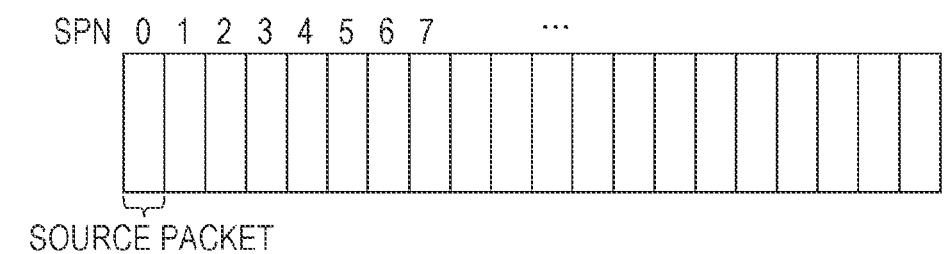

FIG. 49

| PID | STREAM ATTRIBUTE INFORMATION | |
|---|---|---|
| 0x1011 | VIDEO STREAM ATTRIBUTE INFORMATION | CODEC |
| 0x1100 | AUDIO STREAM ATTRIBUTE INFORMATION | RESOLUTION |
| 0x1101 | AUDIO STREAM ATTRIBUTE INFORMATION | ASPECT RATIO |
| 0x1200 | PRESENTATION GRAPHIC STREAM ATTRIBUTE INFORMATION | FRAME RATE |
| 0x1201 | PRESENTATION GRAPHIC STREAM ATTRIBUTE INFORMATION | |
| 0x1B00 | VIDEO STREAM ATTRIBUTE INFORMATION | |

CODEC
THE NUMBER OF CHANNELS
LANGUAGE
SAMPLING FREQUENCY

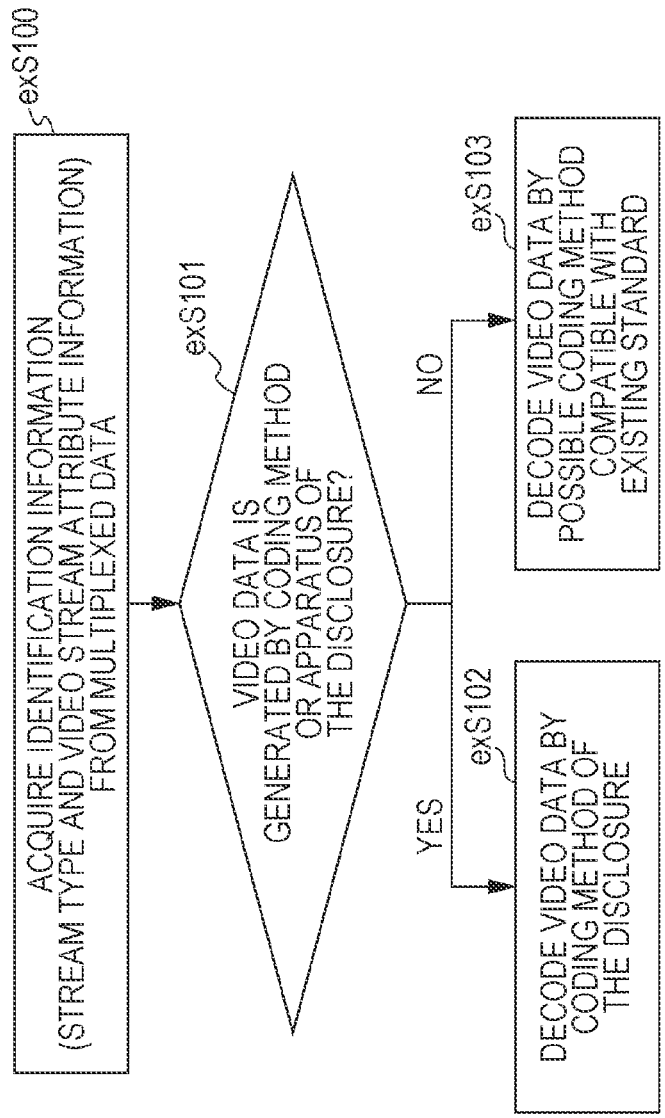

FIG. 54
| COMPATIBLE STANDARD | DRIVING FREQUENCY |
|---|---|
| MPEG4.AVC | 500MHz |
| MPEG2 | 350MHz |
| ... | ... |
FIG. 55A
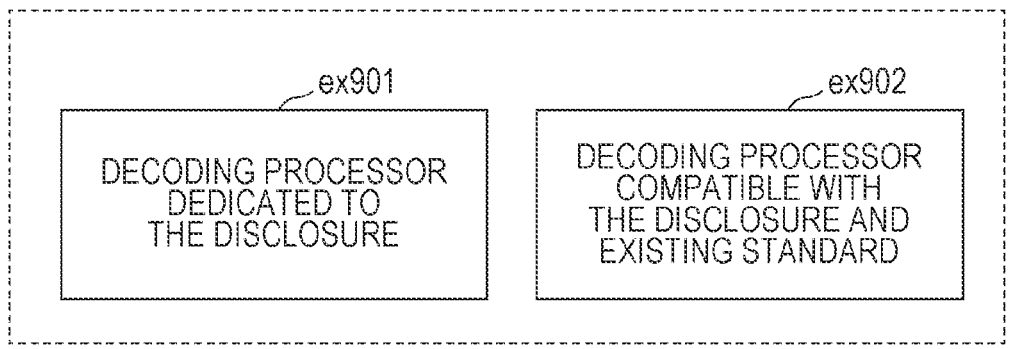
FIG. 55B
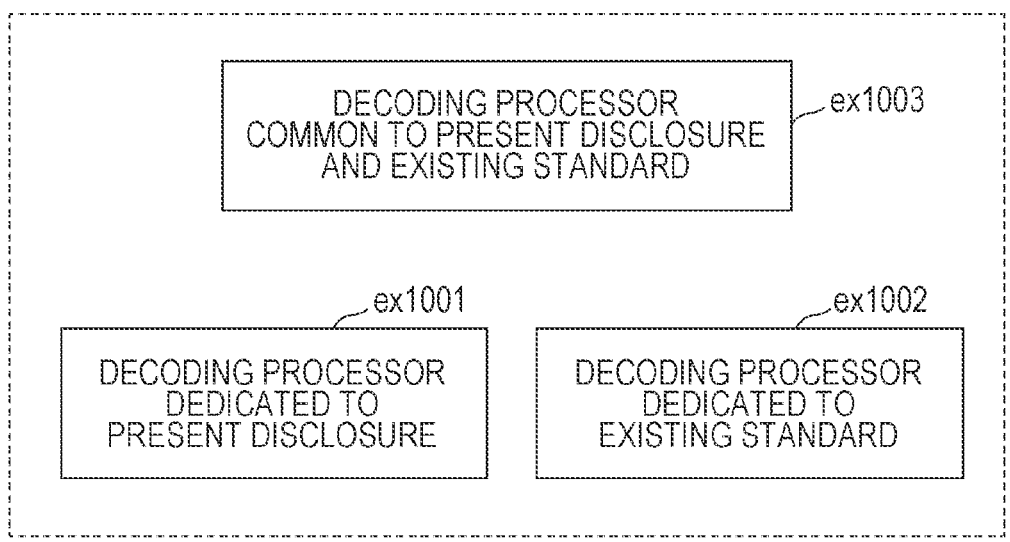

PREDICTION IMAGE GENERATION METHOD, IMAGE CODING METHOD, IMAGE DECODING METHOD, AND PREDICTION IMAGE GENERATION APPARATUS

This is a continuation of U.S. patent application Ser. No. 16/700,377, filed Dec. 2, 2019, which is a continuation of U.S. patent application Ser. No. 15/785,756, filed Oct. 17, 2017, which is a continuation of U.S. patent application Ser. No. 14/630,120, filed Feb. 24, 2015, which claims the benefit of U.S. Provisional Patent Application No. 61/954,759, filed Mar. 18, 2014, and priority to Japanese Patent Application No. 2014-231098, filed Nov. 13, 2014. The disclosure of each of the above-identified documents, including the specification, drawings, and claims, is incorporated herein by reference in its entirety.

BACKGROUND OF THE INVENTION

1. Field of the Invention

The present disclosure relates to a prediction image generation method, an image coding method, an image decoding method, and a prediction image generation apparatus.

2. Description of the Related Art

In order to improve coding efficiency, various studies have been made regarding an HEVC (High Efficiency Video Coding) standard which is the latest video coding standard (see, for example, NPL 1). This scheme is one of ITU-T (International Telecommunication Union Telecommunication Standardization Sector) standards called H.26x and one of ISO/IEC (International Organization for Standardization/International Electrotechnical Communication) standards called MPEG-x (Moving Picture Experts Group-x), and has been studied as a successor to the video coding standard called H.264/AVC (Advanced Video Coding) or MPEG-4 AVC.

In a prediction image generation process that is used during the coding in both AVC and HEVC, only pixel information on an adjacent block is used in intra prediction, and only parallel translation is used in inter prediction.

CITATION LIST

Non-Patent Literature

NPL 1: Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eujet/doc_end-user/documents/12_Geneva/wg11/JCTVC-L 1003-v34.zip

SUMMARY OF THE INVENTION

There is a demand for improving the coding efficiency in the prediction image generation method, the image coding method, and the image decoding method.

An object of the present disclosure is to provide a motion prediction method, an image coding method, or an image decoding method capable of improving the coding efficiency.

One aspect of the present disclosure provides a prediction image generation method for generating a prediction image of a target block, the prediction image generation method including: an extraction step of extracting a plurality of first feature points each of which has a local feature quantity, the plurality of first feature points being included in a reconstructed image; a search step of searching a corresponding point from the plurality of first feature points, the corresponding point having a local feature quantity similar to a local feature quantity of a second feature point corresponding to the target block, a relationship between the corresponding point and the second feature point being expressed by information including a non-parallel translation component; and a generation step of generating the prediction image from the reconstructed image based on the relationship.

Note that these general or specific aspects may be implemented using a system, a method, an integrated circuit, a computer program, or a computer-readable recording medium such as a CD-ROM (Compact Disc-Read Only Memory), or using any given combination of a system, a method, an integrated circuit, a computer program, and a computer-readable recording medium.

The present disclosure can provide a prediction image generation method, an image coding method or an image decoding method capable of improving the coding efficiency.

BRIEF DESCRIPTION OF THE DRAWINGS

FIG. 43 is a view illustrating a structure of multiplexed data;

FIG. 46 is a view illustrating structures of a TS (Transport Stream) packet and a source packet in the multiplexed data;

FIG. 49 is a view illustrating an internal configuration of stream attribute information;

FIG. 50 is a view illustrating steps of identifying video data;

FIG. 54 is a view illustrating an example of a lookup table in which a video data standard and a driving frequency are associated with each other;

FIG. 55A is a view illustrating an example of a configuration in which a signal processor module is shared; and FIG. 55B is a view illustrating another example of a configuration in which the signal processor module is shared.

DETAILED DESCRIPTION OF THE PREFERRED EMBODIMENTS

Figure 1:
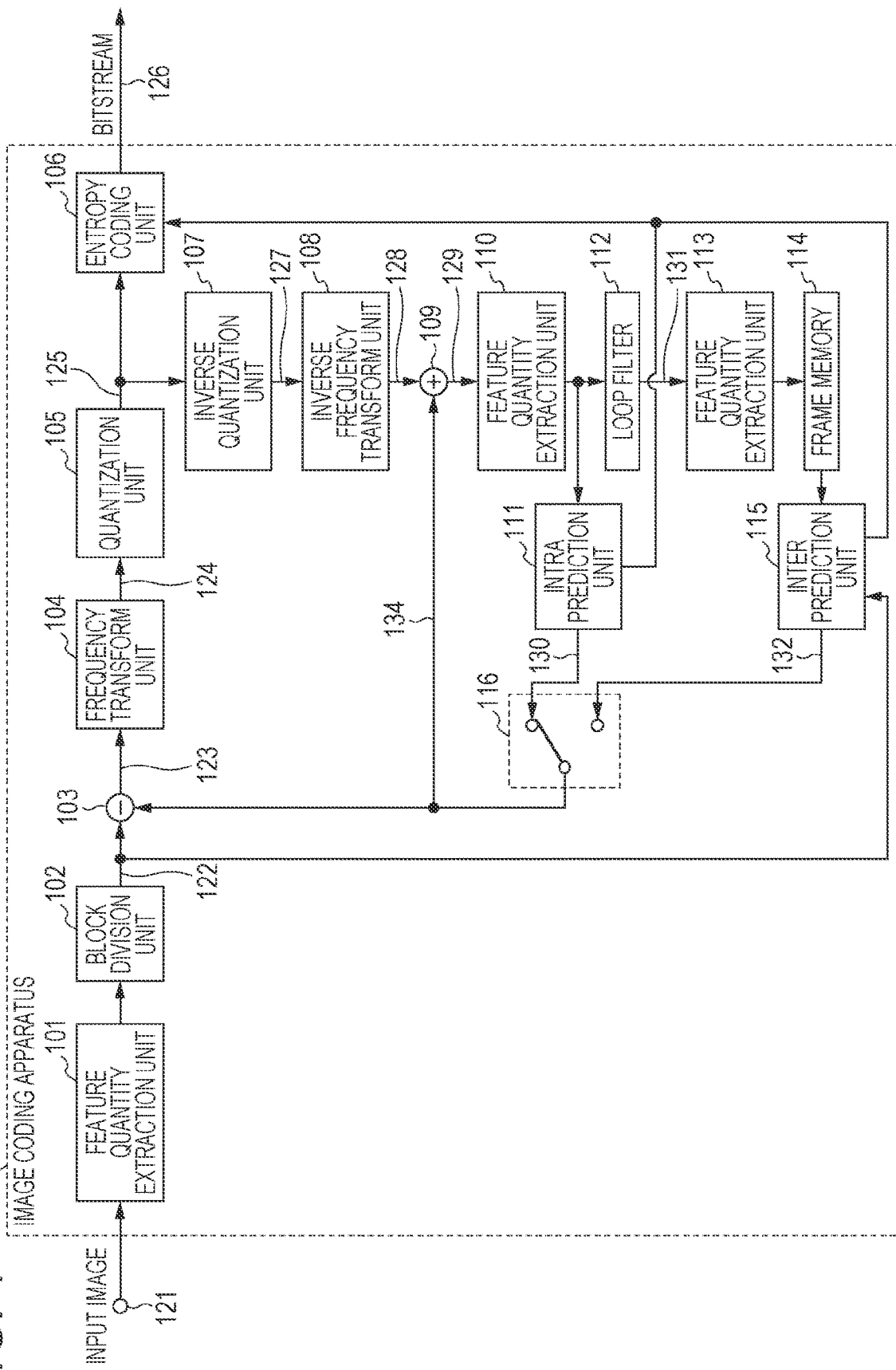
FIG. 1 is a block diagram illustrating a configuration of an image coding apparatus according to a first exemplary embodiment.

Underlying Knowledge of Present Disclosure In the conventional image coding scheme, the pixel information on the adjacent block is used to generate the prediction image in the intra prediction, and the information on the parallel translation is used in the inter prediction. For this reason, in the intra prediction, even if a similar region exists in the identical image, the information on the region cannot be used in the case that the region is not located in surroundings of the target block. In the inter prediction, even if the images are similar to each other by performing a deformation such as scaling and rotation, the information on the similar image cannot be used.

Additionally, a technique of using high-order motion information such as an affine transform is discussed in the inter prediction. Therefore, the scaling or the rotation deformation of a subject can be expressed by applying a geometric transform to the motion information. Therefore, quality of the generated prediction image is improved. The coding efficiency is improved by increasing a prediction unit.

However, in the affine transform, at least six-dimensional information is required because three kinds of deformations of the scaling, the rotation, and shear are required to be expressed in addition to the parallel translation. At least eight-dimensional information is required to express a projection transform. Thus, in the case that the high-order motion information is used, there is generated a problem in that a calculation quantity necessary for a motion information estimation process increases.

In exemplary embodiments, the problem is solved by applying a technology used in computer vision.

Nowadays, various feature point and feature quantity extraction techniques typified by SIFT (Scale-Invariant Feature Transform) and ORB (Oriented FAST and Rotated BRIEF) are proposed with the progress of the technology concerning the computer vision. In the feature point and feature quantity extraction techniques, a feature point is extracted with respect to an edge or corner portion in the high-reliability image, and information called a feature quantity is generated using a size or distribution of pixel information and gradient information on surroundings of the extracted feature point. Hereinafter, the feature quantity is also referred to as a local feature quantity.

The feature quantity extraction techniques frequently have a feature that the technique is robust to the scaling and the rotation. Therefore, the feature point information includes parameters called a rotation quantity (rotation angle) and a scale value. The feature quantities at the feature points are compared to each other, and a relationship called a corresponding point is set for a small Euclid distance between the feature quantities. A feature point matching process of searching the corresponding point from a feature point group is also used in a process of generating a panoramic image. In the prediction image generation technique, the prediction image can be generated with higher accuracy than the existing technique by applying the technology concerning the feature quantities.

One aspect of the present disclosure provides a prediction image generation method for generating a prediction image of a target block, the prediction image generation method including: an extraction step of extracting a plurality of first feature points each of which has a local feature quantity, the plurality of first feature points being included in a reconstructed image; a search step of searching a corresponding point from the plurality of first feature points, the corresponding point having a local feature quantity similar to a local feature quantity of a second feature point corresponding to the target block, a relationship between the corresponding point and the second feature point being expressed by information including a non-parallel translation component; and a generation step of generating the prediction image from the reconstructed image based on the relationship.

Therefore, in the prediction image generation method, the prediction image can be generated using the image of a reference region to which a deformation including the non-parallel translation component such as scaling and rotation is added using the feature point and the feature quantity. Therefore, the prediction image generation method can improve the coding efficiency.

For example, the second feature point may be included in the target block, and the prediction image may be generated using a pixel value of a region including the corresponding point in the reconstructed image in the generation step.

For example, the second feature point may be a feature point in surroundings of the target block, and the prediction image may be generated using a pixel value of a region that does not include the corresponding point in the reconstructed image in the generation step.

For example, the reconstructed image may be a reconstructed image of a target picture including the target block.

For example, the reconstructed image may be a reconstructed image of a picture different from a target picture including the target block.

Another aspect of the present disclosure provides an image coding method in which the prediction image generation method is performed, the image coding method including an image coding step of coding the target block using the prediction image.

Therefore, in the image coding method, a reference region to which a deformation including the non-parallel translation component is added using the feature point and the feature quantity, and the prediction image can be generated using the image of the reference region. Therefore, the prediction image generation method can improve the coding efficiency.

For example, the image coding method may further include a feature point information coding step of coding feature point information identifying the second feature point in a plurality of third feature points corresponding to the target block. At this point, the plurality of third feature points may be extracted in the extraction step, and the second feature point may be selected from the plurality of third feature points in the search step.

For example, the feature point information may indicate a coordinate of the second feature point.

For example, the feature point information may indicate a rotation quantity or a scale value which is possessed by the second feature point.

For example, the image coding method may further include a corresponding point information coding step of coding corresponding point information identifying the corresponding point in the plurality of first feature points.

For example, the corresponding point information may indicate a coordinate of the second feature point.

For example, in the feature point information coding step, indexes may be allocated to the plurality of first feature points in a predetermined sequence, and the corresponding point information may indicate the index allocated to the corresponding point.

For example, in the generation step, an initial value of a motion estimation process may be set based on the relationship, and the prediction image may be generated by performing the motion estimation process using the initial value.

Still another aspect of the present disclosure provides an image decoding method in which the prediction image generation method is performed, the image decoding method including an image decoding step of decoding the target block using the prediction image.

Therefore, in the image coding method, a reference region to which a deformation including the non-parallel translation component is added using the feature point and the feature quantity, and the prediction image can be generated using the image of the reference region. Therefore, the prediction image generation method can improve the coding efficiency.

For example, the image decoding method may further include a feature point information decoding step of decoding feature point information identifying the second feature point in a plurality of third feature points corresponding to the target block. At this point, the plurality of third feature points may be extracted in the extraction step, and the second feature point may be selected from the plurality of third feature points using the feature point information in the search step.

For example, the feature point information may indicate a coordinate of the second feature point.

For example, the feature point information may indicate a rotation quantity or a scale value which is possessed by the second feature point.

For example, the image decoding method may further include a corresponding point information decoding step of decoding corresponding point information identifying the corresponding point in the plurality of first feature points. At this point, the corresponding point may be searched from the plurality of first feature points using the corresponding point information in the search step.

For example, in the feature point information decoding step, indexes may be allocated to the plurality of first feature points in a predetermined sequence, and the corresponding point information may indicate the index allocated to the corresponding point.

Yet another aspect of the present disclosure provides a prediction image generation apparatus that generates a prediction image of a target block, the prediction image generation apparatus including: an extraction unit that extracts a plurality of first feature points each of which has a local feature quantity, the plurality of first feature points being included in a reconstructed image; a search unit that searches a corresponding point from the plurality of first feature points, the corresponding point having a local feature quantity similar to a local feature quantity of a second feature point corresponding to the target block, a relationship between the corresponding point and the second feature point being expressed by information including a non-parallel translation component; and a generation unit that generates the prediction image from the reconstructed image based on the relationship.

Therefore, in the prediction image generation apparatus, a reference region to which a deformation including the non-parallel translation component is added using the feature point and the feature quantity, and the prediction image can be generated using the image of the reference region. Therefore, the prediction image generation apparatus can improve the coding efficiency.

Note that these general or specific aspects may be implemented using a system, a method, an integrated circuit, a computer program, or a computer-readable recording medium such as a CD-ROM, or using any given combination of a system, a method, an integrated circuit, a computer program, and a computer-readable recording medium.

Exemplary embodiments will be described in detail below with reference to the drawings as needed. However, the detailed description of the well-known item and the overlapping description of the substantially identical configuration are occasionally neglected. This is because unnecessary redundancy of the following description is avoided to facilitate easy understanding of those skilled in the art.

Note that each of the following exemplary embodiments illustrates a specific example of the present disclosure. Numerical values, shapes, materials, elements, arranged positions and connection forms of the elements, steps, the order of the steps, and the like of the following exemplary embodiments are described only by way of example, but do not restrict the present disclosure. Also, among elements described in the following exemplary embodiments, elements that are not included in an independent claim which represents the highest-order concept are described as optional elements.

First Exemplary Embodiment

An image coding apparatus in which an image coding method according to a first exemplary embodiment is used will be described. The image coding apparatus of the first exemplary embodiment performs an intra prediction process and an inter prediction process using a local feature quantity. Therefore, the image coding apparatus generates a prediction image using a reference block expressed by information including a non-parallel translation component except a parallel translation component, so that the coding efficiency can be improved.

FIG. 1 is a block diagram illustrating an example of image coding apparatus 100 of the first exemplary embodiment. Image coding apparatus 100 includes feature quantity extraction unit 101, block division unit 102, subtractor 103, frequency transform unit 104, quantization unit 105, entropy coding unit 106, inverse quantization unit 107, inverse frequency transform unit 108, adder 109, feature quantity extraction unit 110, intra prediction unit 111, loop filter 112, feature quantity extraction unit 113, frame memory 114, inter prediction unit 115, and switching unit 116.

Image coding apparatus 100 codes input image 121 to generate bitstream 126.

Figure 2:
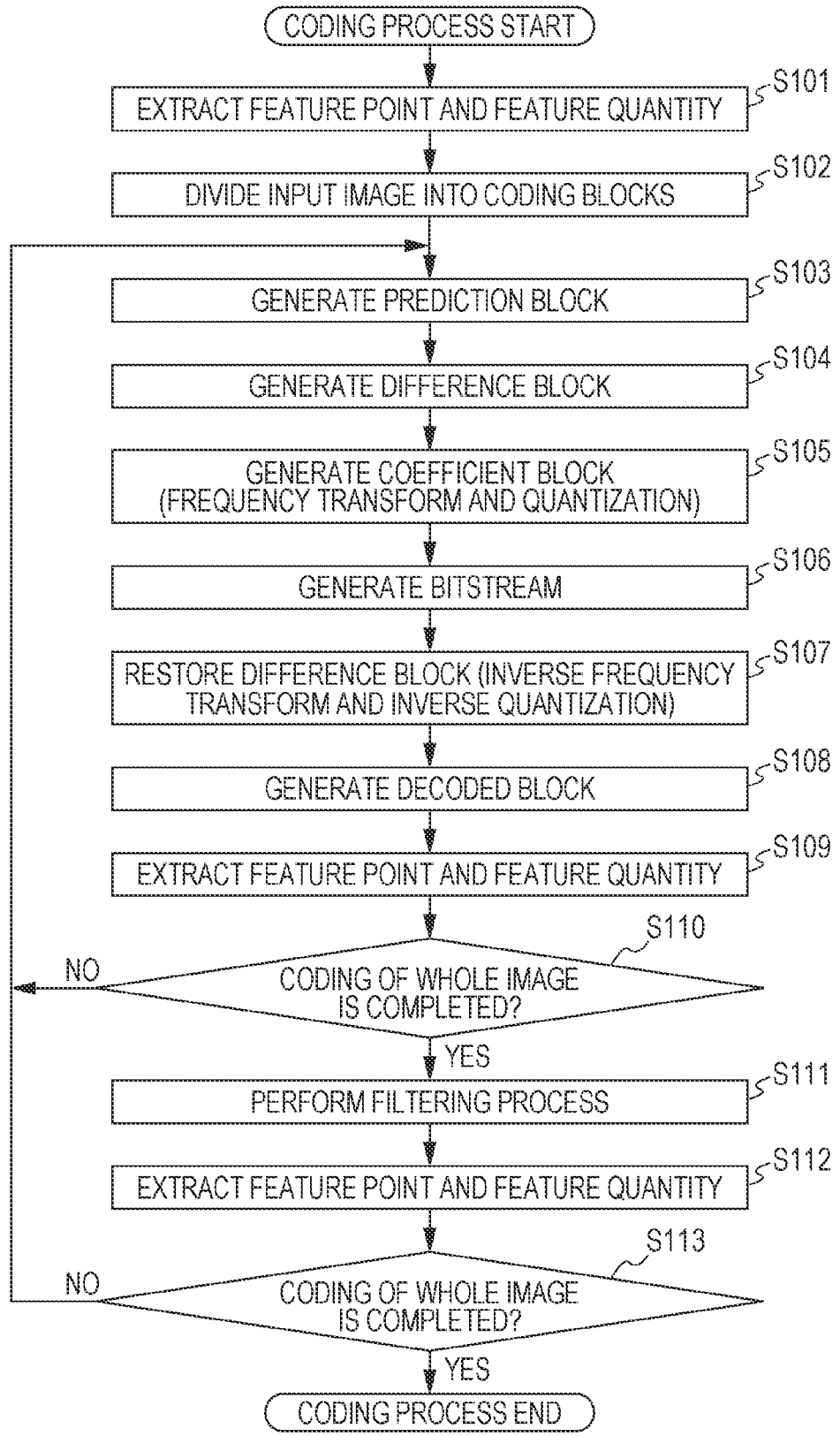
FIG. 2 is a flowchart illustrating an example of an image coding process according to the first exemplary embodiment.

FIG. 2 is a flowchart of an image coding process performed by image coding apparatus 100 of the first exemplary embodiment.

Feature quantity extraction unit 101 extracts a feature point included in input image 121 that is of a still or video image including at least one picture and a feature quantity of the feature point by a feature point and feature quantity extraction technique typified by the SIFT (S101).

Image coding apparatus 100 divides input image 121 into coding blocks 122 that are of coding process units (S102).

For each coding block 122, intra prediction unit 111 or inter prediction unit 115 generates prediction block 134 using decoded block 129 or decoded image 131 (S103). The detailed process is described later.

Subtractor 103 generates difference block 123 that is of a difference between coding block 122 and prediction block 134 (S104). Frequency transform unit 104 performs a frequency transform on difference block 123 to generate coefficient block 124. Quantization unit 105 quantizes coefficient block 124 to generate coefficient block 125 (S105).

Entropy coding unit 106 performs entropy coding on coefficient block 125 to generate bitstream 126 (S106).

In order to generate decoded block 129 and decoded image 131 to be used in the generation of prediction block 134 of the subsequent block or picture, inverse quantization unit 107 performs inverse quantization on coefficient block 125 to generate coefficient block 127. Inverse frequency transform unit 108 performs inverse frequency transform on coefficient block 127 to restore difference block 128 (S107).

Adder 109 adds prediction block 134 used in Step S103 and difference block 128 to generate decoded block 129 (reconstructed image) (S108). Decoded block 129 is used in an intra prediction process performed by intra prediction unit 111.

By a technique similar to that in Step S101, feature quantity extraction unit 110 extracts the feature point included in decoded block 129 that is of a decoding result of an already-coded region in input image 121 at that time and the feature quantity of the feature point (S109). The extracted feature point and feature quantity are used in the intra prediction.

Image coding apparatus 100 determines whether the coding process of the whole of one image is completed (S110). When the coding process of the whole of one image is completed (Yes in S110), loop filter 112 performs a filtering process such as a deblocking filter on a plurality of decoded blocks 129 included in the one image in order to relieve image quality degradation caused by a block deformation, and generates decoded image 131 (S111). Feature quantity extraction unit 113 extracts the feature point of decoded image 131 and the feature quantity of the feature point using the technique similar to that in Steps S101 and S109 (S112). The extracted feature point and feature quantity are used in the inter prediction.

Frame memory 114 stores decoded image 131 therein. Decoded image 131 is used in an inter prediction process performed by inter prediction unit 115.

Image coding apparatus 100 repeatedly performs a series of processes until the coding process to whole input image 121 that is of an input video image is completed (S113).

The inverse quantization and inverse frequency transform in Step S105 may sequentially be performed as a separate process or collectively be performed. Similarly the inverse quantization and inverse frequency transform in Step S107 may sequentially be performed as a separate process or collectively be performed.

The quantization refers to a process in which values sampled at predetermined intervals are digitized while associated with respective predetermined levels. The inverse quantization refers to a process in which each value obtained through quantization is returned to a value in the original interval. In the data compression field, the quantization refers to a process in which values are classified into coarser intervals than the original ones, whereas the inverse quantization refers to a process in which values in coarser intervals are re-classified into the original finer intervals. In the codec technology field, the quantization and the inverse quantization are sometimes called rounding or scaling.

Figure 3:
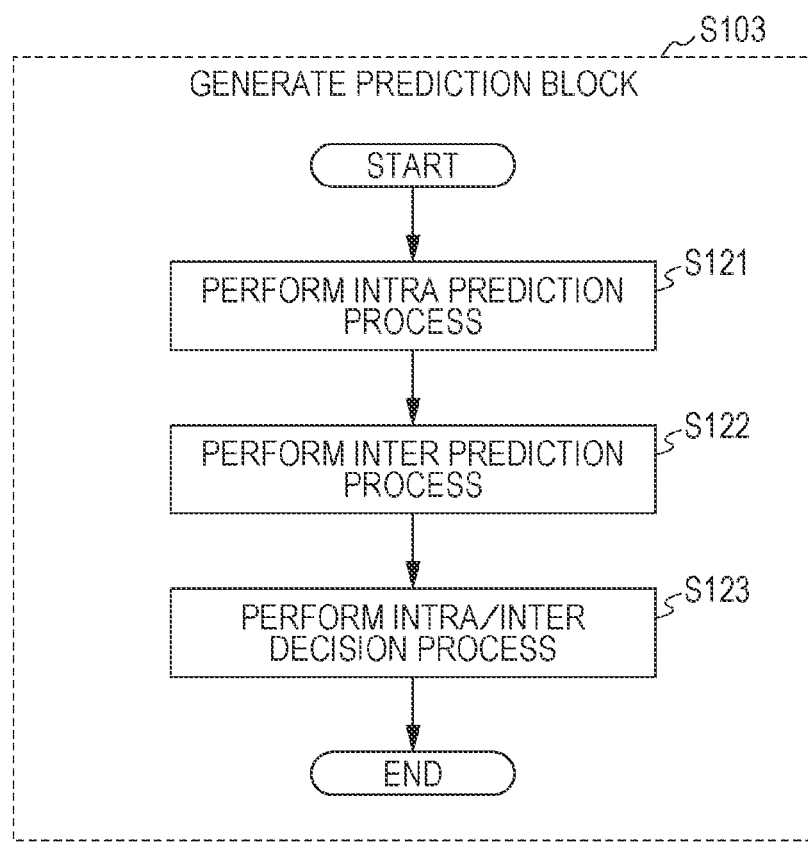
FIG. 3 is a flowchart illustrating an example of a prediction block generation process according to the first exemplary embodiment.

The prediction block generation process in Step S103 will be described in detail below with reference to a flowchart in FIG. 3.

Intra prediction unit 111 generates prediction block 130 through the intra prediction process (S121). Inter prediction unit 115 generates prediction block 132 through the inter prediction process (S122). Switching unit 116 performs a cost calculation on each of prediction blocks 130 and 132 obtained in Steps S121 and S122 using an R-D optimization model (the following (Eq. 1)), selects a technique less costly, namely, a technique having higher coding efficiency, and outputs the prediction block corresponding to the selected technique as prediction block 134 (S123).

[Mathematical formula 1]

$$Cost = D + \lambda \times R \quad \text{(Eq. 1)}$$

In (Eq. 1), D denotes coding distortion and is, for example, a sum of absolute. values of differences between an original pixel value of a pixel in a coding-target block and a value of a corresponding pixel in the generated prediction image. R denotes a generated code quantity and is, for example, a code quantity necessary for the coding of motion information used to generate the prediction block. $\lambda$ denotes the Lagrange multiplier. Therefore, an appropriate prediction mode is selected from among intra prediction and inter prediction, so that the coding efficiency can be improved.

In advance of the processes in Steps S121 and S122, image coding apparatus 100 may decide which one of the prediction processes is used, and perform only the process corresponding to the decided prediction process. Therefore, a processing quantity for the prediction image generation process can be reduced.

Image coding apparatus 100 performs coding on information indicating which one of the intra prediction and the inter prediction is used. As used herein, the coding means that the information is provided to the coding information, in other words, a coded bitstream including the information is generated.

Figure 4:
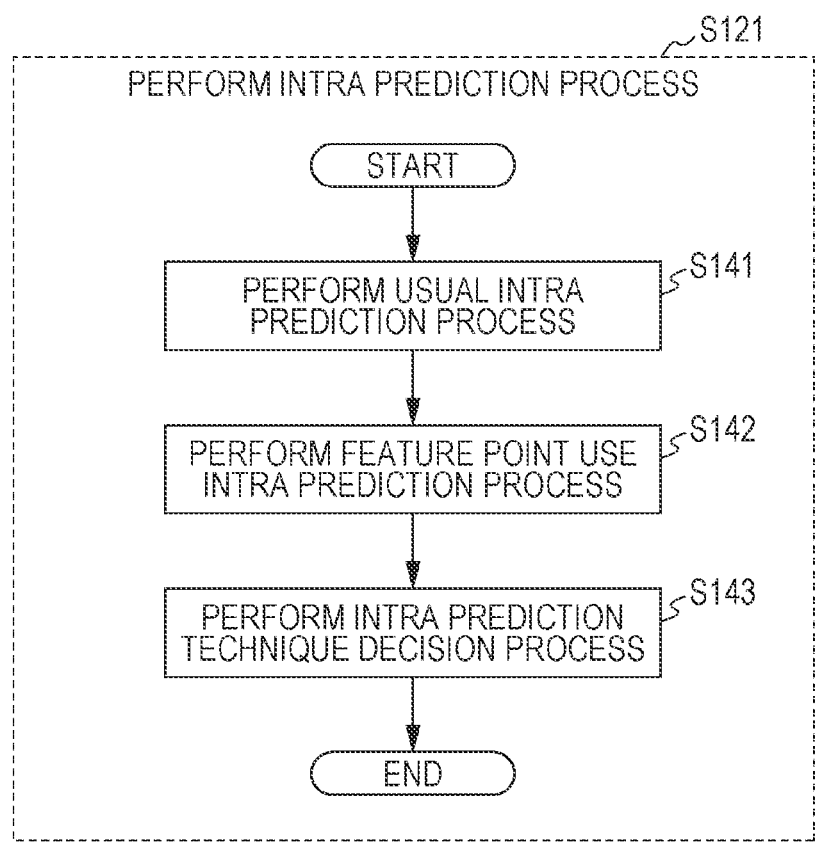
FIG. 4 is a flowchart illustrating an example of an intra prediction process according to the first exemplary embodiment.

The intra prediction process in Step S121 will be described in detail below with reference to a flowchart in FIG. 4.

Intra prediction unit 111 generates the prediction block by performing the intra prediction process adopted in H.2641AVC and H.265/HEVC in which information on the adjacent already-coded block is used (S141). Hereinafter, the process is referred to as usual intra prediction.

Intra prediction unit 111 generates the prediction block through the intra prediction process in which a corresponding point of a feature point is used (S142). Hereinafter, the process is referred to as feature point use intra prediction.

Intra prediction unit 111 performs the process similar to that in Step S123 on the prediction blocks generated in Steps S141 and S142, selects the technique having the higher coding efficiency in the techniques of Steps S141 and S142, and outputs the prediction block corresponding to the selected technique as prediction block 130 (S143).

In advance of the processes in Steps S141 and S142, intra prediction unit 111 may decide which one of the prediction processes is used, and perform only the process corresponding to the decided prediction process. Therefore, a processing quantity for the prediction image generation process can be reduced.

Image coding apparatus 100 performs the coding on information indicating which one of the usual intra prediction process and the feature point use intra prediction process is used.

Figure 5:
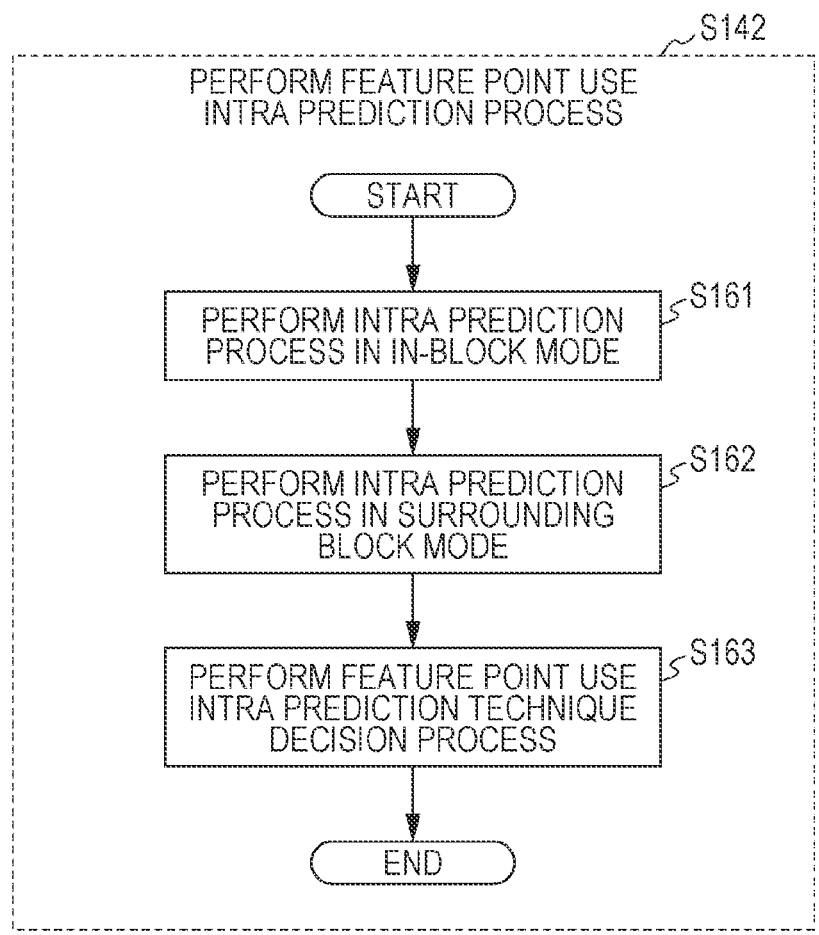
FIG. 5 is a flowchart illustrating an example of a feature point use intra prediction process of the first exemplary embodiment.

The feature point use intra prediction process in Step S142 will be described in detail below with reference to a flowchart in FIG. 5.

Intra prediction unit 111 generates the prediction block by performing the intra prediction process in which the feature point included in a target block that is of a target in the prediction process is used (S161). Hereinafter, the prediction process is referred to as an in-block mode.

Intra prediction unit 111 performs the intra prediction process in which the feature point existing in the already-coded region in surroundings of the target block is used (S162). Hereinafter, the prediction process is referred to as a surrounding block mode.

Intra prediction unit 111 performs the process similar to that in Step S123 on each of the prediction blocks generated in Steps S161 and S162, and selects the technique having the higher coding efficiency in the in-block mode and the surrounding block mode (S163).

In advance of the processes in Steps S161 and S162, intra prediction unit 111 may decide which one of the prediction modes is used, and perform only the process corresponding to the decided prediction process. Therefore, a processing quantity for the prediction image generation process can be reduced.

Figure 6:
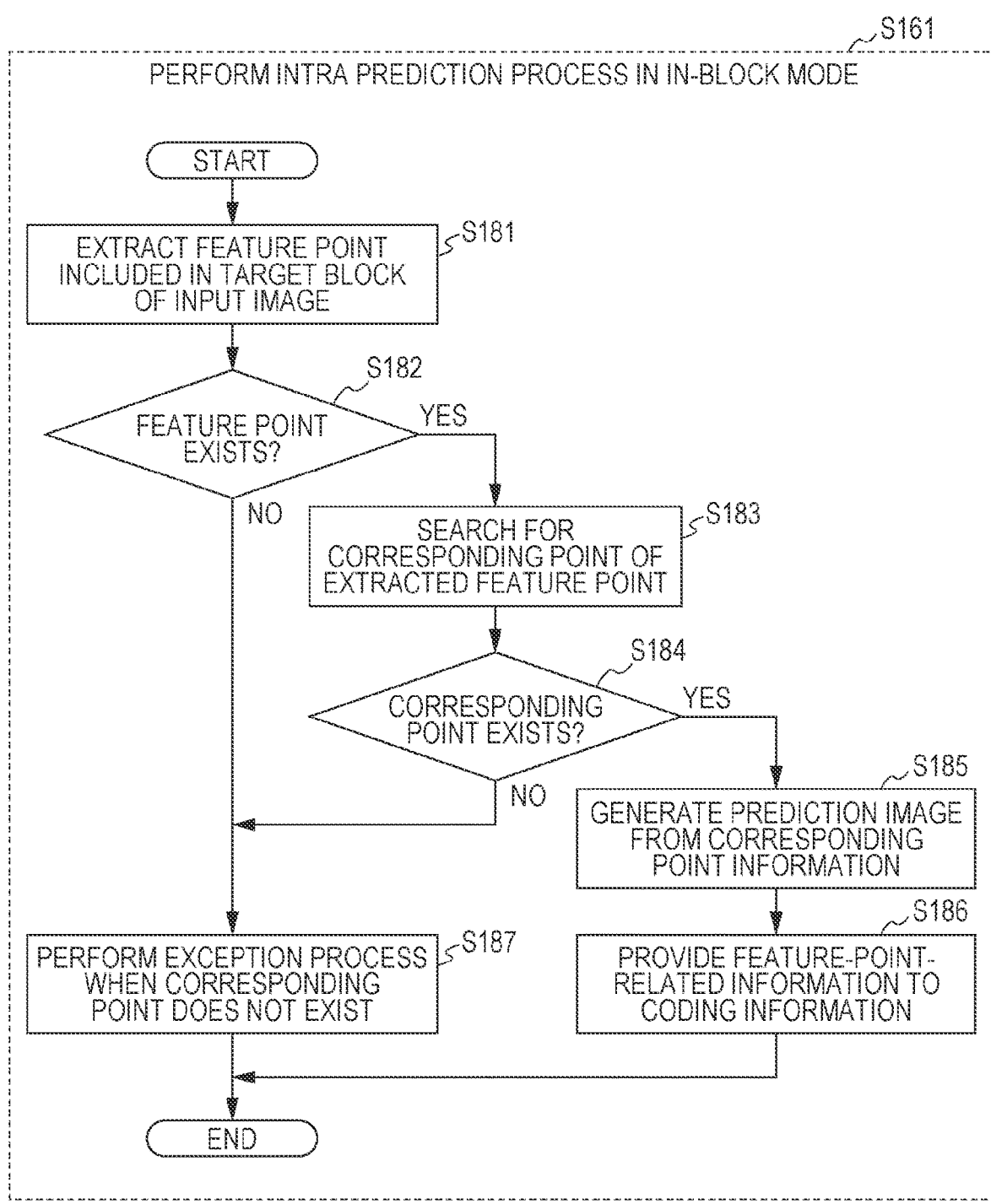
FIG. 6 is a flowchart illustrating an example of an in-block mode intra prediction process of the first exemplary embodiment.

The in-block mode intra prediction process in Step S161 will be described in detail below with reference to a flowchart in FIG. 6.

Intra prediction unit 111 extracts the feature point existing in the target block from the feature point of the input image 121, the feature point of the input image 121 being obtained in Step S101 (S181). When the feature point exists (Yes in S182), intra prediction unit 111 performs a corresponding point search process (S183). Specifically, intra prediction unit 111 searches the corresponding point that is of the feature point having the feature quantity similar to the feature quantity of the feature point extracted in Step S181 from the feature points extracted from the decoded block of the already-coded region in the same image as the target block, the feature point being obtained in Step S109. As used herein, for example, the similarity means a small Euclid distance between the feature quantities.

When the corresponding point exists in Step S183 (Yes in S184), intra prediction unit 111 performs the prediction image generation process using the information between the corresponding points (S185).

Figure 7:
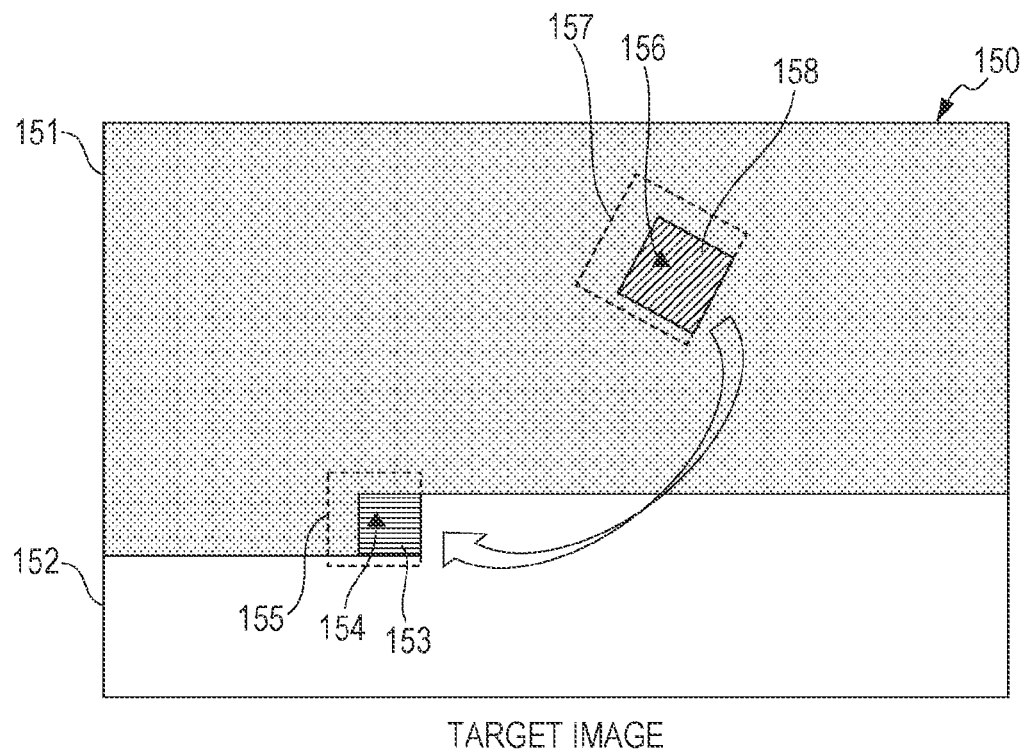
FIG. 7 is a view illustrating an example of an in-block mode prediction image generation process of the first exemplary embodiment.

FIG. 7 is a view illustrating the prediction image generation process, and illustrating target image 150 including target block 153 that is of a prediction process target. Target image 150 is already coded, and includes already-coded region 151 where decoded block 129 is generated and uncoded region 152 where the coding is not performed.

Intra prediction unit 111 sets a region including target block 153 around feature point 154 extracted in Step S181 to prediction target region 155. Intra prediction unit 111 also sets a region around corresponding point 156 corresponding to feature point 154 extracted in Step S183 to reference region 157 used in the prediction image generation. Then, intra prediction unit 111 generates the prediction image (prediction block) using pixel information on reference block 158, which is included in reference region 157 and is the image located at a position corresponding to a position of target block 153 in prediction target region 155.

At this point, local feature quantity extraction techniques, such as SIFT and ORB, which are used to decide reference region 157 as the feature point extraction technique, are robust to the scaling and the rotation. Therefore, as illustrated in FIG. 7, intra prediction unit 111 can generate the prediction image in consideration of the rotation and enlargement of prediction target region 155.

Specifically, each feature point has information on the rotation quantity and scale value in addition to coordinate information. Intra prediction unit 111 transforms reference block 158 based on a difference between the rotation quantity and scale value of feature point 154 and the rotation quantity and scale value of corresponding point 156 to generate the prediction image (prediction block).

In the case that reference region 157 includes an outside of target image 150, intra prediction unit 111 may perform a padding process in which a region having no piece of pixel information is generated by copying the pixel information near a terminal end of the image. Therefore, reference region 157 can be set by a simple process, and quality degradation of the prediction image can be suppressed.

Instead of the padding process, intra prediction unit 111 may perform a folding process in which the pixel information outside a screen is generated by folding the pixel information inside the image with the terminal end as an axis. Alternatively, intra prediction unit 111 may paint pixels outside the image with a predetermined value. In the former, quality of the prediction image can be improved because detailed information on the image can be used. In the latter, an increase in processing amount can be suppressed because of the simple process of substituting a fixed value.

Intra prediction unit 111 provides feature-point-related information to coding information (S186).

When the feature point does not exist in the target block (No in S182), or when the corresponding point does not exist (No in S184), intra prediction unit 111 performs an exception process in the case that the corresponding point does not exist (S187). Specifically, intra prediction unit 111 sets a cost value of the exception process to the maximum value. For example, intra prediction unit 111 sets D and R in (Eq. 1) to infinite. Therefore, the technique in Step S161 is not selected in Step S163.

Figure 8:
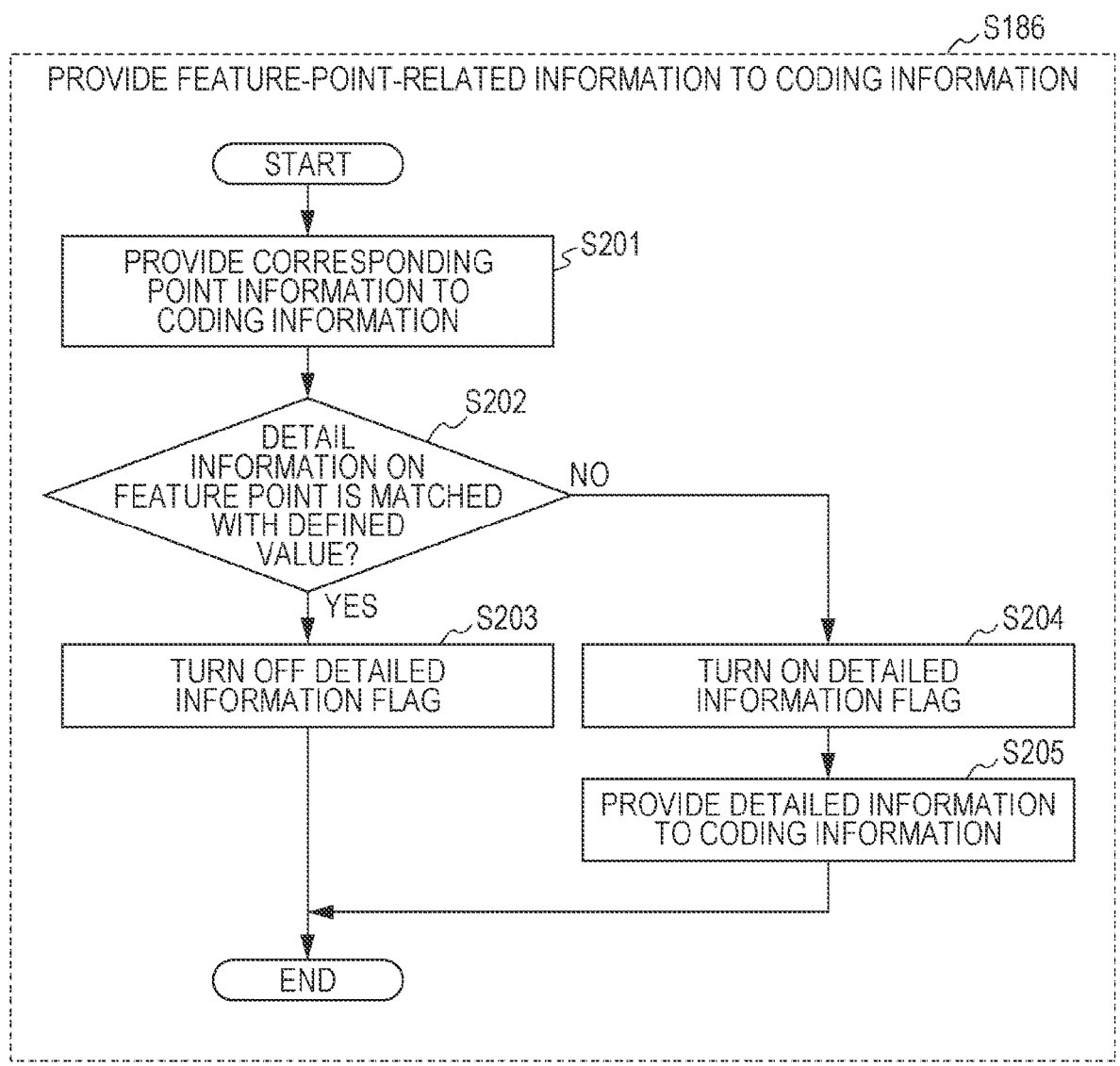
FIG. 8 is a flowchart illustrating an example of an in-block mode feature-point-related information coding process of the first exemplary embodiment.

The method for providing the feature-point-related information to the coding information in Step S186 will be described in detail below with reference to a flowchart in FIG. 8.

At this point, the feature-point-related information includes corresponding point information that is of information on the corresponding point and feature point information that is of information on the feature point in the target block.

Intra prediction unit 111 provides corresponding point information that is of the information necessary to search the corresponding point to the coding information (S201). Specifically, target point information indicates a coordinate of the corresponding point corresponding to the feature point included in the target block.

Intra prediction unit 111 determines whether feature point information that is of the information on the feature point included in the target block is matched with a defined value (S202). As used therein, the feature point information means the coordinate of the feature point in the block, the rotation quantity and scale value possessed by the feature point, and the like. For example, the defined value of the coordinate is a coordinate in the center of the target block, the rotation quantity has the defined value of 0 degree, and the scale value has the defined value of 1.

When all the pieces of feature point information included in the target block are matched with the defined values (Yes in S202), intra prediction unit 111 turns off a detailed information flag indicating that the detailed information on the feature point exists, and intra prediction unit 111 provides the detailed information flag to the coding information (S203).

When at least one of the pieces of feature point information included in the target block is not matched with the defined value (No in S202), intra prediction unit 111 turns on the detailed information flag, and intra prediction unit 111 provides the detailed information flag to the coding information (S204). Intra prediction unit 111 provides pieces of detailed information such as the coordinate and rotation quantity of the feature point included in the target block to the coding information (S205).

The corresponding point information in Step S201 is not limited to the above information. The corresponding point information may be an index that can uniquely decide the corresponding point from the feature point group (feature points extracted from the whole already-coded region) including the corresponding point. For example, the index is set such that the value of the feature point decreases as the feature point comes close to the target block. Alternatively, the index is set such that the value of the feature point decreases with increasing reliability corresponding to the feature quantity. Although two-dimensional information is required for the use of the coordinate, the corresponding point can be indicated by one-dimensional information for the use of the index.

The defined value in Step S202 is not limited to the above value. For example, the defined value of the coordinate may be a coordinate at an upper left end of the target block. The defined value of the rotation quantity may be a rotation quantity in the whole image.

The detailed information may indicate an absolute value or relative value of the coordinate, rotation quantity, or scale value. That is, the detailed information may indicate a difference between the defined value of the coordinate, rotation quantity, or scale value and the coordinate, rotation quantity, or scale value of the feature point used. Alternatively, the detailed information may indicate a difference in coordinate, rotation quantity, or scale value between the corresponding point and the feature point. The defined value in Step S202 may be a defined value of the above difference.

Although the process of determining whether all the elements such as the coordinate, the rotation quantity, and the scale value are matched with the defined values is described as the determination process in Step S202, intra prediction unit 111 may perform the determination of each element, and code a flag of each element. Alternatively, intra prediction unit 111 may group the plurality of elements into some groups, perform the determination in each group, and code a flag of each group. For at least two flags, intra prediction unit 111 performs the processes in Steps S202 to S205 times for the number of flags. For example, intra prediction unit 111 may code the flag for the coordinate information and the flag for the information on the rotation quantity and scale value. Therefore, the setting is flexibly performed during the coding, so that the coding efficiency can be improved.

Figure 9:
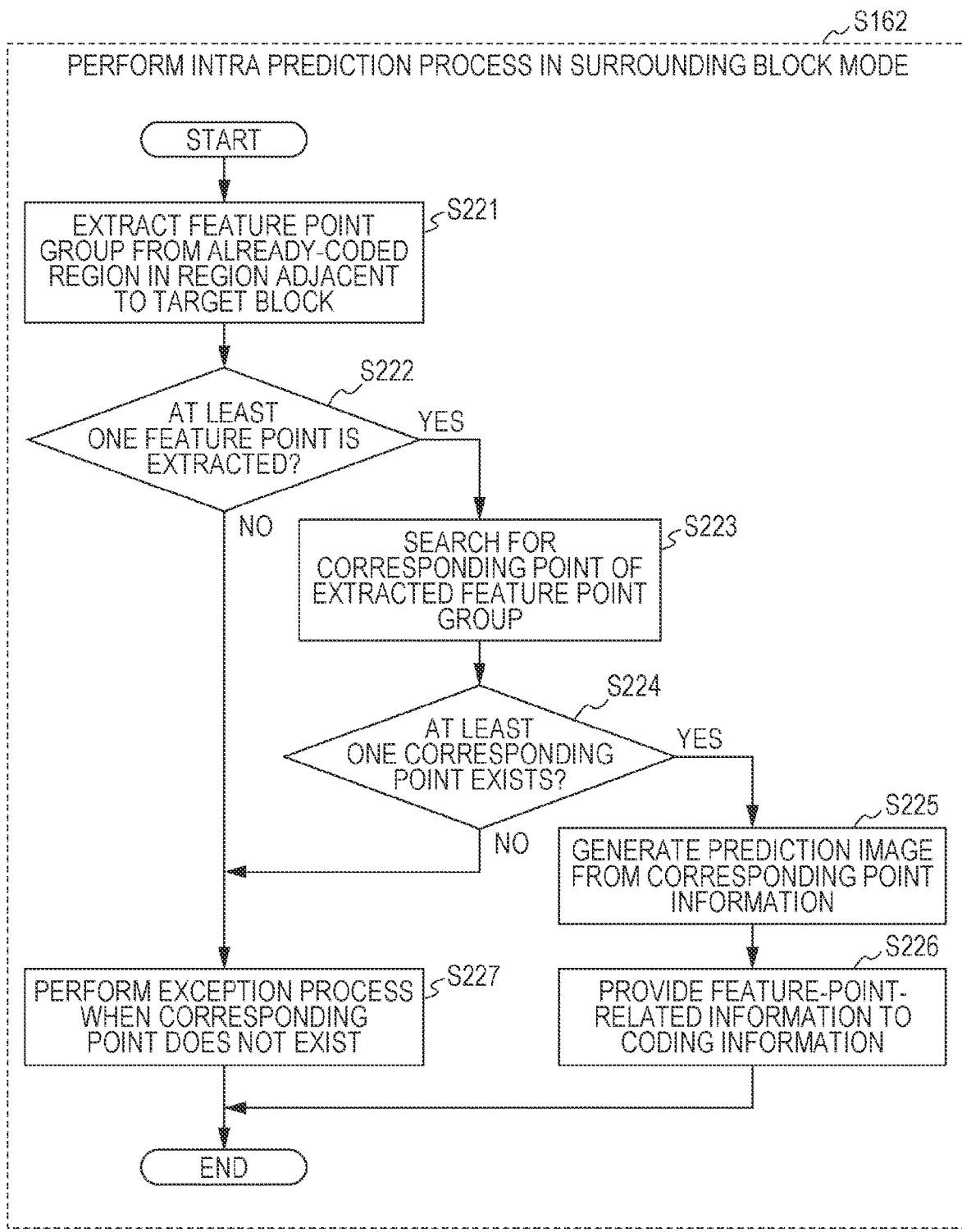
FIG. 9 is a flowchart illustrating an example of a surrounding block mode intra prediction process of the first exemplary embodiment.

The surrounding block mode intra prediction process in Step S162 will be described in detail below with reference to a flowchart in FIG. 9.

Intra prediction unit 111 extracts the feature point included in an adjacent region, which is of the decoded image of the already-coded region adjacent to the target block, from the feature point obtained in Step S109 (S221). When at least one feature point can be extracted in Step S221 (Yes in S222), intra prediction unit 111 extracts the feature point extracted from the decoded image of the already-coded region in the same image as the target block in the feature points obtained in Step S109 with respect to extracted at least the one feature point, and intra prediction unit 111 searches the corresponding point in the extracted feature points (S223).

When at least one corresponding point exists in Step S223 (Yes in S224), intra prediction unit 111 generates the prediction image from the corresponding point information (S225).

Figure 10:
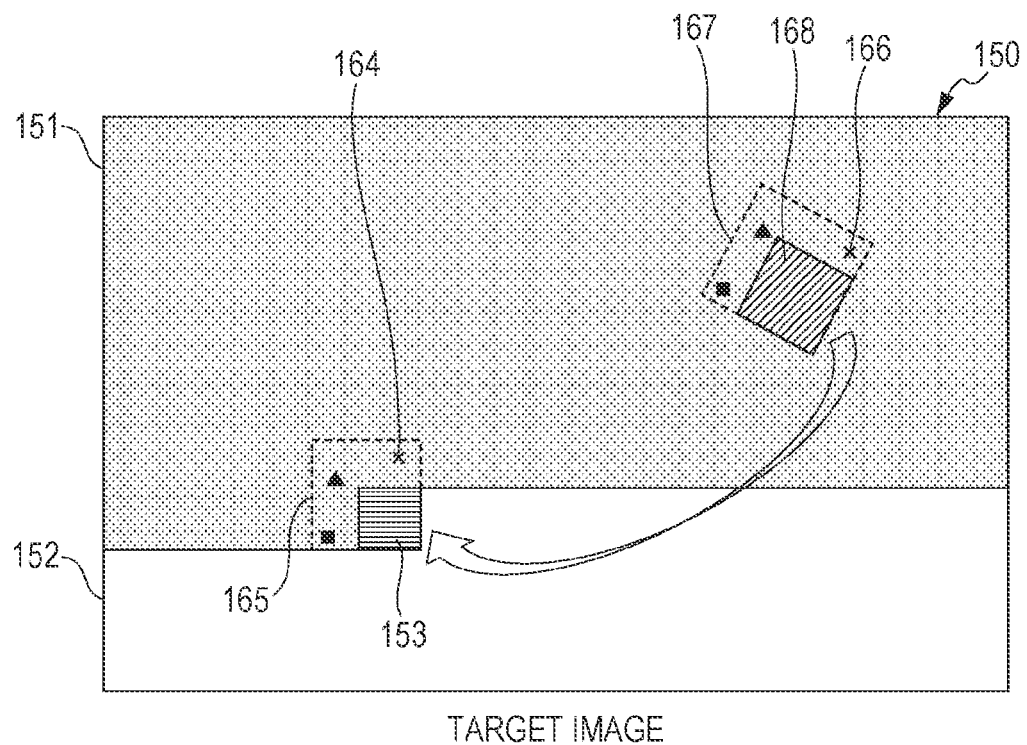
FIG. 10 is a view illustrating an example of a surrounding block mode prediction image generation process of the first exemplary embodiment.

FIG. 10 is a view illustrating this process, and illustrating target image 150 including target block 153 that is of the prediction process target. Target image 150 is already coded, and includes already-coded region 151 where decoded block 129 is generated and uncoded region 152 where the coding is not performed.

Intra prediction unit 111 selects at least one feature point 164 from the feature point group, which is obtained in Step S221 and exists in the surrounding region of the target block, and sets prediction target region 165 including both feature point 164 and target block 153. Intra prediction unit 111 sets the region including corresponding point 166 of feature point 164 included in prediction target region 165 to reference region 167. In setting reference region 167, intra prediction unit 111 performs geometric transforms such as an affine transform using the plurality of corresponding points 166. Therefore, the coding efficiency is improved because the quality of the prediction image is improved. Then, intra prediction unit 111 generates the prediction image (prediction block) using pixel information on reference block 168, which is included in reference region 167 and is the image located at the position corresponding to the position of target block 153 in prediction target region 165.

Intra prediction unit 111 needs not to generate the prediction image using all the feature point at which the corresponding points are found, but may change a combination of the corresponding points used and decide a combination of the corresponding points having the best coding efficiency. Therefore, the coding efficiency is further improved. In the case that reference region 167 includes the outside of target image 150, intra prediction unit 111 may perform an out-of-region process such as the padding process described in Step S185. Therefore, the coding efficiency is improved.

Then intra prediction unit 111 provides the feature-point-related information, which is of the information on the feature point necessary for the process in Step S225, to the coding information (S226).

When the feature point does not exist in the region adjacent to the target block (No in S222), or when the corresponding point does not exist (No in S224), intra prediction unit 111 performs the exception process in the case that the corresponding point does not exist (S227). The process in Step S227 is similar to the process in Step S187, and is performed such that the technique in Step S162 is not selected.

Figure 11:
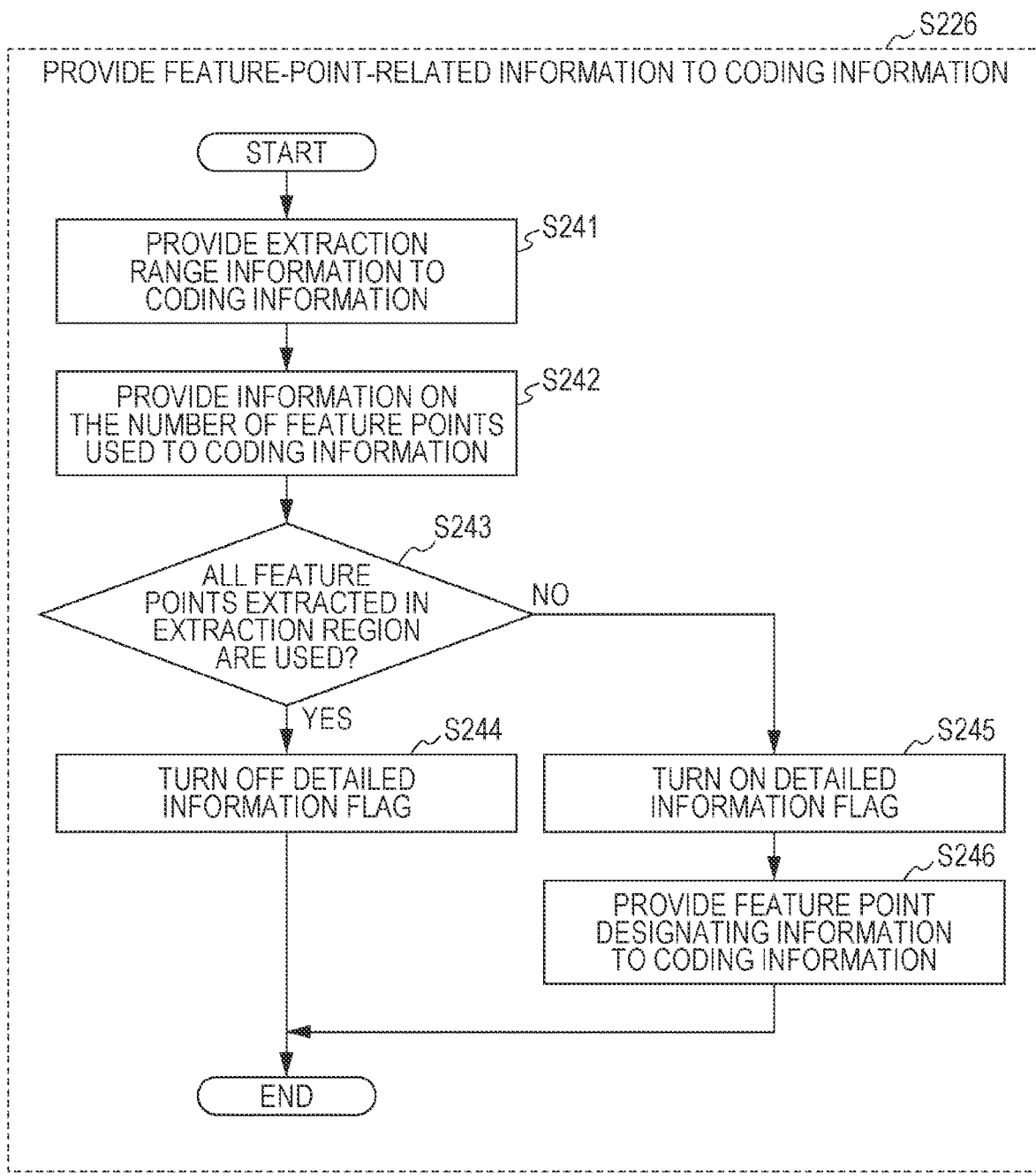
FIG. 11 is a flowchart illustrating an example of a surrounding block mode feature-point-related information coding process of the first exemplary embodiment.

The process of providing the feature-point-related information to the coding information in Step S226 will be described in detail below with reference to a flowchart in FIG. 11.

At this point, the feature-point-related information includes extraction range information indicating extraction region 175 including feature points 174 in the surroundings of target block 153, number information indicating the number of feature points used in feature points 174 extracted in the extraction region 175, and feature point designating information designating the feature point used in feature points 174 extracted in extraction region 175.

Figure 12:
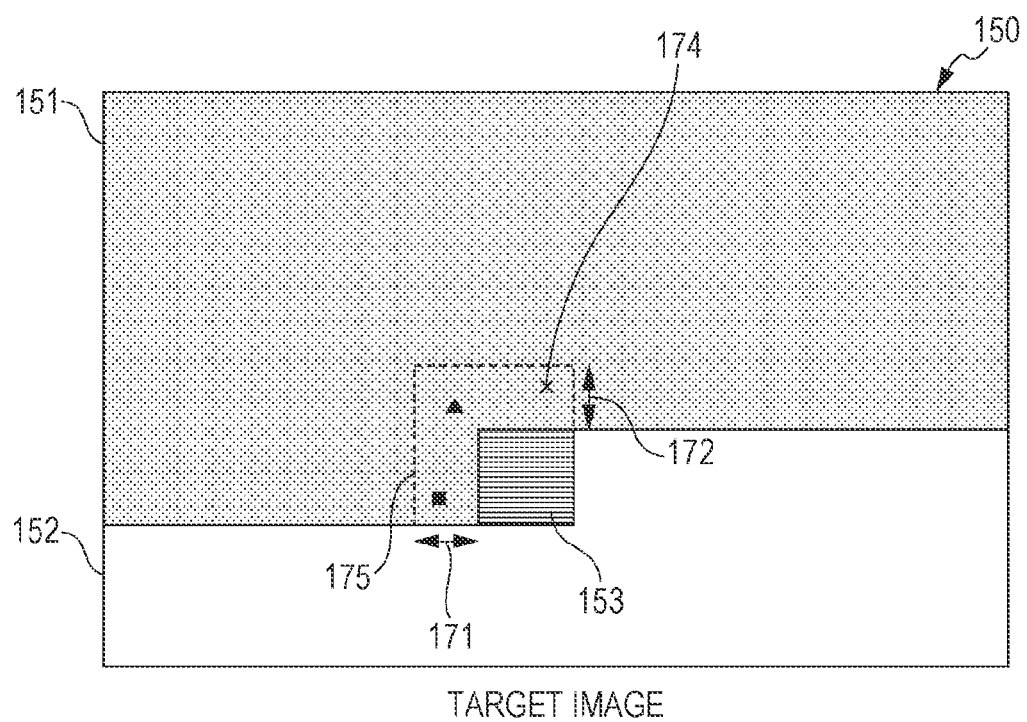
FIG. 12 is a view illustrating extraction range information of the first exemplary embodiment.

Intra prediction unit 111 provides the extraction range information necessary to designate extraction region 175 that is of a rectangular region including all feature points 174 in the surroundings of target block 153 used in Step S225 to the coding information (S241). For example, the extraction range information is information defining a width and a height of extraction region 175, and the extraction range information includes information indicating width 171 and height 172 in FIG. 12.

Intra prediction unit 111 provides the number information indicating the number of feature points (corresponding points) used in Step S225 to the coding information (S242). In other words, the number information indicates the number of feature points (corresponding points) included in a set of feature points used.

When all feature points 174 extracted in extraction region 175 designated by the information in Step S241 are used (Yes in S243), intra prediction unit 111 turns off the detailed information flag indicating that the detailed information on the feature point exists, and intra prediction unit 111 provides the detailed information flag to the coding information (S244).

On the other hand, when all the feature points extracted in extraction region 175 are used (No in S243), intra prediction unit 111 turns on the detailed information flag, and intra prediction unit 111 provides the detailed information flag to the coding information (S245). Intra prediction unit 111 provides the pieces of feature point designating information, which designates the feature point used in feature points 174 extracted in extraction region 175, for the number of feature points to the coding information (S246). For example, the feature point designating information is information indicating the coordinate of the feature point.

The coding process in Steps S241, S242, and Steps S243 to S246 is not limited to the above order, but may properly be changed.

The width and height of extraction region 175 in Step S241 may be designated in units of coding blocks, images, or sequences. A fixed value may be used as the width and height of extraction region 175. In the case that the width and height are changed in units of blocks, the range is flexibly set, so that the quality of the prediction image can be improved. In the case that the width and height are designated in units of images, the coding efficiency is improved because the coding information decreases.

Different values may be set to the width and height of extraction region 175, or an identical value may be set to the width and the height. In the case that the different values are set to the width and height, the effective feature point is easily selected, so that the quality of the prediction image can be improved. On the other hand, in the case that the identical value is set to the width and the height, a code quantity can be reduced because of only one piece of information necessary for the coding.

The extraction range information in Step S241 may indicate the number of pixels corresponding to the width and height, or indicate the number of already-coded blocks corresponding to the width and height. In this case, the number of blocks in a width direction and the number of blocks in a height direction may separately be designated, or an identical value may be used as the number of blocks in the width direction and the number of blocks in the height direction. The code quantity can be reduced because the use of the number of blocks can express distance information such as the width by a smaller value.

Figure 13:
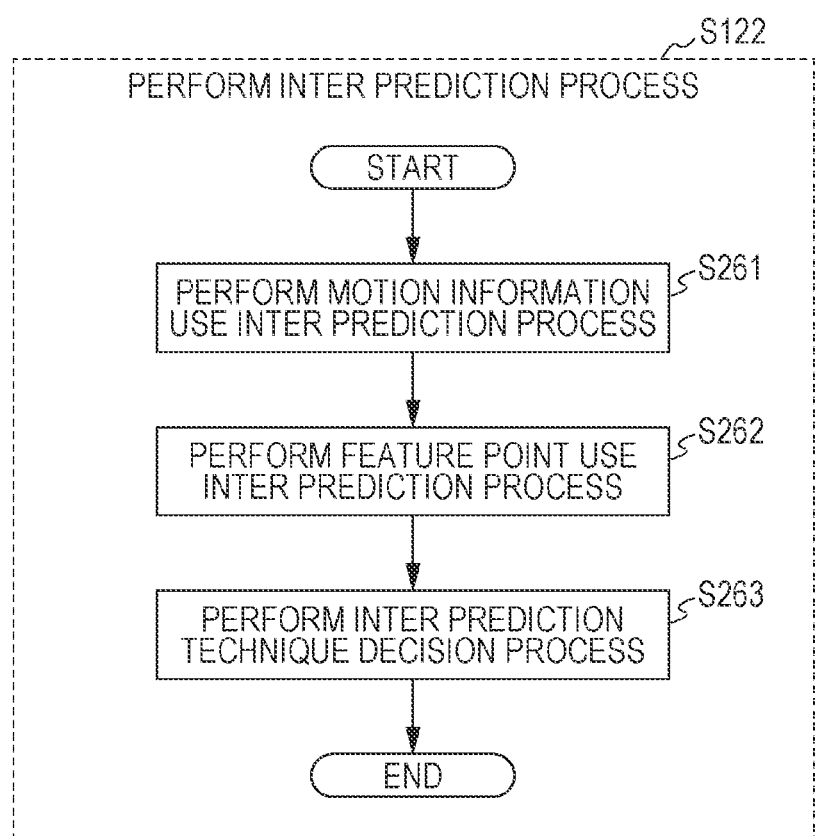
FIG. 13 is a flowchart illustrating an example of an inter prediction process of the first exemplary embodiment.

The inter prediction process in Step S122 performed by inter prediction unit 115 will be described in detail below with reference to a flowchart in FIG. 13.

Inter prediction unit 115 generates the prediction image by performing the inter prediction process using motion information used in H.264/AVC or H.265/HEVC that is of the existing video coding scheme (S261). Hereinafter, the process is referred to as usual inter prediction.

Inter prediction unit 115 generates the prediction image by performing the inter prediction process in which the feature point is used (S262). Hereinafter, the process is referred to as feature point use inter prediction.

Intra prediction unit 115 performs the process similar to that in Step S123 on each of the prediction images obtained in Steps S261 and S262, thereby selecting the technique having the higher coding efficiency (S263).

Figure 14:
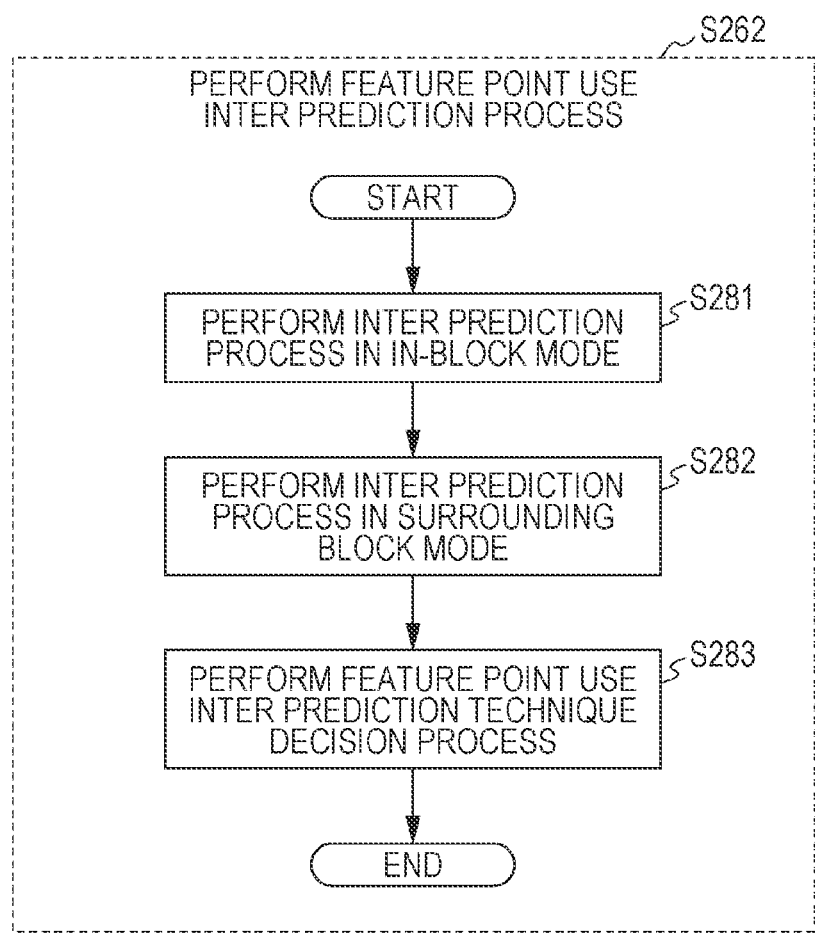
FIG. 14 is a flowchart illustrating an example of a feature point use inter prediction process of the first exemplary embodiment.

The feature point use inter prediction process in Step S262 will be described in detail below with reference to a flowchart in FIG. 14.

Inter prediction unit 115 generates the prediction image by performing the inter prediction process in which the feature point included in the target block is used (S281). Hereinafter, the prediction process is referred to as an in-block mode.

Inter prediction unit 115 performs the inter prediction process in which the feature point existing in the already-coded region in the surroundings of the target block is used (S282). Hereinafter, the prediction process is referred to as a surrounding block mode.

Inter prediction unit 115 performs the process similar to that in Step S123 on each of the prediction images generated in Steps S281 and S282, thereby selecting the technique having the higher coding efficiency (S283).

Figure 15:
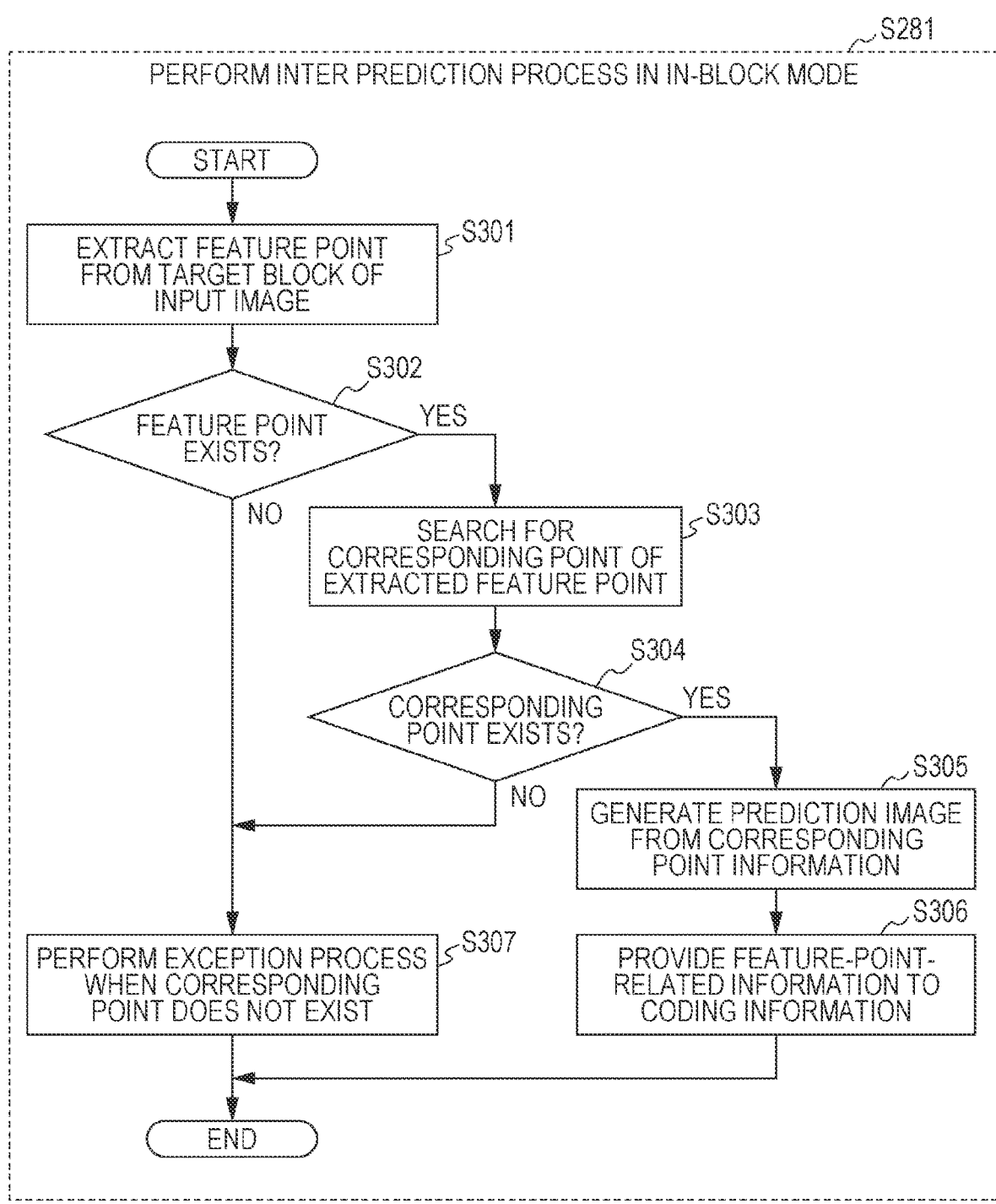
FIG. 15 is a flowchart illustrating an example of the in-block mode inter prediction process of the first exemplary embodiment.

The in-block mode inter prediction process in Step S281 will be described in detail below with reference to a flowchart in FIG. 15.

Because the processes in Steps S301, S302, S304, and S306 are similar to those in Steps S181, S182, S184, and S186, the detailed description is neglected.

When the feature point exists in the target block (Yes in S302), inter prediction unit 115 searches the corresponding point of the feature point in the target block extracted in Step S301 from the feature points that are extracted from at least one reference image in Step S112 (S303).

When the corresponding point exists in Step S303 (Yes in S304), inter prediction unit 115 generates the prediction image using a result obtained in Step S303 (S305).

Figure 16:
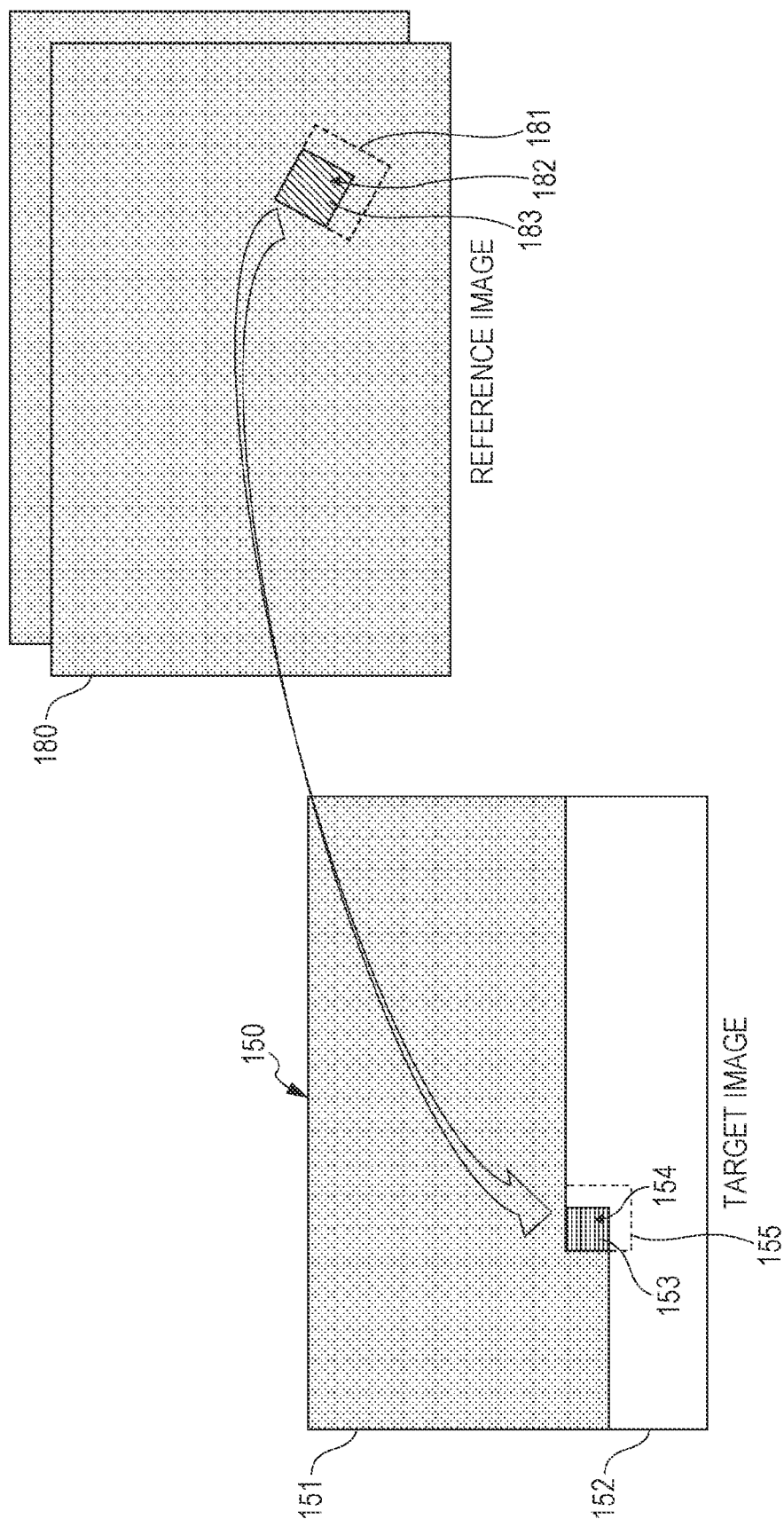
FIG. 16 is a view illustrating an example of the in-block mode prediction image generation process of the first exemplary embodiment.

FIG. 16 is a view illustrating this process, and illustrating target image 150 including target block 153 that is of the prediction process target and reference image 180 that is not target image 150 but the already-coded picture. Target image 150 is already coded, and includes already-coded region 151 where decoded block 129 is generated and uncoded region 152 where the coding is not performed.

Inter prediction unit 115 sets prediction target region 155 by the technique similar to the technique of setting prediction target region 155 in Step S185. Inter prediction unit 115 sets reference region 181 around corresponding point 182 obtained in Step S303 by the technique similar to the technique of setting reference region 157 in Step S185. Inter prediction unit 115 generates the prediction image from reference region 181 by the technique similar to that in Step S185. That is, inter prediction unit 115 generates the prediction image (prediction block) using the pixel information on reference block 183, which is included in reference region 181 and is the image located at the position corresponding to the position of target block 153 in prediction target region 155.

In Step S307, inter prediction unit 115 performs the processes similar to those in Steps S187 and S227 such that the technique in Step S281 is not selected in Step S283.

Figure 17:
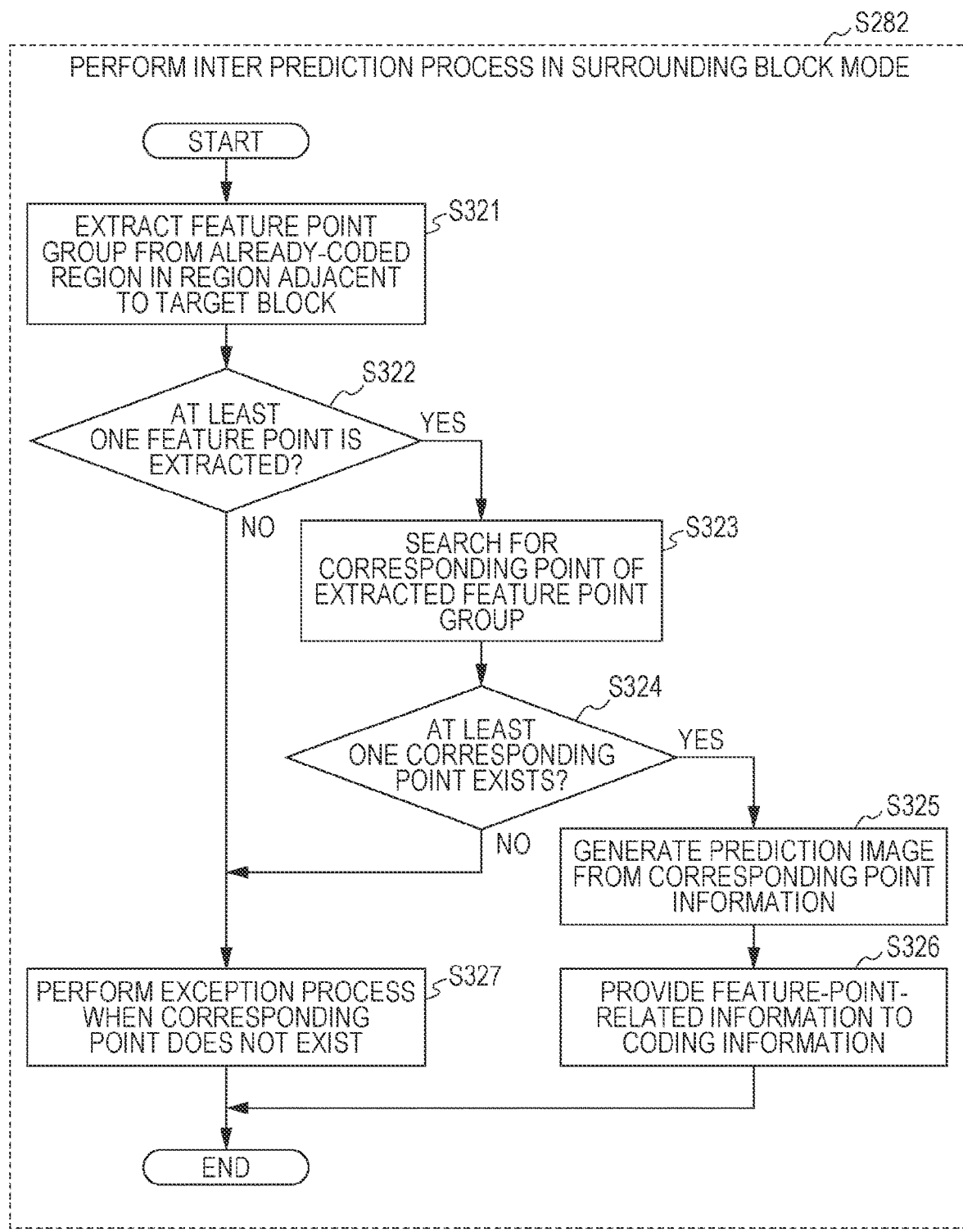
FIG. 17 is a flowchart illustrating an example of the surrounding block mode inter prediction process of the first exemplary embodiment.

The surrounding block mode inter prediction process in Step S282 will be described in detail below with reference to a flowchart in FIG. 17.

Because the processes in Steps S321, S322, S324, and S326 are similar to those in Steps S221, S222, S224, and S226, the detailed description is neglected.

When the feature point exists in the surrounding already-coded block in Step S322 (Yes in S322), inter prediction unit 115 searches the corresponding point in the feature points that are extracted from at least one reference image in Step S112 with respect to each of at least one feature point extracted in Step S321 (S323). When the corresponding point exists in Step S323 (Yes in S324), inter prediction unit 115 generates the prediction image using a result of the corresponding point obtained in Step S323 (S325).

Figure 18:
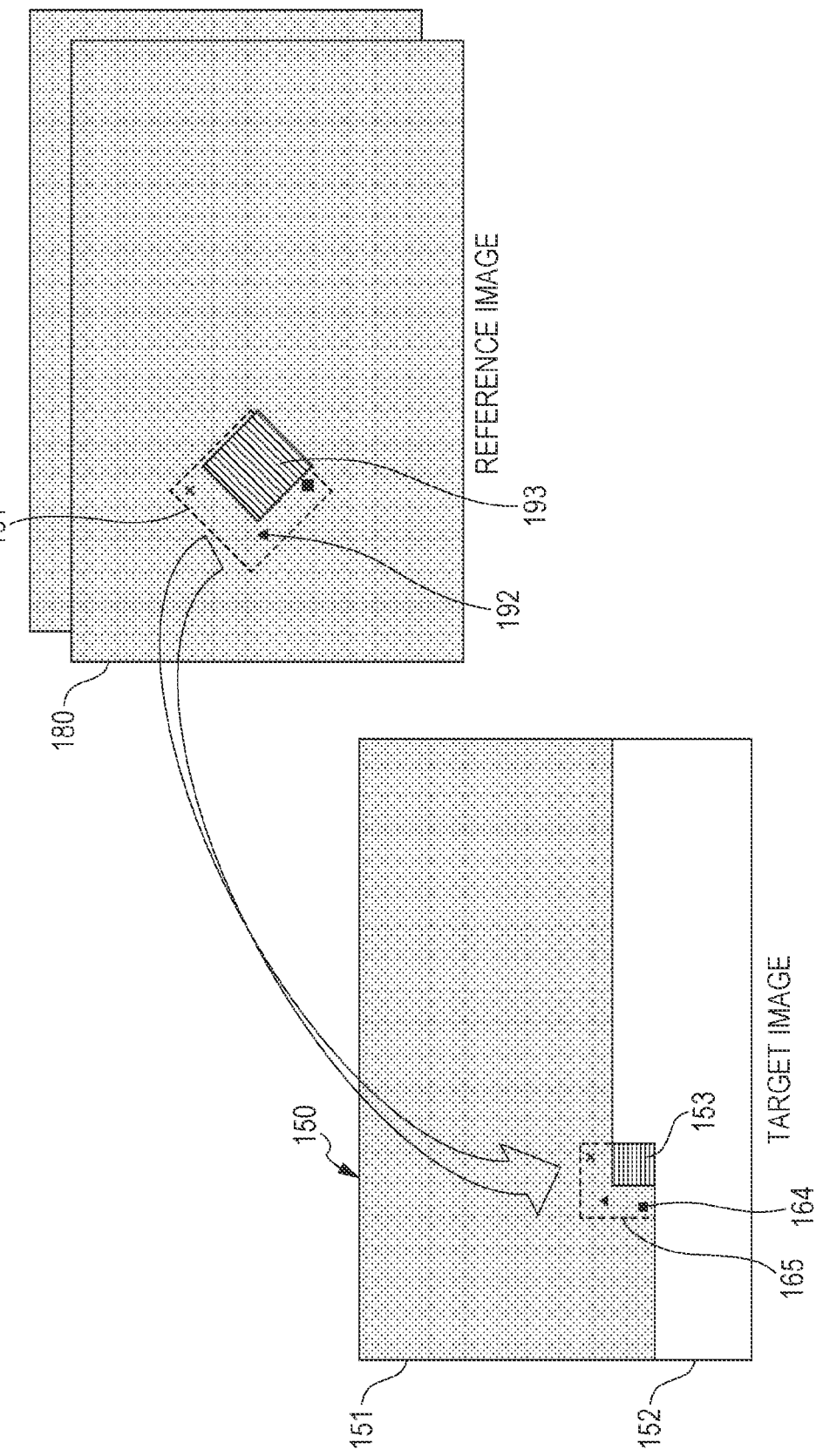
FIG. 18 is a view illustrating an example of the surrounding block mode prediction image generation process of the first exemplary embodiment.

FIG. 18 is a view illustrating this process, and illustrating target image 150 including target block 153 that is of the prediction process target and reference image 180 that is not target image 150 but the already-coded picture. Target image 150 is already coded, and includes already-coded region 151 where decoded block 129 is generated and uncoded region 152 where the coding is not performed.

Inter prediction unit 115 sets prediction target region 165 by the technique similar to the technique of setting prediction target region 165 in Step S225. Then, inter prediction unit 115 sets reference region 191 by the technique similar to the technique of setting reference region 167 in Step S225 using corresponding point 192 obtained in Step S323. Specifically, inter prediction unit 115 sets the region including corresponding point 192 of feature point 164 included in prediction target region 165 to reference region 191.

Then, inter prediction unit 115 generates the prediction image from reference region 191 by the technique similar to that in Step S225. Specifically, inter prediction unit 115 generates the prediction image (prediction block) using the pixel information on reference block 193, which is included in reference region 191 and is the image located at the position corresponding to the position of target block 153 in prediction target region 165.

In Step S327, inter prediction unit 115 performs the processes similar to those in Steps S187, S227, and S307 such that the technique in Step S282 is not selected in Step S283.

As described in Step S201, the information necessary to search the corresponding point in Step S321 may be an index that can uniquely decide the corresponding point from the feature point group (feature points extracted from the whole already-coded region) including the corresponding point.

Advantageous Effect

As described above, according to the first exemplary embodiment, the prediction image pursuant to higher-order motion information such as the rotation and the enlargement can be generated with an information quantity less than that of the existing technique in the intra prediction and the inter prediction by applying the technology concerning the local feature quantity.

In the first exemplary embodiment, by way of example, SIFT is described as the feature quantity extraction technique used in Steps S101, S109, and S112. However, the feature quantity and the feature quantity extraction technique are not limited to SIFT. For example, ORB or SURF (Speeded Up Robust Features) that is of another technology concerning the local feature quantity may be used.

The feature point extraction technique may be different from the feature quantity calculation technique. Specifically, each technique has a different characteristic such that the processing quantity is small, or such that the technique is robust to the affine transform in addition to the scaling. Therefore, the coding efficiency can be improved by changing the local feature quantity and the local feature quantity extraction technique used according to a kind of the video image to be coded.

In Steps S202 to S205, the rotation quantity and scale value of the feature point are cited as an example of the detailed information on the feature point in addition to the coordinate. However, the information that can be used as the detailed information is not limited to the rotation quantity and scale value and the coordinate.

It is not always necessary to code the above pieces of information. For example, FAST that is a technique of extracting only the position of the feature point is not robust to the scaling and the rotation. Therefore, it is not necessary for image coding apparatus 100 to code the pieces of information. Thus, image coding apparatus 100 can code the information necessary to generate the prediction image by changing the information that is coded according to the feature quantity used.

Not one feature point but the plurality of feature points may be extracted in Steps S181 and S301. In this case, image coding apparatus 100 may generate the prediction image using the pieces of information on the plurality of feature points. Therefore, the coding efficiency is improved because the quality of the generated prediction image is improved. In Steps S161 and S281, image coding apparatus 100 searches corresponding point of each feature point (S183 and S303), generates the prediction image using the relationship between the plurality of feature points and the plurality of corresponding points (S185 and S305), and provides the information on each feature point to the coding information (S186 and S306), which allow this process to be performed. For example, image coding apparatus 100 can search the plurality of corresponding points corresponding to the plurality of feature points through the process similar to that in FIGS. 10 and 18, and decide the reference region and reference block including the plurality of corresponding points. The prediction image generation process in which the relationship between the plurality of feature points and the plurality of corresponding points is used is not limited to the above technique.

In the first exemplary embodiment, by way of example, the above technique is used in both the inter prediction and the intra prediction. Alternatively, the above technique may be used only in one of the inter prediction and the intra prediction. In the first exemplary embodiment, both the prediction process (inter prediction or intra prediction) in which the feature point in the target block is used and the prediction process (inter prediction or intra prediction) in which the feature point in the surroundings of the target block is used are described by way of example. Alternatively, only one of the prediction process (inter prediction or intra prediction) in which the feature point in the target block is used and the prediction process (inter prediction or intra prediction) in which the feature point in the surroundings of the target block is used may be used.

In the first exemplary embodiment, the corresponding point is selected in the feature points included in the reconstructed image (decoded block 129 or decoded image 131). Alternatively, the corresponding point may be selected in the feature points included in input image 121. For example, image coding apparatus 100 may search the corresponding point in the feature points included in input image 121 in the case that the corresponding point does not exist in the reconstructed image.

Second Exemplary Embodiment

Modifications of image coding apparatus 100 and the image coding method of the first exemplary embodiment will be described in a second exemplary embodiment.

Because the processes except the usual inter prediction process in which the motion information in Step S261 is used are similar to those of the first exemplary embodiment, the description except that in Step S261 is neglected.

Figure 19:
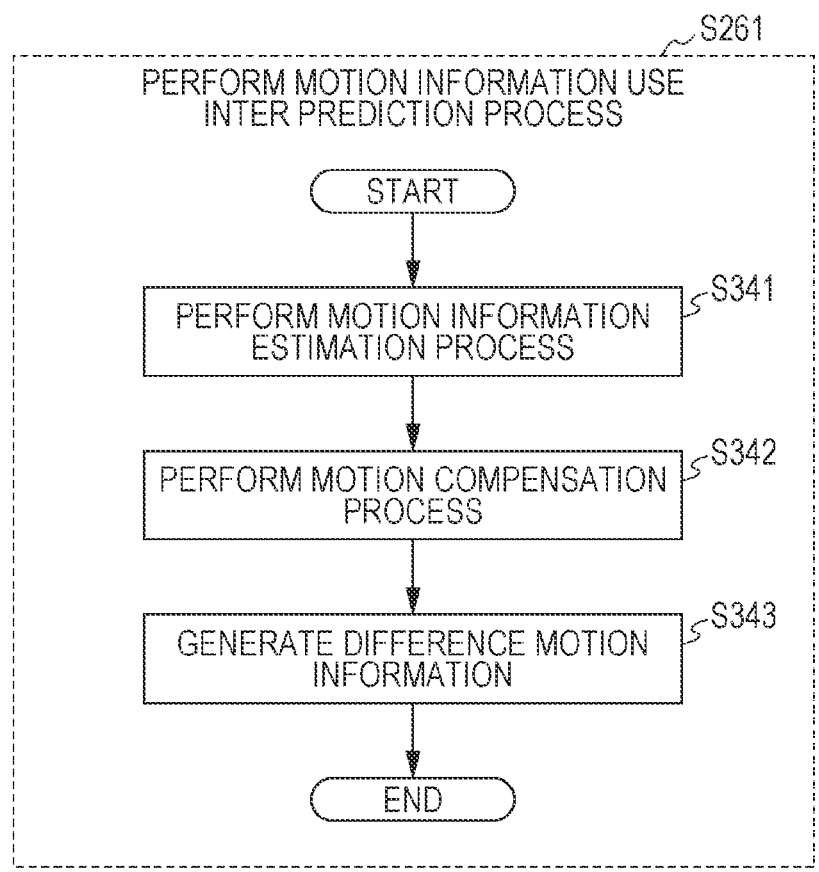
FIG. 19 is a flowchart illustrating an example of a motion information use inter prediction process according to a second exemplary embodiment.

The detailed inter prediction process in which the motion information is used in Step S261 will be described with reference to a flowchart in FIG. 19.

Inter prediction unit 115 performs a motion information estimation process (S341). Inter prediction unit 115 performs a motion compensation process using the motion information obtained in Step S341 (S342). Then, inter prediction unit 115 generates a difference motion information that is of a difference between prediction motion information that is of the motion information on the already-coded temporal or spatial adjacent block and the motion information decided in Step S342 (S343).

Figure 20:
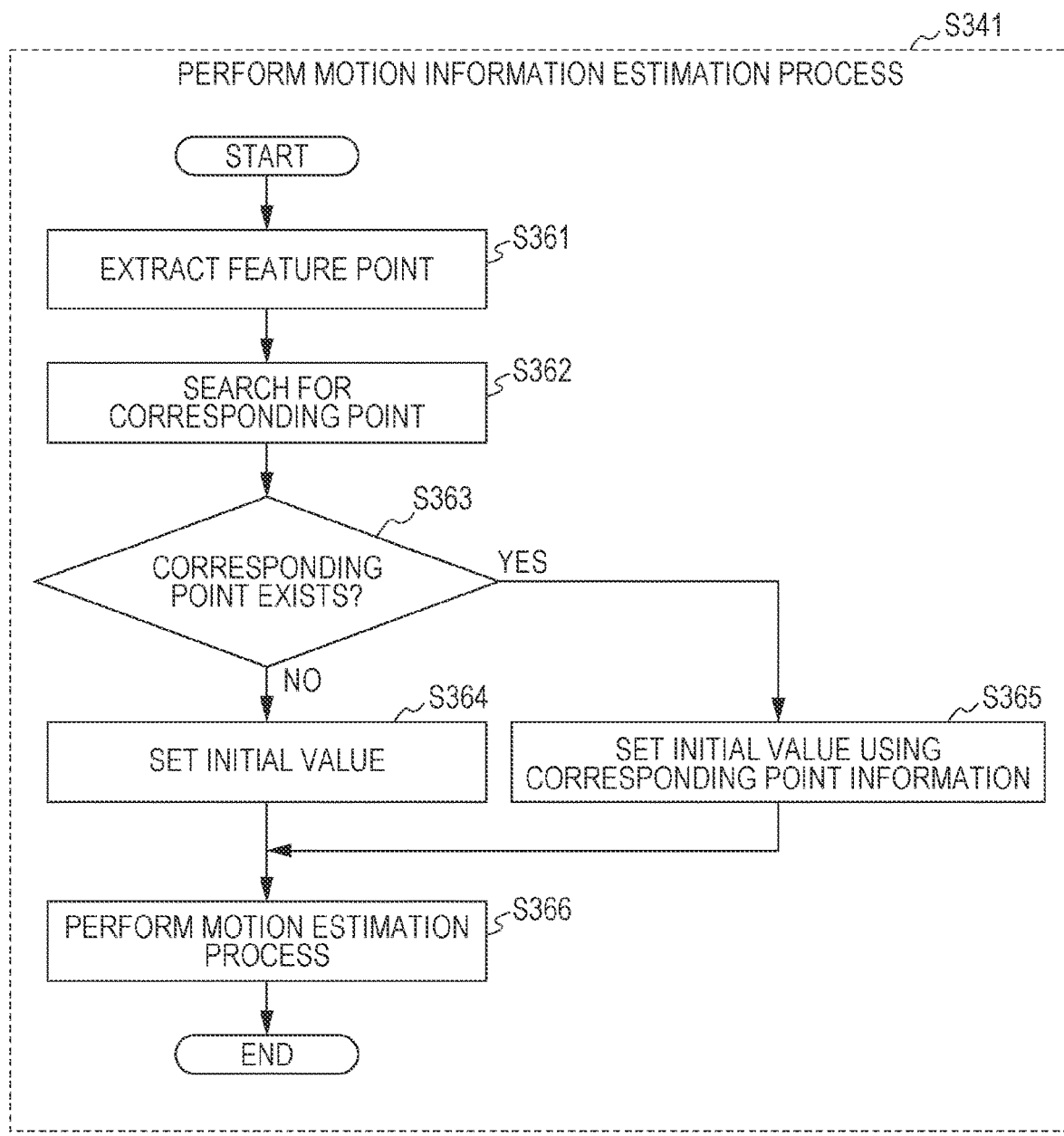
FIG. 20 is a flowchart illustrating an example of a motion estimation process of the second exemplary embodiment.

The motion information prediction process in Step S341 will be described in detail with reference to a flowchart in FIG. 20.

Inter prediction unit 115 extracts the feature point included in the target block in the feature points extracted from the input image in Step S101 (S361). Inter prediction unit 115 searches the corresponding point corresponding to the feature point extracted in Step S361 from the set of feature points that are extracted in Step S101 at the time when the reference image used in the inter prediction is the input image (S362). The detailed process is similar to the search process described in the first exemplary embodiment except that the feature point used is different.

When the corresponding point is successfully searched in Step S362 (Yes in S363), inter prediction unit 115 sets the initial value of the motion estimation process using the corresponding point information (S365). At this point, not only the parallel translation component but also the information on the rotation quantity and the scaling can be acquired from the relationship of the corresponding point obtained by the local feature quantity extraction technique such as SIFT and ORB, so that the initial values concerning the parallel translation component and the information on the rotation quantity and the scaling can be set.

On the other hand, when the search of the corresponding point fails in Step S362 (No in S363), inter prediction unit 115 sets a defined value to the initial value of the motion estimation process (S364). For example, the parallel translation component has the defined value of 0, and the scaling parameter has the defined value of 1. Inter prediction unit 115 may roughly estimate low-order information, and use an estimation result as the initial value of the high-order motion information estimation process. For example, inter prediction unit 115 sets the estimation result of the information on the two-dimensional parallel translation vector to the initial value in estimating the motion information on the six-dimensional affine transform.

Inter prediction unit 115 performs a motion estimation process using the initial value set in Step S364 or S365 (S366).

Advantageous Effect

As described above, according to the second exemplary embodiment, the use of the relationship of the corresponding point of the feature quantity can effectively set the initial value with respect to the process of estimating the high-order motion information including the affine transform. Therefore, speed of the motion information estimation process can be enhanced, and the quality of the prediction image in which the estimation result is used can be improved.

In the process in Step S362, inter prediction unit 115 may search the corresponding point on the set of feature points that are extracted from the decoded reference image in Step S112. Therefore, the necessity to store the feature point set information obtained in the input image is eliminated, and a memory quantity can be reduced during the process.

In the second exemplary embodiment, by way of example, the process of the second exemplary embodiment is performed in addition to the technique of the first exemplary embodiment. Alternatively, only the processes concerning the second exemplary embodiment may be performed.

Third Exemplary Embodiment

In a third exemplary embodiment, an image decoding apparatus that decodes a bitstream generated by the image coding apparatus 100 will be described.

Figure 21:
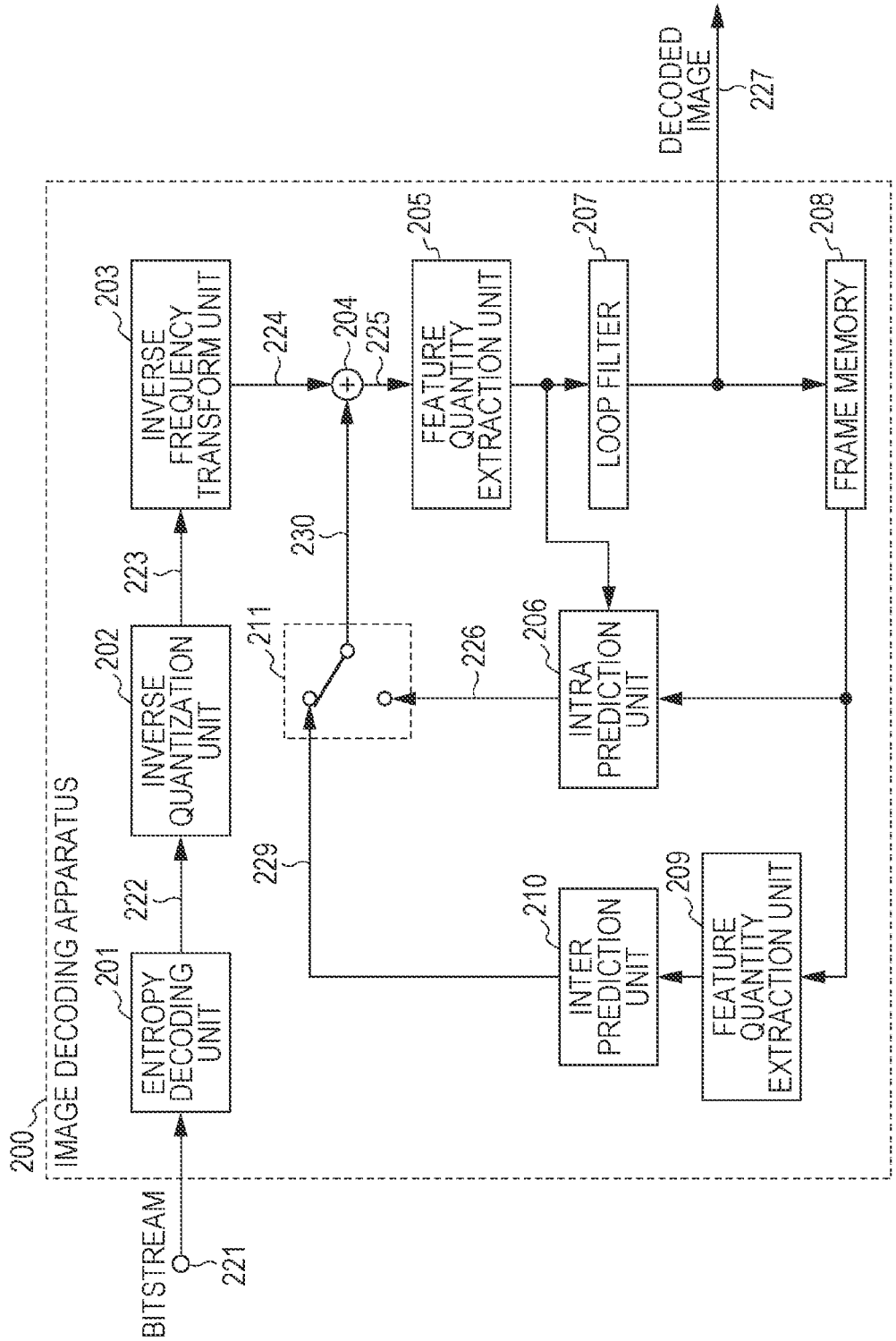
FIG. 21 is a block diagram illustrating a configuration of an image decoding apparatus according to a third exemplary embodiment.

FIG. 21 is a block diagram illustrating an example of image decoding apparatus 200 of the third exemplary embodiment. Image decoding apparatus 200 includes entropy decoding unit 201, inverse quantization unit 202, inverse frequency transform unit 203, adder 204, feature quantity extraction unit 205, intra prediction unit 206, loop filter 207, frame memory 208, feature quantity extraction unit 209, inter prediction unit 210, and switching unit 211.

Image decoding apparatus 200 generates decoded image 227 by performing a decoding process on input bitstream 221. For example, bitstream 221 is generated by image coding apparatus 100. The various pieces of information included in bitstream 221 have the same meanings as the first exemplary embodiment.

Figure 22:
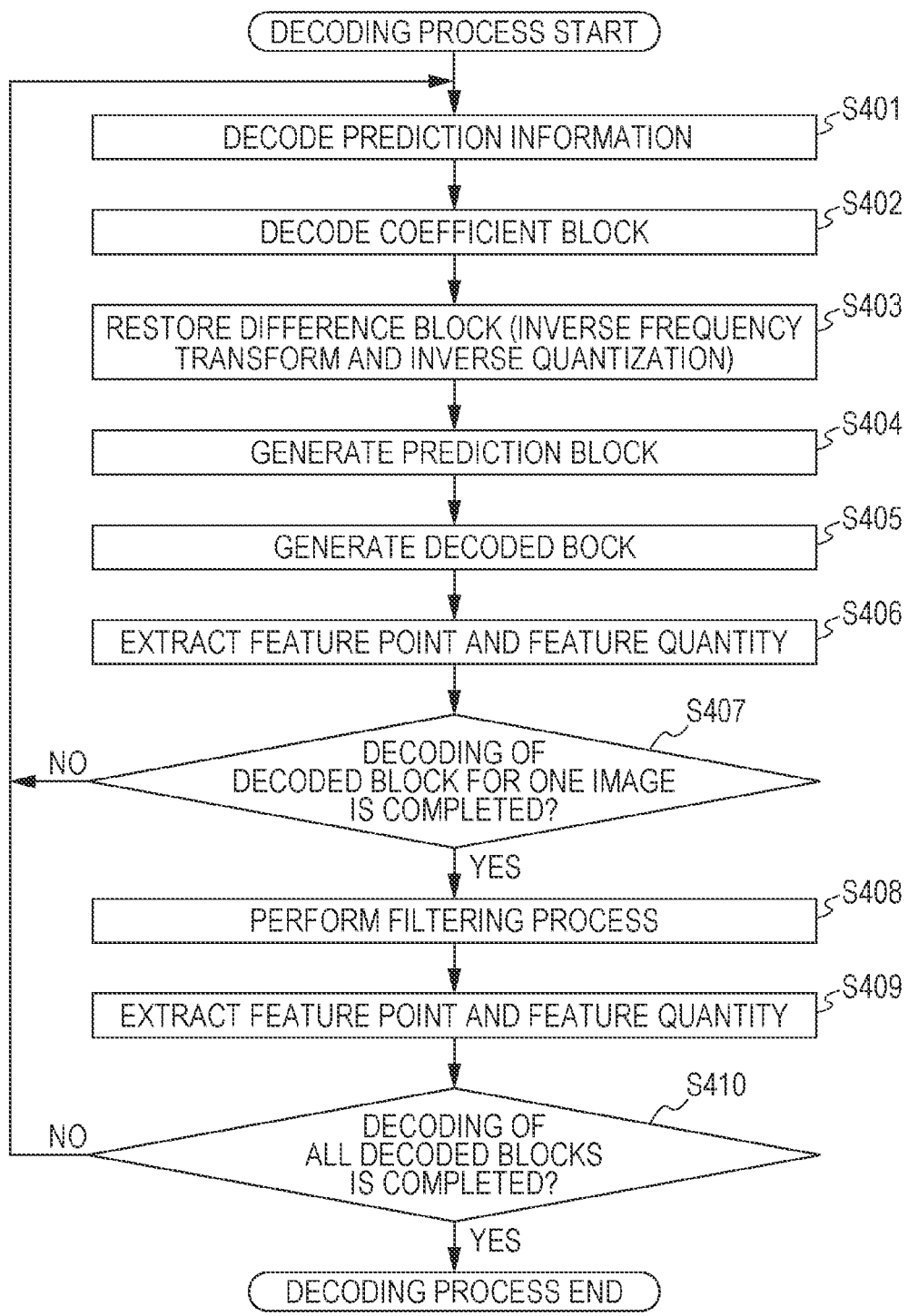
FIG. 22 is a flowchart illustrating an example of an image decoding process of the third exemplary embodiment.

FIG. 22 illustrates a flowchart of an image coding process performed by image decoding apparatus 200 of the third exemplary embodiment.

Entropy decoding unit 201 decodes prediction information from bitstream 221 that is obtained by coding the still or video image including at least one picture (S401). Entropy decoding unit 201 decodes coefficient block 222 from bitstream 221 (S402).

Then the inverse quantization unit 202 performs inverse quantization on the coefficient block 222 to generate a coefficient block 223. Inverse frequency transform unit 203 performs the inverse frequency transform on coefficient block 223 to restore difference block 224 (S403).

Then, intra prediction unit 206 or inter prediction unit 210 generates prediction block 230 using the prediction information decoded in Step S401 and decoded block 225 or decoded image 227 (S404). Specifically, intra prediction unit 206 generates prediction block 226 through the intra prediction process. Inter prediction unit 210 generates prediction block 229 through the inter prediction process. Switching unit 211 outputs one of the prediction blocks 226 and 229 as prediction block 230.

Adder 204 adds prediction block 224 obtained in Step S403 and prediction block 230 obtained in Step S404 to generate decoded block 225 (S405). Decoded block 225 is used in the intra prediction process performed by intra prediction unit 206.

Feature quantity extraction unit 205 extracts the feature point and the feature quantity of the feature point from a set of decoded blocks 225 decoded in Steps by S405 (S406). The extracted feature point and feature quantity are used in the intra prediction. The detailed process is similar to the process in Step S109.

Then, image decoding apparatus 200 determines whether decoded blocks 225 for one image are decoded (S407). When the decoding process for one image is not completed (No in S407), image decoding apparatus 200 performs the processes from Step S401 in order to perform the next block decoding process.

On the other hand, when the decoding of decoded block 225 for one image is completed (Yes in S407), loop filter 207 performs the filtering process on the decoded image (S408). Specifically, loop filter 207 performs the filtering process such as the deblocking filter on the plurality of decoded blocks 225 included in the one image in order to relieve the image quality degradation caused by the block deformation, and generates decoded image 227.

The frame memory 208 stores the decoded image 227 therein. The decoded image 227 is used in the inter prediction process performed by the inter prediction unit 210.

Feature quantity extraction unit 209 extracts the feature point and the feature quantity of the feature point from decoded image 227 (S409). The detailed process is similar to the process in Step S111.

Image decoding apparatus 200 determines whether all blocks included in input bitstream 221 are decoded (S410). Specifically, image decoding apparatus 200 determines that all the blocks are decoded when input bitstream 221 is ended.

When all the blocks are not decoded (No in S410), image decoding apparatus 200 performs the processes from Step S401 in order to perform the next block decoding process. On the other hand, when all the blocks are decoded (Yes in S410), image decoding apparatus 200 ends the decoding process.

The inverse quantization and inverse frequency transform in Step S403 may sequentially be performed as a separate process or collectively be performed. According to currently dominant coding standards such as HEVC, the inverse quantization and the inverse frequency transform are collectively performed. Similarly to the first exemplary embodiment, sometimes expressions such as scaling are used on the decoding side in the inverse quantization process and the inverse frequency transform process.

Figure 23:
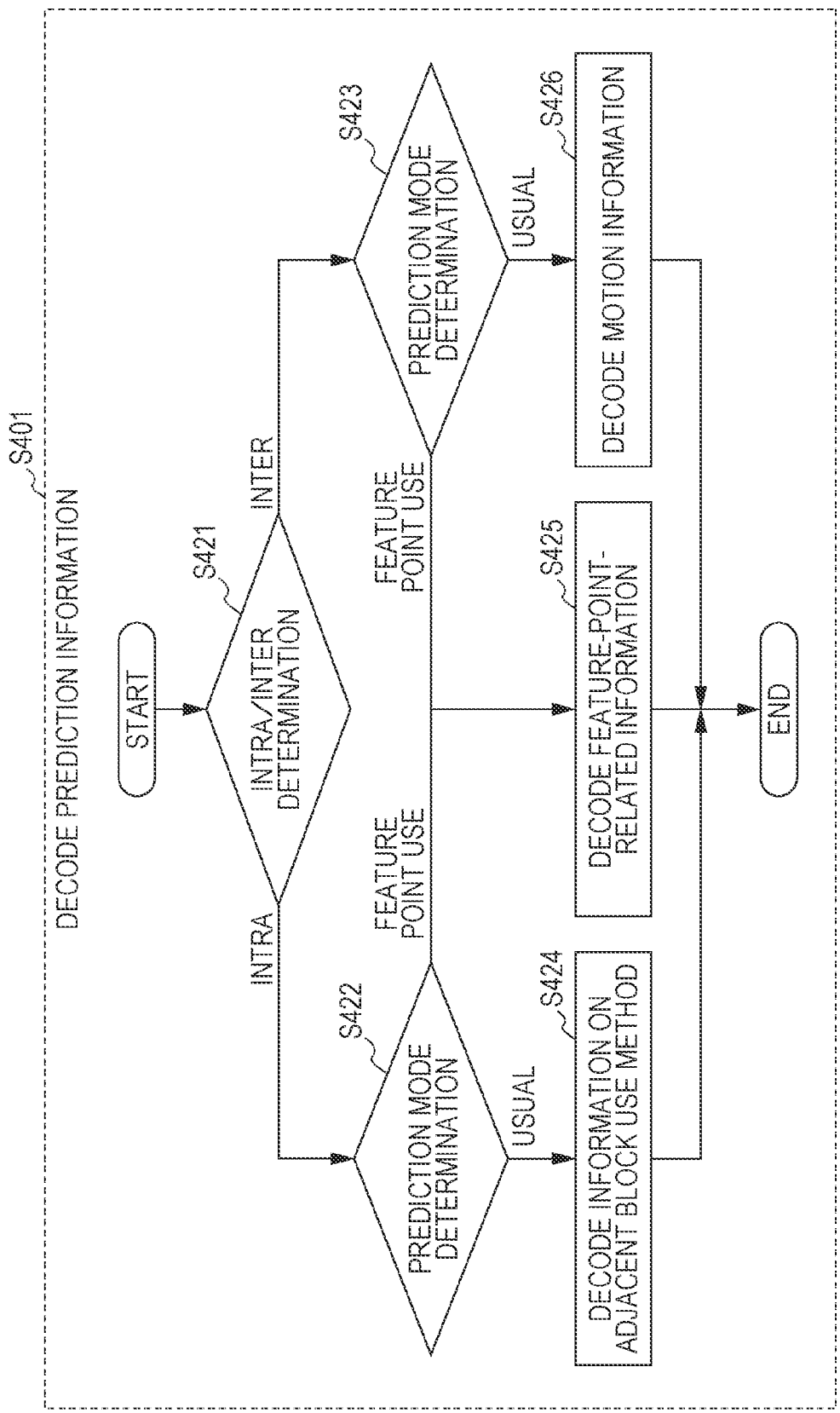
FIG. 23 is a flowchart illustrating an example of a prediction information decoding process of the third exemplary embodiment.

The prediction information decoding process in Step S401 will be described in detail below with reference to a flowchart in FIG. 23.

Image decoding apparatus 200 determines whether the method for predicting the target block that is of the target of the block to be decoded is the intra prediction or the inter prediction (S421).

When the prediction technique is determined to be the intra prediction ("INTRA" in S421), image decoding apparatus 200 determine whether the prediction mode in the intra prediction is the usual intra prediction in which the pixel information on the already-decoded adjacent block is used or the feature point use intra prediction in which the feature point is used (S422).

When the prediction mode is the usual intra prediction ("USUAL" in S422), image decoding apparatus 200 decodes information on an adjacent block use method from bitstream 221 (S424). As used herein, the adjacent block use method means information indicating an intra prediction direction in H.265/HEVC.

On the other hand, when the prediction mode feature point is the feature point use intra prediction in which the feature point is used ("FEATURE POINT USE" in S422), image decoding apparatus 200 decodes the feature-point-related information that is of the information on the feature point from bitstream 221 (S425).

When the prediction mode is determined to be the inter prediction in Step S421 ("INTER" in S421), image decoding apparatus 200 determines whether the prediction mode in the inter prediction is the usual inter prediction in which the motion information is used or the feature point use inter prediction in which the feature point is used (S423).

When the prediction mode is the usual intra prediction ("USUAL" in S423), image decoding apparatus 200 decodes the motion information from bitstream 221 (S426). As used herein, the motion information means a parallel translation vector and a high-order affine transform matrix, which are used in video coding schemes typified by H.265/HEVC.

On the other hand, when the prediction mode is the feature point use inter prediction ("FEATURE POINT USE" in S423), image decoding apparatus 200 decodes the feature-point-related information on the feature point from bitstream 221 (S425).

The feature-point-related information decoding process in Step S425 may be performed by different processors according to the intra prediction and the inter prediction. Therefore, in the case that the intra prediction process and the inter prediction process are simultaneously performed, because the process in Step S425 can be performed in parallel, the processing speed can be enhanced.

For example, the determination processes in Steps S421 to S423 are performed based on the pieces of information included in bitstream 221. Specifically, for example, bitstream 221 includes the information indicating whether the prediction mode is the intra prediction or the inter prediction. Bitstream 221 also includes the information indicating whether the prediction mode is the usual intra prediction or the feature point use intra prediction and the information indicating whether the prediction mode is the usual inter prediction or the feature point use inter prediction.

The feature-point-related information decoding process in Step S425 will be described in detail below with reference to a flowchart in FIG. 24.

Image decoding apparatus 200 determines which mode feature-point-related information is coded (S441). When the in-block mode feature-quantity-related information that is of the information on the feature point existing in the target block is coded ("IN-BLOCK" in S441), image decoding apparatus 200 decodes the in-block mode feature-quantity-related information from bitstream 221 (S442).

On the other hand, when the surrounding block mode feature-point-related information that is of the information on the feature point included in the already-decoded block in the surroundings of the target block is coded ("SURROUNDING BLOCK" in S441), image decoding apparatus 200 decodes the surrounding block mode feature-point-related information from bitstream 221 (S443).

In Step S441, image decoding apparatus 200 performs the determination process by referring to a flag that is included in bitstream 221 to indicate the in-block mode or the surrounding block mode. The flag may be coded in units of blocks or units of images or video images. In the case that the flag is coded in units of blocks, the quality of the prediction image is improved because the optimum coding mode can be selected. In the case that the flag is coded in units of images, the coding quantity is reduced because the number of flags decreases.

Figure 24:
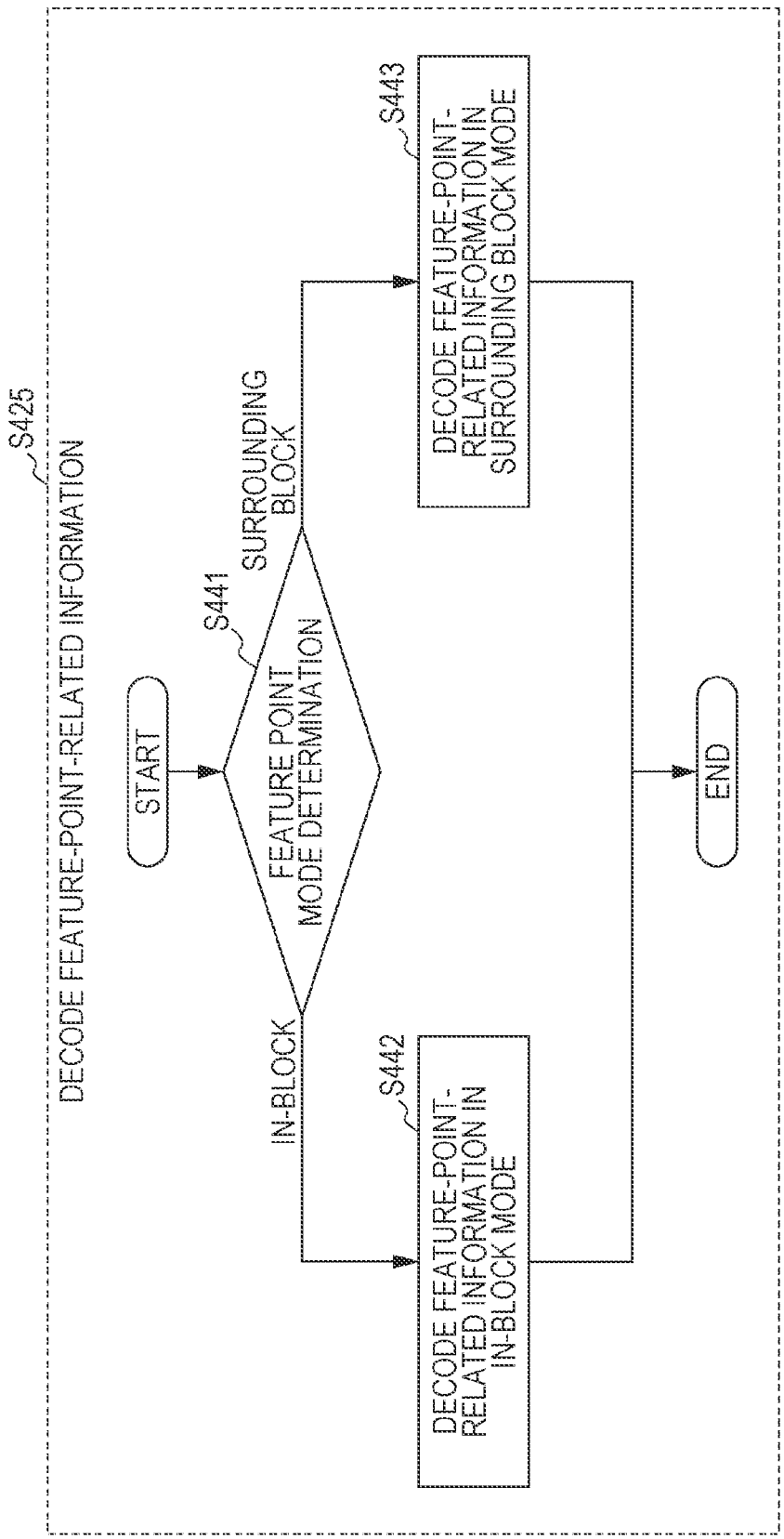
FIG. 24 is a flowchart illustrating an example of a feature-point-related information decoding process of the third exemplary embodiment.

In the feature-point-related information decoding process of FIG. 24, two modes are switched by way of example. Alternatively, one of the in-block mode and the surrounding block mode may be always used.

Figure 25:
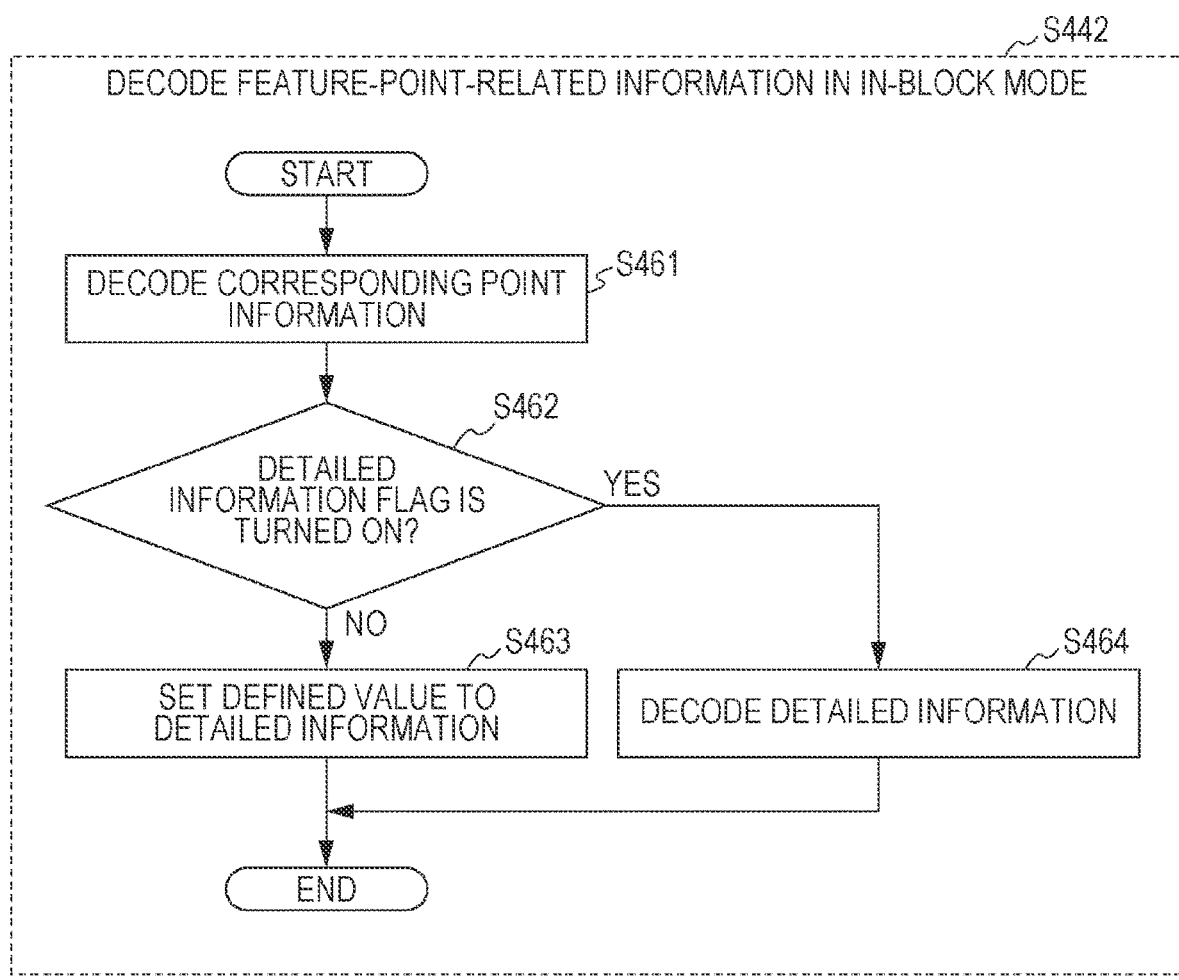
FIG. 25 is a flowchart illustrating an example of the in-block mode feature-point-related information decoding process of the third exemplary embodiment.

The in-block mode feature-point-related decoding process in Step S442 will be described in detail with reference to a flowchart in FIG. 25. At this point, the in-block mode feature-point-related information includes the corresponding point information that is of the information on the corresponding point and the feature point information that is of the information on the feature point in the target block.

Image decoding apparatus 200 decodes the corresponding point information deciding the corresponding point of the feature point in the target block from bitstream 221 (S461). Specifically, the corresponding point information is the information indicating the coordinate of the corresponding point.

Image decoding apparatus 200 determines whether the detailed information flag indicating that bitstream 221 includes the detailed information on the feature point is turned on (S462). The detailed information flag is included in bitstream 221.

When the detailed information flag is turned off (No in S462), image decoding apparatus 200 sets the defined value to the detailed information (S463).

On the other hand, when the detailed information flag is turned on (Yes in S462), image decoding apparatus 200 decodes the detailed information from bitstream 221 (S464).

As used herein, the detailed information means the information indicating the coordinate of the feature point included in the target block during the coding and the rotation quantity and scale value of the feature point.

Specifically, the detailed information indicating the coordinate of the feature point is a two-dimensional vector in x- and y-directions indicating the position of the feature point from the center of the target block. The rotation quantity and the scale value are values calculated by local feature quantity extraction techniques such as SIFT. The information on the coordinate of the feature point in the target block and the rotation quantity and scale value of the feature point and the information on the feature point that becomes the corresponding point are decoded through these processes.

Relative values between the rotation quantity and scale value of the feature quantity and the rotation quantity and scale value of the corresponding point may be coded as the rotation quantity and scale value of the feature quantity. Therefore, in the case that the feature point is identical to the corresponding point in the rotation quantity or scale value, because the information to be coded becomes 0, the coding efficiency is improved. A flag indicated which one of the calculated value and the relative value is used may be coded. Therefore, the coding efficiency is further improved because the optimum coding technique can be selected in each block.

For example, the defined value in Step S463 is the center of the target block in the coordinate of the feature point, 0 degree in the rotation quantity, and 1 in the scale value.

The defined value is not limited to the above values. For example, a rotation angle and a scale factor, which are obtained from global motion information, may be used to set the rotation quantity and scale value of the feature point, respectively. Therefore, the use of the image deformation associated with global motion can reduce the coding quantity compared with the case that the fixed value is used.

Figure 26:
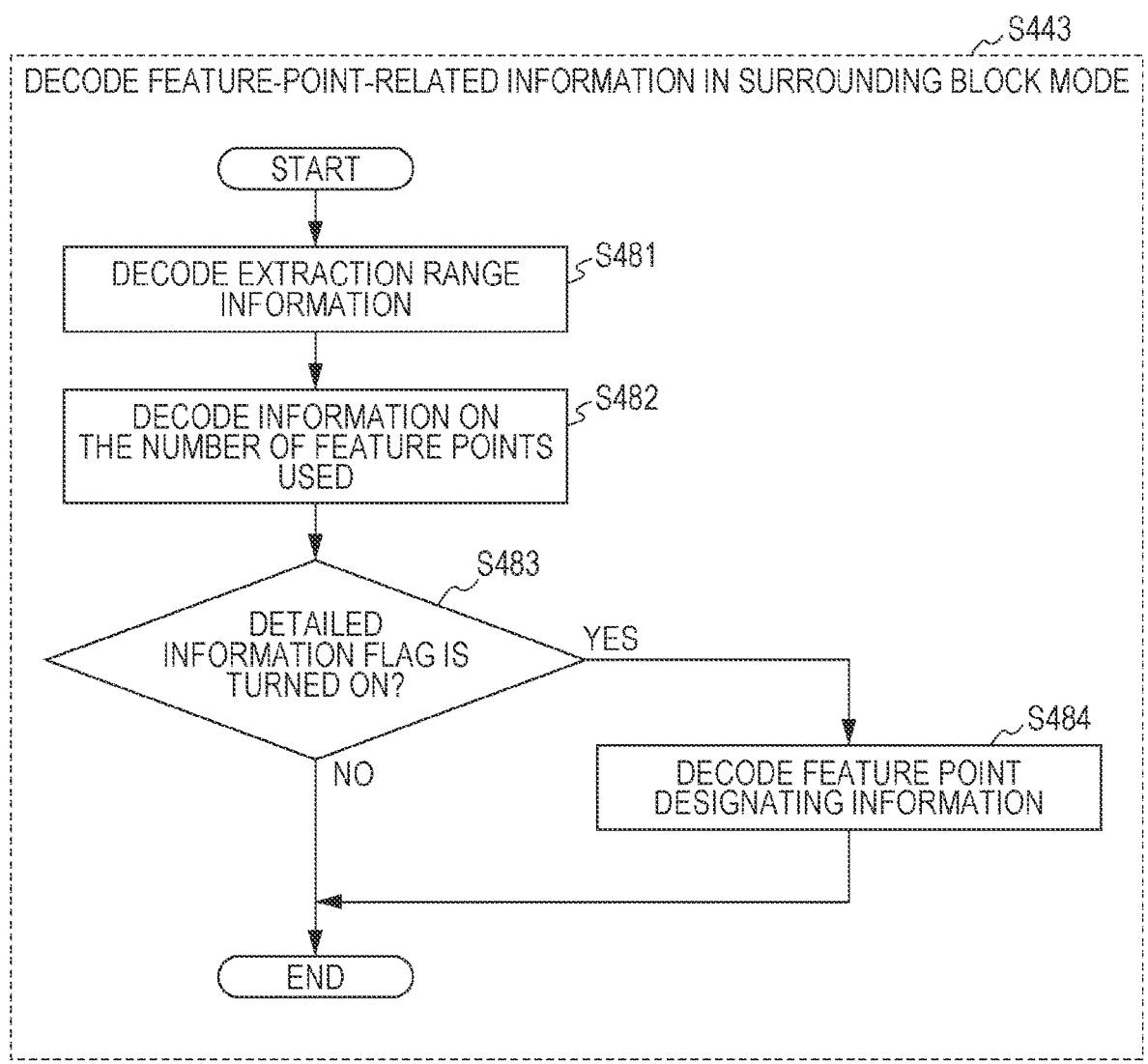
FIG. 26 is a flowchart illustrating an example of the surrounding block mode feature-point-related information decoding process of the third exemplary embodiment.

The surrounding block mode feature-point-related decoding process in Step S443 will be described in detail below with reference to a flowchart in FIG. 26.

Image decoding apparatus 200 decodes the extraction range information that is of the information necessary to set an extraction region where the feature point is extracted (S481). Image decoding apparatus 200 decodes the number information indicating the number of feature points used in generating the prediction image (S482).

Image decoding apparatus 200 determines whether the detailed information flag indicating that the detailed information on the feature point exists is turned on (S483).

When the detailed information flag is turned on (Yes in S483), image decoding apparatus 200 decodes the feature point designating information necessary to identify the feature point used during the prediction image generation (S484). For example, the feature point designating information indicates the coordinate of the feature point.

The extraction region in the surroundings of the target block that is of the feature point extraction target, the number of feature points used to generate the prediction image, and the information designating the feature point used are decoded through these processes.

The feature point designating information is not necessarily the coordinate information on the feature point, but any information capable of uniquely identifying the feature point may be used as the feature point designating information. For example, the feature point designating information may indicate the order when the feature point extracted in the extraction region are ranked using an edge intensity or a luminance component. For the use of the order, the coding quantity can be reduced because the feature quantity can be designated by one-dimensional information and a small numeric character.

Figure 27:
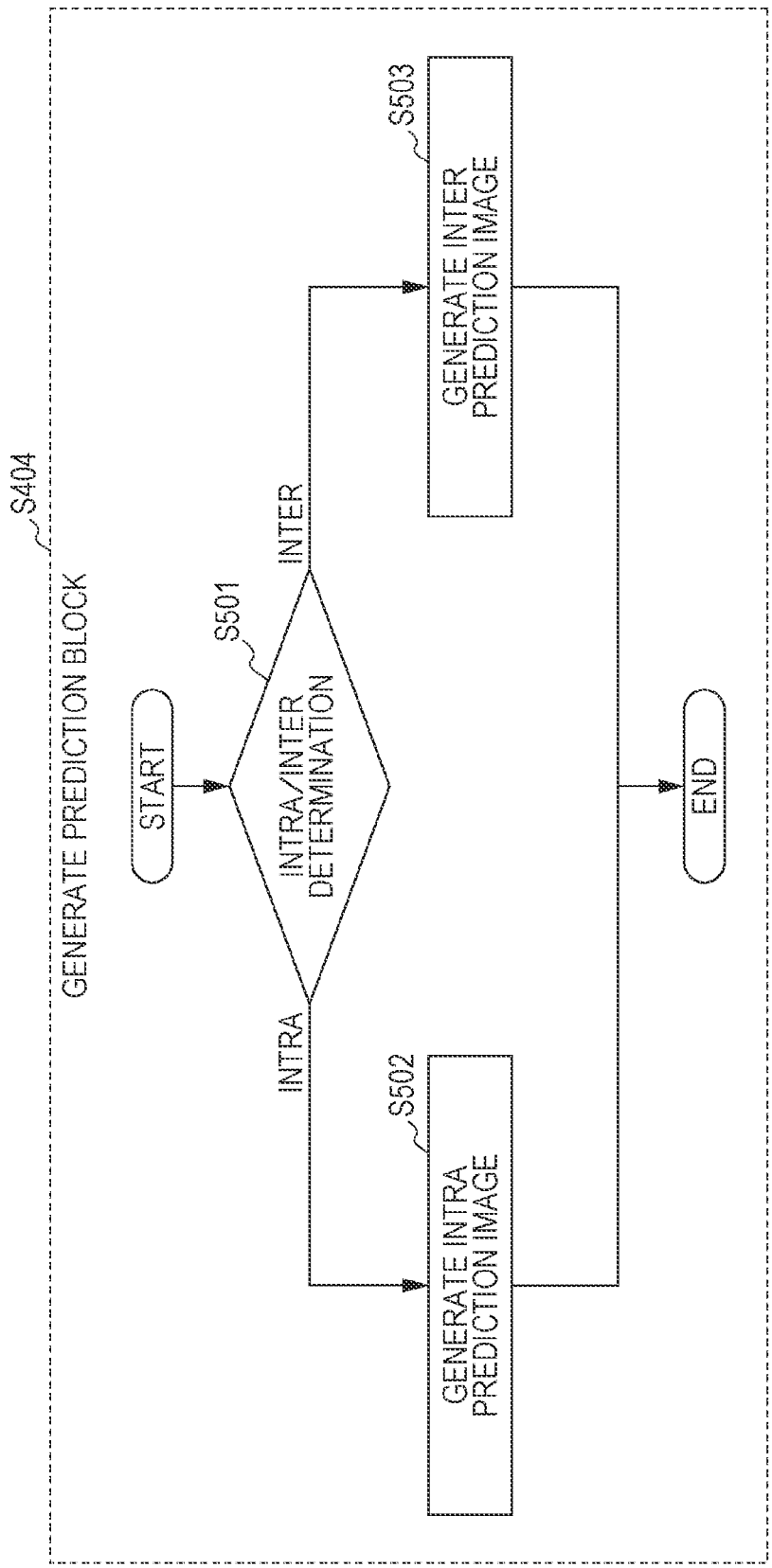
FIG. 27 is a flowchart illustrating an example of a prediction block generation process of the third exemplary embodiment.

The prediction block generation process in Step S404 will be described in detail below with reference to a flowchart in FIG. 27.

Image decoding apparatus 200 determines which one of the intra prediction and the inter prediction is used in the prediction block generation process (S501). Similarly to Step S421, the determination in Step S501 is performed using the information included in bitstream 221.

When the intra prediction is used ("INTRA" in S501), image decoding apparatus 200 generates the prediction block through the intra prediction process (S502). On the other hand, when the inter prediction is used ("INTER" in S501), image decoding apparatus 200 generates the prediction block through the inter prediction process (S503).

Figure 28:
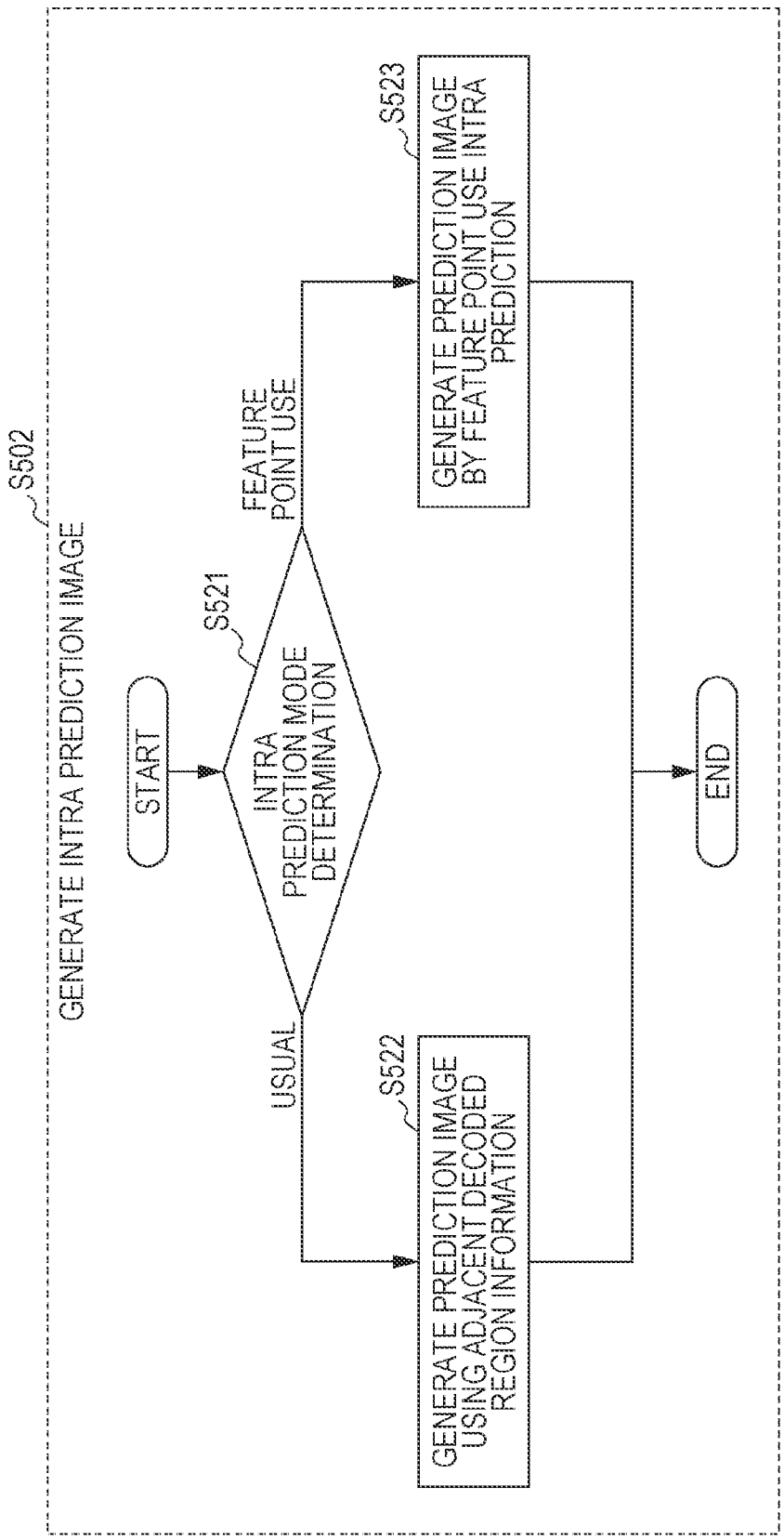
FIG. 28 is a flowchart illustrating an example of an intra prediction image generation process of the third exemplary embodiment.

The detailed intra prediction process in Step S502 will be described below with reference to a flowchart in FIG. 28.

Image decoding apparatus 200 determines whether the prediction mode in the intra prediction is the usual intra prediction or the feature point use intra prediction (S521). Similarly to Step S422, the determination in Step S521 is performed using the information included in bitstream 221.

When the prediction mode is the usual intra prediction ("USUAL" in S521), image decoding apparatus 200 generates the prediction image by performing the intra prediction process used in H.265/HEVC (S522). On the other hand, when the prediction mode is the feature point use intra prediction ("FEATURE POINT USE" in S521), image decoding apparatus 200 generates the prediction image by the feature point use intra prediction (S523).

Figure 29:
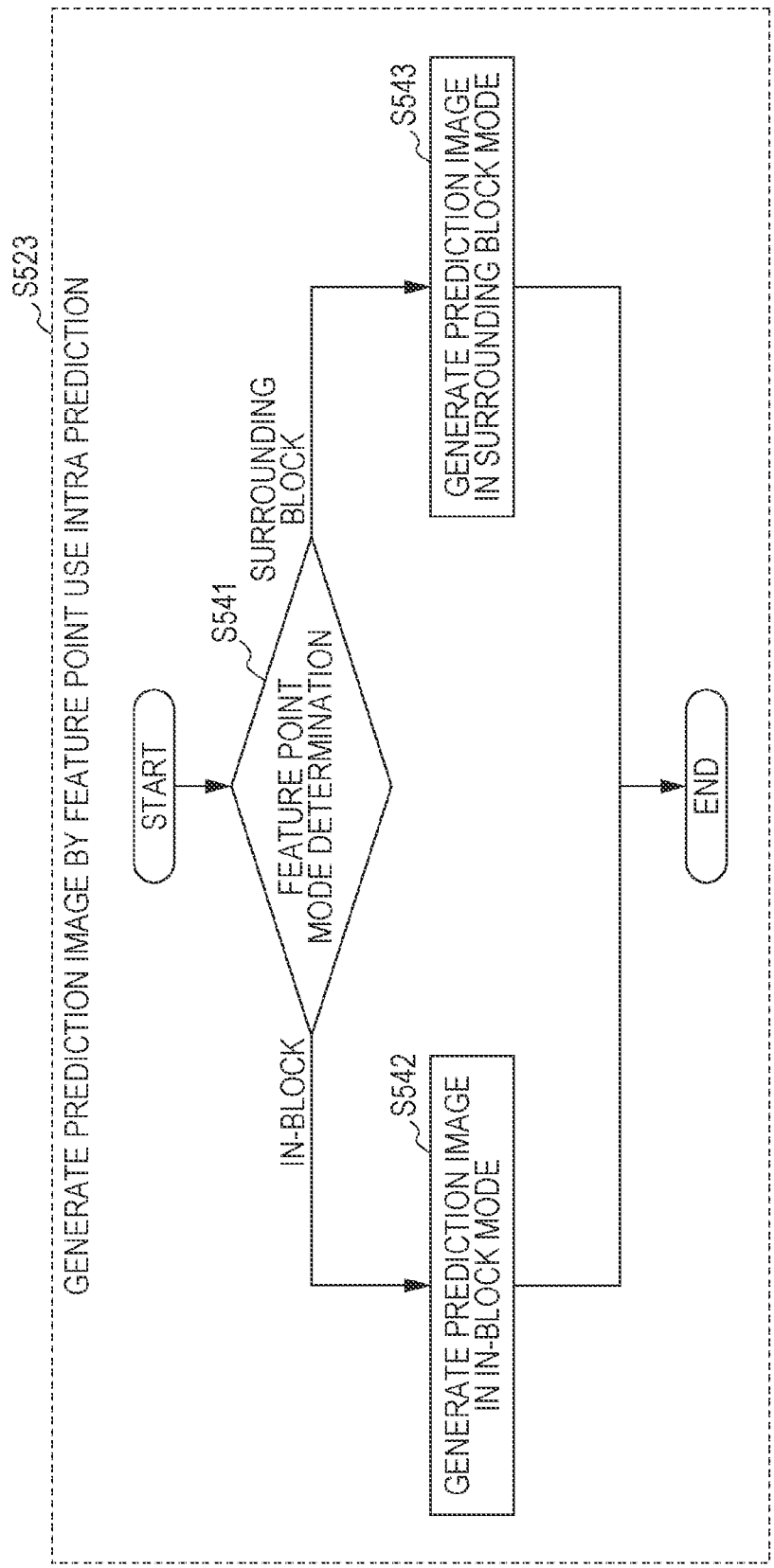
FIG. 29 is a flowchart illustrating an example of a feature point use intra prediction process of the third exemplary embodiment.

The prediction image generation process by the feature point use intra prediction in Step S523 will be described in detail below with reference to a flowchart in FIG. 29.

Image decoding apparatus 200 determines whether a feature point use mode is the in-block mode or the surrounding block mode (S541). Similarly to Step S441, the determination in Step S541 is performed using the information included in bitstream 221.

When the feature point use mode is the in-block mode ("IN-BLOCK" in S541), image decoding apparatus 200 generates the prediction image in the in-block mode that is of the intra prediction process in which the feature point in the target block is used (S542).

On the other hand, when the feature point use mode is the surrounding block mode ("SURROUNDING BLOCK" in S541), image decoding apparatus 200 generates the prediction image in the surrounding block mode that is of the intra prediction process in which the feature point information included in the region in the surroundings of the target block is used (S543).

Figure 30:
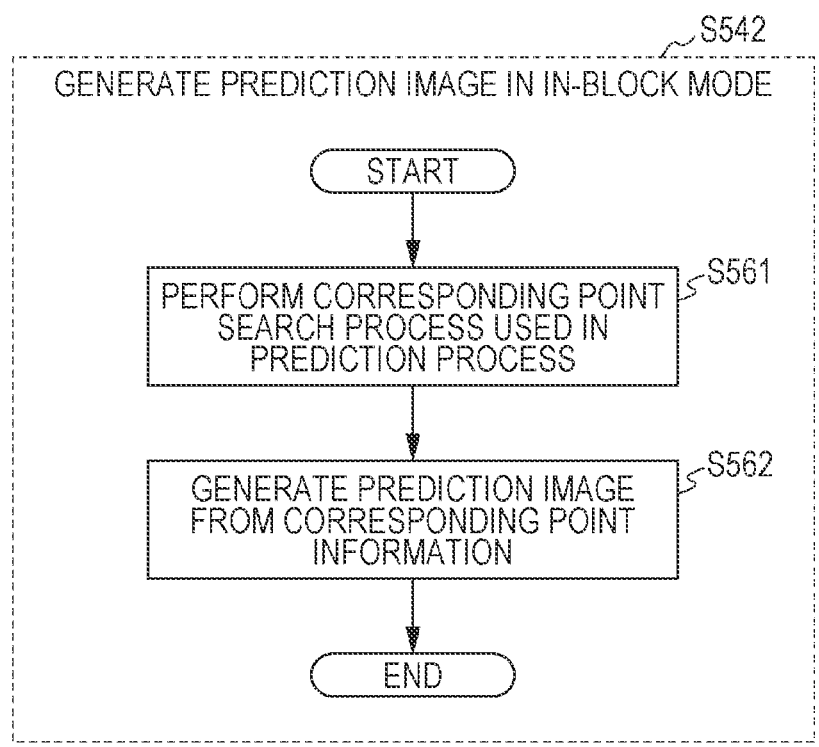
FIG. 30 is a flowchart illustrating an example of the in-block mode intra prediction image generation process of the third exemplary embodiment.

The prediction image generation process in the in-block mode of Step S542 will be described in detail below with reference to a flowchart in FIG. 30.

Image decoding apparatus 200 searches the corresponding point in the feature points extracted in Step S406 using the in-block mode feature-point-related information decoded in Step S442 (S561).

Specifically, image decoding apparatus 200 identifies the corresponding point from the plurality of feature points extracted in Step S406 using the corresponding point information (for example, the coordinate of the corresponding point) that is included in the feature-point-related information to identify the corresponding point. In the case that the corresponding point information is the index, in a manner similar to the coding side, image decoding apparatus 200 allocates the index to the plurality of feature points to set the feature point having the index indicated by the corresponding point information to the corresponding point.

Image decoding apparatus 200 extracts at least one feature point included in the target block and the feature quantity of the feature point, and decides the feature point used from the extracted feature points using the feature point information (for example, the coordinate of the feature point) that is included in the feature-point-related information to identify the feature point. In the case that the feature point information indicates the rotation quantity and the scale value, image decoding apparatus 200 sets the feature point having the rotation quantity and scale value, which are indicated by the feature point information, to the feature point.

Using the feature point and corresponding point, which are obtained in Step S561, image decoding apparatus 200 performs the process similar to that in Step S185 to generate the prediction image (S562).

Figure 31:
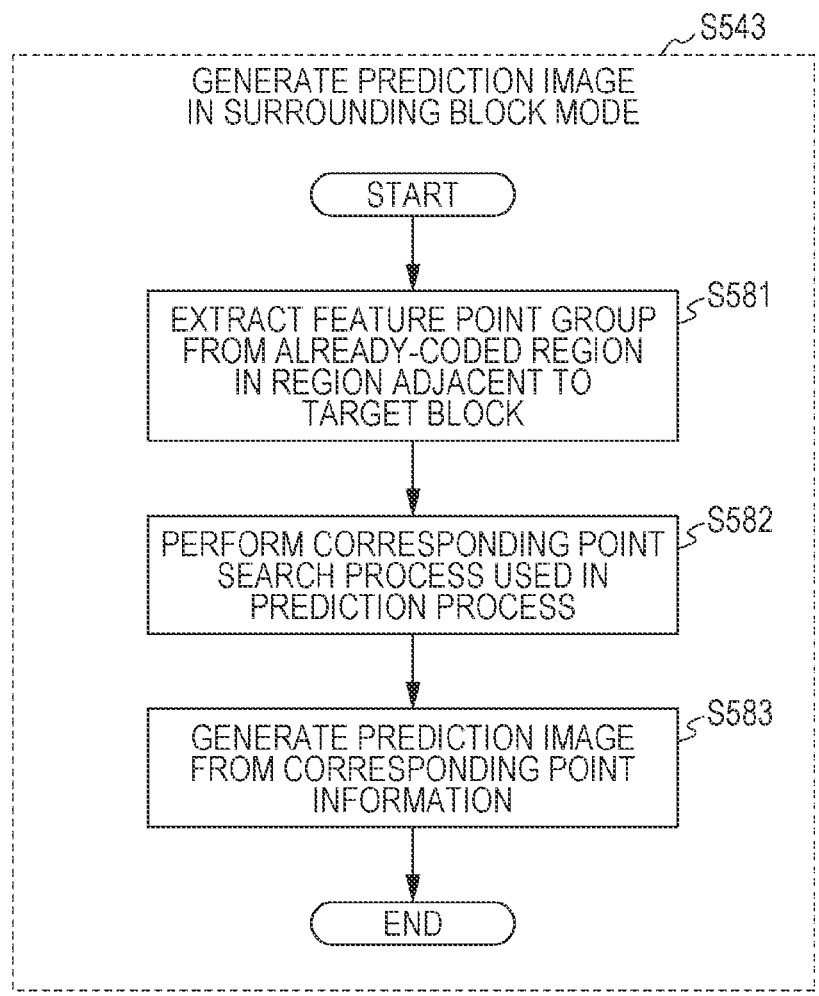
FIG. 31 is a flowchart illustrating an example of the surrounding block mode intra prediction image generation process of the third exemplary embodiment.

The prediction image generation process in the surrounding block mode of Step S543 will be described in detail below with reference to a flowchart in FIG. 31.

Image decoding apparatus 200 extracts the feature point, which is included in the extraction region obtained from the extraction range information decoded in Step S481, from the feature point extracted in Step S406. Image decoding apparatus 200 extracts the number information decoded in Steps S482 to S484 and the feature point designated by the feature point designating information from the feature point included in the extraction region (S581).

Image decoding apparatus 200 searches the corresponding point of the feature point extracted in Step S581 from the feature point group of the reference image extracted in Step S406 (S582). That is, similarly to the coding side, image decoding apparatus 200 searches the corresponding point similar to the feature quantity of the feature point in the surroundings of the target block using the feature quantity.

Using the corresponding point information obtained in Step S582, image decoding apparatus 200 generates the prediction image through the process similar to that in Step S225 (S583).

Figure 32:
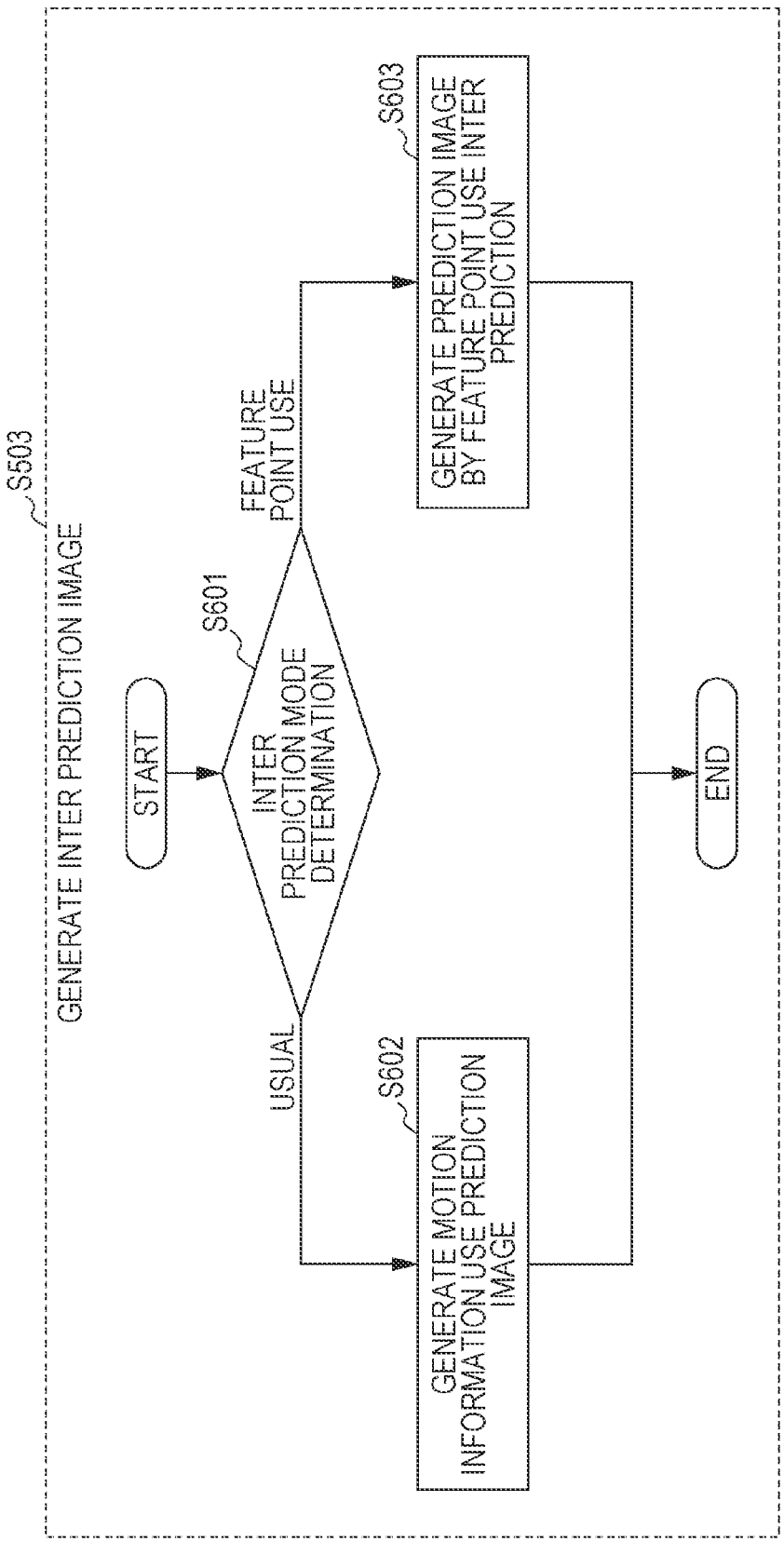
FIG. 32 is a flowchart illustrating an example of an inter prediction image generation process of the third exemplary embodiment.

The inter prediction process in Step S503 will be described in detail below with reference to a flowchart in FIG. 32.

Image decoding apparatus 200 determines whether the prediction mode of the inter prediction is the usual inter prediction or the feature point use inter prediction (S601). Similarly to Step S423, the determination in Step S601 is performed using the information included in bitstream 221.

When the prediction mode is the usual inter prediction ("USUAL" in S601), image decoding apparatus 200 generates the prediction image by performing a motion information use prediction image generation process, such as an inter prediction technique, which is used in H.265/HEVC (S602). At this point, the motion information including high-order information such as an affine transform matrix and a projection transform matrix may be used, although the parallel translation vector is used as the motion information in H.265/HEVC.

On the other hand, when the prediction mode is the feature point use inter prediction ("FEATURE POINT USE" in S601), image decoding apparatus 200 generates the prediction image by the feature point use inter prediction (S603).

Figure 33:
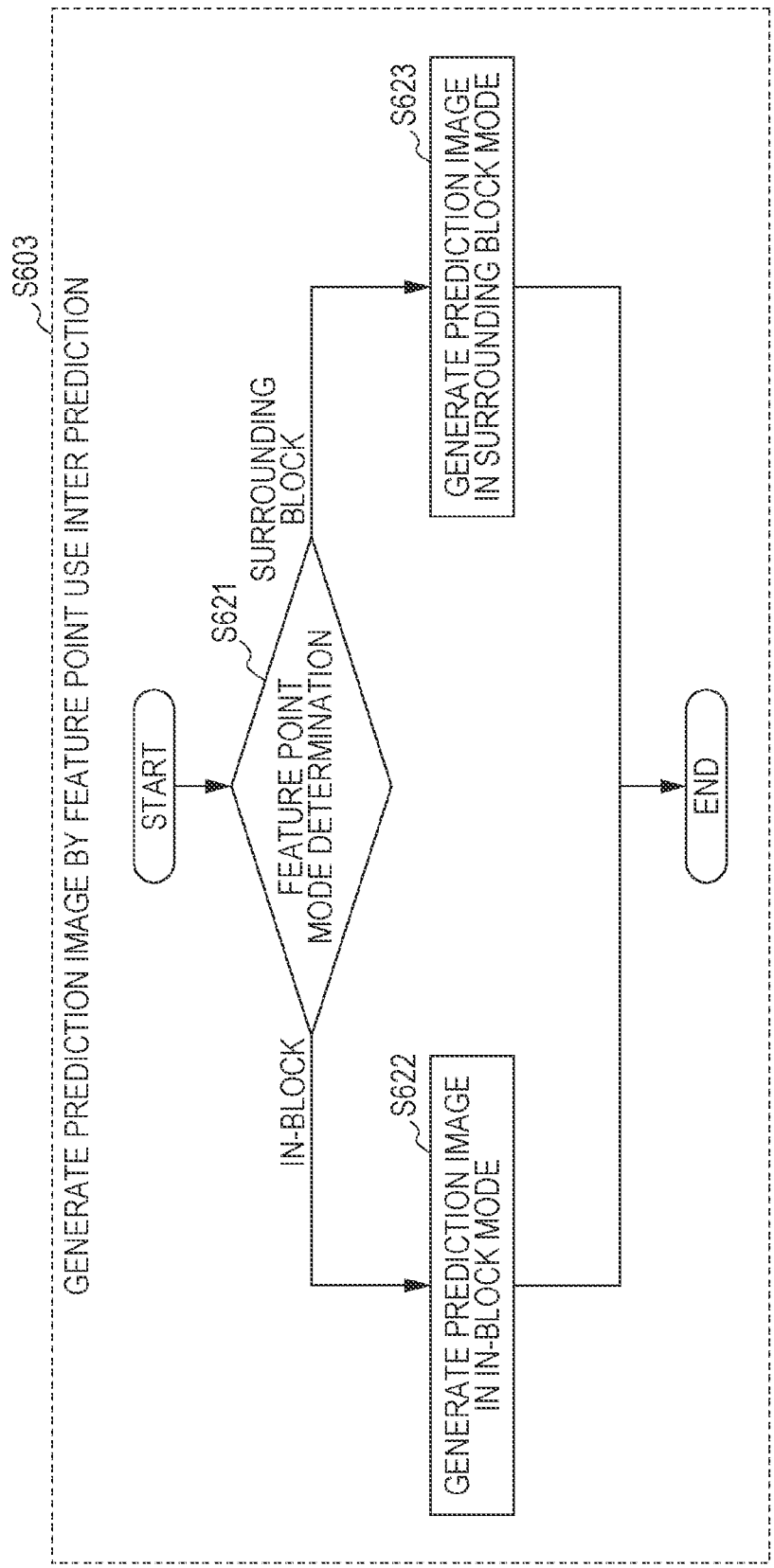
FIG. 33 is a flowchart illustrating an example of a feature point use intra prediction process of the third exemplary embodiment.

The prediction image generation process by the feature point use intra prediction in Step S603 will be described in detail below with reference to a flowchart in FIG. 33.

Image decoding apparatus 200 determines whether the feature point use mode is the in-block mode or the surrounding block mode (S621). Similarly to Step S441, the determination in Step S621 is performed using the information included in bitstream 221.

When the feature point use mode is the in-block mode ("IN-BLOCK" in S621), image decoding apparatus 200 generates the prediction image in the in-block mode that is of the inter prediction process in which the feature point in the target block is used (S622).

On the other hand, when the feature point use mode is the surrounding block mode ("SURROUNDING BLOCK" in S621), image decoding apparatus 200 generates the prediction image in the surrounding block mode that is of the inter prediction process in which the feature point information included in the region in the surroundings of the target block is used (S623).

Figure 34:
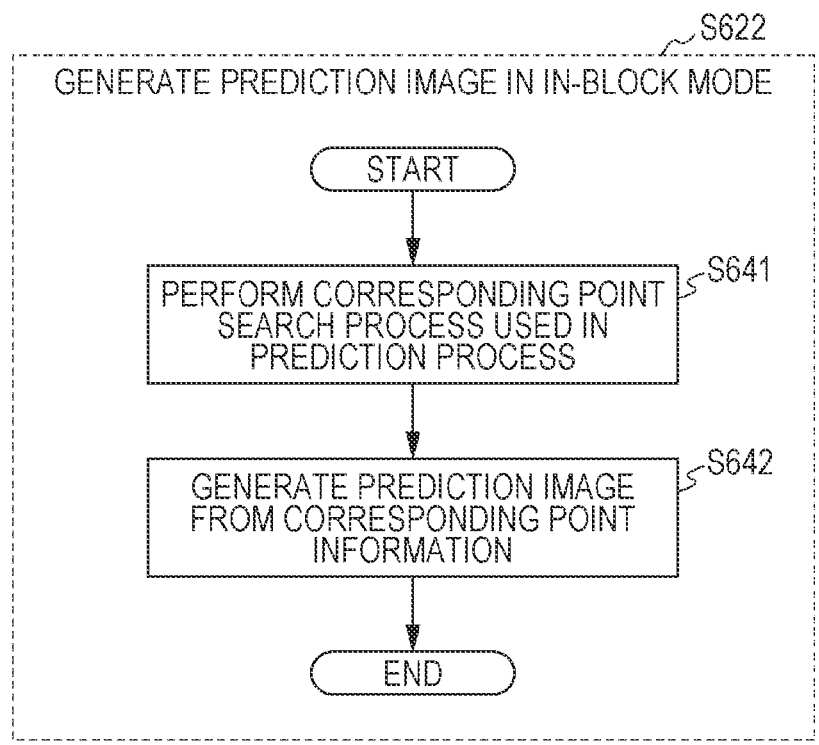
FIG. 34 is a flowchart illustrating an example of the in-block mode inter prediction image generation process of the third exemplary embodiment.

The in-block mode prediction image generation process in Step S622 will be described in detail below with reference to a flowchart in FIG. 34.

Image decoding apparatus 200 searches the corresponding point in the feature points extracted in Step S409 using the in-block mode feature-point-related information decoded in Step S442 (S641). The detailed process in Step S641 is similar to that in Step S561 except that a reference destination is another already-coded picture.

Using the feature point and corresponding point, which are obtained in Step S641, image decoding apparatus 200 performs the process similar to that in Step S305 to generate the prediction image (S642).

Figure 35:
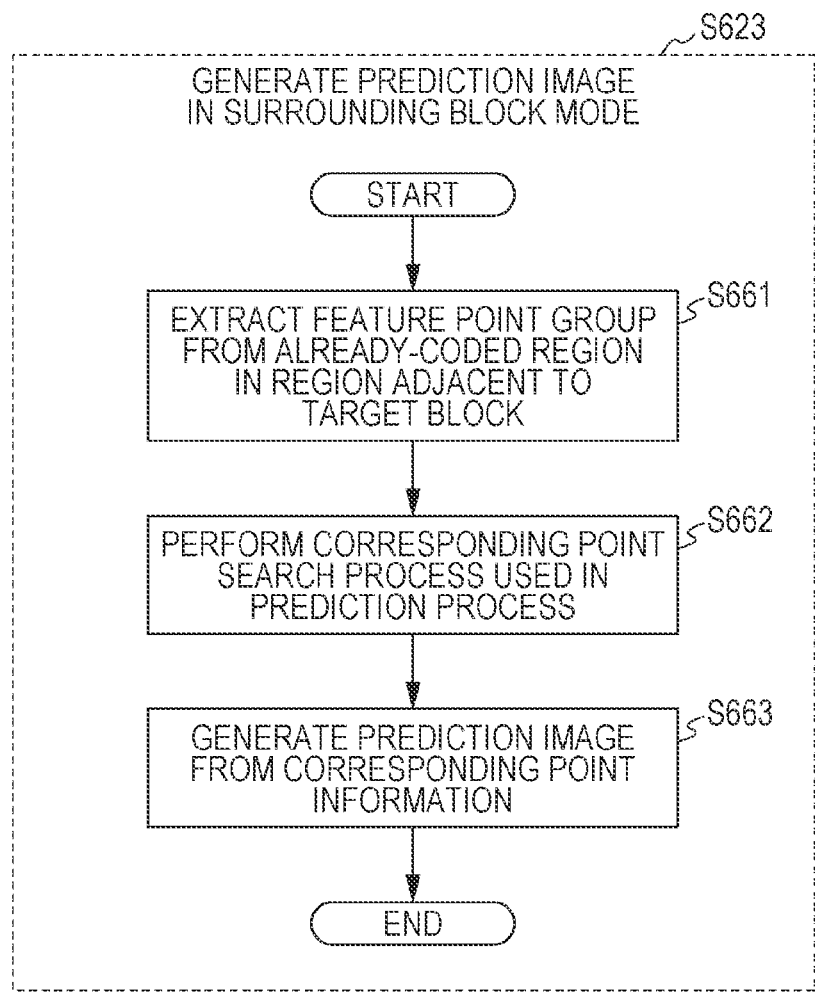
FIG. 35 is a flowchart illustrating an example of the surrounding block mode inter prediction image generation process of the third exemplary embodiment.

The prediction image generation process in the surrounding block mode of Step S623 will be described in detail below with reference to a flowchart in FIG. 35.

Image decoding apparatus 200 extracts the feature point, which is included in the extraction region obtained from the extraction range information decoded in Step S481, from the feature point extracted in Step S409. Image decoding apparatus 200 extracts the number information decoded in Steps S482 to S484 and the feature point designated by the feature point designating information from the feature point included in the extraction region (S661).

Image decoding apparatus 200 searches the corresponding point of the feature point extracted in Step S661 from the feature point group of the reference image extracted in Step S409 (S662).

Using the corresponding point information obtained in Step S662, image decoding apparatus 200 generates the prediction image through the process similar to that in Step S325 (S663).

Advantageous Effect

As described above, according to the third exemplary embodiment, the bitstream in which the pieces of information on the feature point use intra and inter prediction techniques are coded can be decoded. According to the configuration of the third exemplary embodiment, in consideration of the use of the feature point, the bitstream can be decoded through the prediction image generation process in which the corresponding point of the feature point is used, and the higher-quality image can be played back.

As described in the first exemplary embodiment, various feature quantities can be used as the local feature quantity. ORB or SURF that is of another technology concerning the local feature quantity may be used. The feature point extraction technique may be different from the feature quantity calculation technique.

As described in the first exemplary embodiment, only one feature point in the target block is not necessarily used in the processes in Steps S561 and S641, but the plurality of feature points may be used. At this point, in the decoding process in Step S442, a process of decoding the information on the number of coded feature points is added, and the processes in Steps S461 to S464 are repeatedly performed times for the number of coded feature points, which allows the performance of the process in which the plurality of feature points are used. The use of the plurality of feature points improves the accuracy of the prediction image. Therefore, a residual component decreases to improve the coding efficiency.

In the first exemplary embodiment, by way of example, the above technique is used in both the inter prediction and the intra prediction. Alternatively, the above technique may be used only in one of the inter prediction and the intra prediction. In the first exemplary embodiment, both the prediction process (inter prediction or intra prediction) in which the feature point in the target block is used and the prediction process (inter prediction or intra prediction) in which the feature point in the surroundings of the target block is used are described by way of example. Alternatively, only one of the prediction process (inter prediction or intra prediction) in which the feature point in the target block is used and the prediction process (inter prediction or intra prediction) in which the feature point in the surroundings of the target block is used may be used.

In the above description, the corresponding point information indicating the corresponding point is transmitted onto the decoding side during the in-block mode, but the corresponding point information is not transmitted onto the decoding side during the surrounding block mode. Alternatively, the corresponding point information may be transmitted onto the decoding side during the surrounding block mode. In this case, image decoding apparatus 200 does not perform the corresponding point search process in which the feature quantity is used, but identifies the corresponding point from the plurality of feature points using the corresponding point information.

In the in-block mode, the corresponding point information needs not to be transmitted onto the decoding side. In this case, similarly to the coding side, image decoding apparatus 200 identifies the corresponding point by performing the corresponding point search process in which the feature quantity is used.

Figure 36:
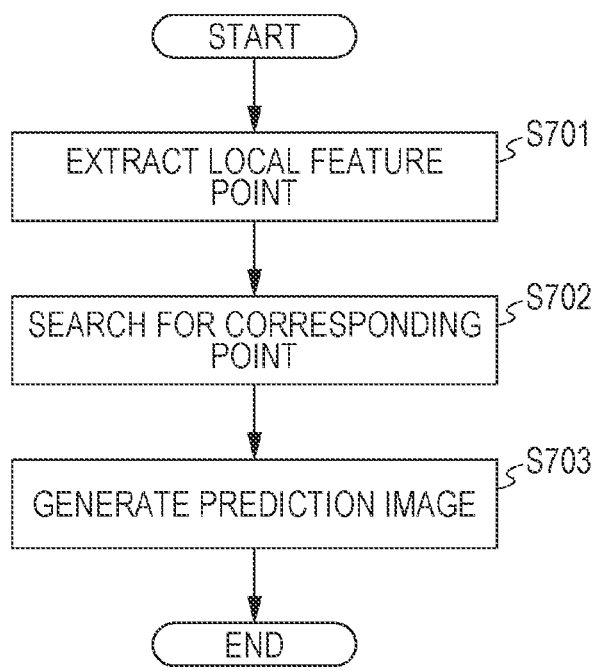
FIG. 36 is a flowchart illustrating an example of a prediction image generation process of the third exemplary embodiment.

As described above, the image coding method and image decoding method of the third exemplary embodiment include the prediction image generation method in FIG. 36.

The prediction image generation apparatus of the third exemplary embodiment generates the prediction image of the target block. In the prediction image generation apparatus, the plurality of first feature points each of which is included in the reconstructed image to have the local feature quantity is extracted (S701). As used herein, the reconstructed image means the already-coded or already-decoded block included in the target picture including the target block in the intra prediction, and means the already-coded or already-decoded picture different from the target picture in the inter prediction.

In the image coding apparatus including the prediction image generation apparatus, the plurality of third feature points corresponding to the target block are extracted. Specifically, the third feature point is the feature point included in the target block in the in-block mode, and is the feature point, which is not included in the target block but located in the surroundings of the target block, in the surrounding block mode.

Then the prediction image generation apparatus searches the corresponding point in the plurality of first feature points. The corresponding point has the local feature quantity similar to that of the second feature point corresponding to the target block, and a relationship with the second feature point is expressed by information including the non-parallel translation component (S702). Specifically, the second feature point is the feature point included in the target block in the in-block mode, and is the feature point, which is not included in the target block but located in the surroundings of the target block, in the surrounding block mode.

Specifically, in the image coding apparatus, the second feature point is selected from the plurality of third feature points corresponding to the target block. The image coding apparatus searches the corresponding point having the local feature quantity similar to that of the second feature point from the plurality of first feature points using the similarity of the local feature quantity. The image coding apparatus codes the feature point information identifying the second feature point in the plurality of third feature points, and transmits the coded feature point information to the image decoding apparatus. The image coding apparatus may code the corresponding point information identifying the corresponding point in the plurality of first feature points.

On the other hand, the feature point information is decoded in the image decoding apparatus. The image decoding apparatus extracts the plurality of third feature points corresponding to the target block, and selects the second feature point from the plurality of third feature points using the feature point information. Similarly to the coding side, the image decoding apparatus searches the corresponding point having the local feature quantity similar to that of the second feature point from the plurality of first feature points using the similarity of the local feature quantity. In the case that the corresponding point information is included in the bitstream, the image decoding apparatus decodes the corresponding point information, and searches the corresponding point from the plurality of first feature points using the information on the decoded corresponding point.

Then the prediction image generation apparatus generates the prediction image from the reconstructed image based on the relationship between the second feature point and the corresponding point (S703). Specifically, using the pixel value in the surroundings of the corresponding point in the reconstructed image, the prediction image generation apparatus generates the prediction image based on the above relationship. For example, in the in-block mode, prediction image generation apparatus generates the prediction image using the pixel value in the region including the corresponding point in the reconstructed image. In the surrounding block mode, the prediction image generation apparatus generates the prediction image using the pixel value in the region that does not include the corresponding point in the reconstructed image.

The image coding apparatus does not generate the prediction image using the pixel value in the surroundings of the corresponding point, but the image coding apparatus may set the initial value of the motion estimation process based on the relationship between the second feature point and the corresponding point as described in the second exemplary embodiment, and generate the prediction image by performing the motion estimation process using the initial value.

The image coding apparatus codes the target block using the generated prediction image, and the image decoding apparatus decodes the target block using the generated prediction image.

Although the prediction image generation method, the image coding method, and the image decoding method of the third exemplary embodiment are described above, the present disclosure is not limited to the third exemplary embodiment.

Also, individual processors included in the prediction image generation apparatus, image coding apparatus, and image decoding apparatus of the third exemplary embodiment are typically implemented as an LSI (Large-Scale Integration) that is of an integrated circuit. These processors may be formed as separate chips, or some or all of the processors may be included in a chip.

Also, the circuit integration is not limited to LSI, and may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

In each of the first to third exemplary embodiments, individual components may be implemented with dedicated hardware or by executing a software program suitable for the components. The individual components may be implemented as a result of a program execution unit such as a CPU (Central processor) or processor loading and executing a software program recorded on a recording medium, such as a hard disk or a semiconductor memory.

In other words, the prediction image generation apparatus, the image coding apparatus, and the image decoding apparatus include the processing circuitry and storage electrically connected to the processing circuitry (accessible from the processing circuitry). The processing circuitry includes at least one of dedicated hardware and the program execution unit. Also, the storage stores a software program to be executed by the program execution unit in the case where the processing circuitry includes the program execution unit. The processing circuitry performs the prediction image generation method, the image coding method, or the image decoding method of the first to third exemplary embodiments using the storage.

The present disclosure may be implemented by a software program or a non-transitory computer-readable recording medium in which the program is recorded. The program can be distributed through a transmission medium such as the Internet.

Also, numerical values used above are merely illustrative ones used to describe the present disclosure specifically, and thus the present disclosure is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

The order in which Steps included in the above prediction image generation method, image coding method, or image decoding method are executed is merely an illustrative one used to describe the present disclosure specifically, and thus Steps may be executed in an order other than the above one. Also, some of the Steps may be executed simultaneously (in parallel) with another Step.

While the prediction image generation apparatus, the image coding apparatus, and the image decoding apparatus are described above based on the exemplary embodiments of the present disclosure, the present disclosure is not limited to these exemplary embodiments. Exemplary embodiments in which various modifications conceivable by a person skilled in the art are made and exemplary embodiments that are made by combining elements of different exemplary embodiments may also be within the scope of the one or the plurality of exemplary embodiments of the present disclosure as long as such exemplary embodiments do not depart from the gist of the present disclosure.

Fourth Exemplary Embodiment

The processes described in each of the first to third exemplary embodiments above can be implemented easily in a standalone computer system by recording a program for implementing the configuration of a video coding method (image coding method) or video decoding method (image decoding method) described in the exemplary embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video coding method (image coding method) or the video decoding method (image decoding method) described in each of the first to third exemplary embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 37:
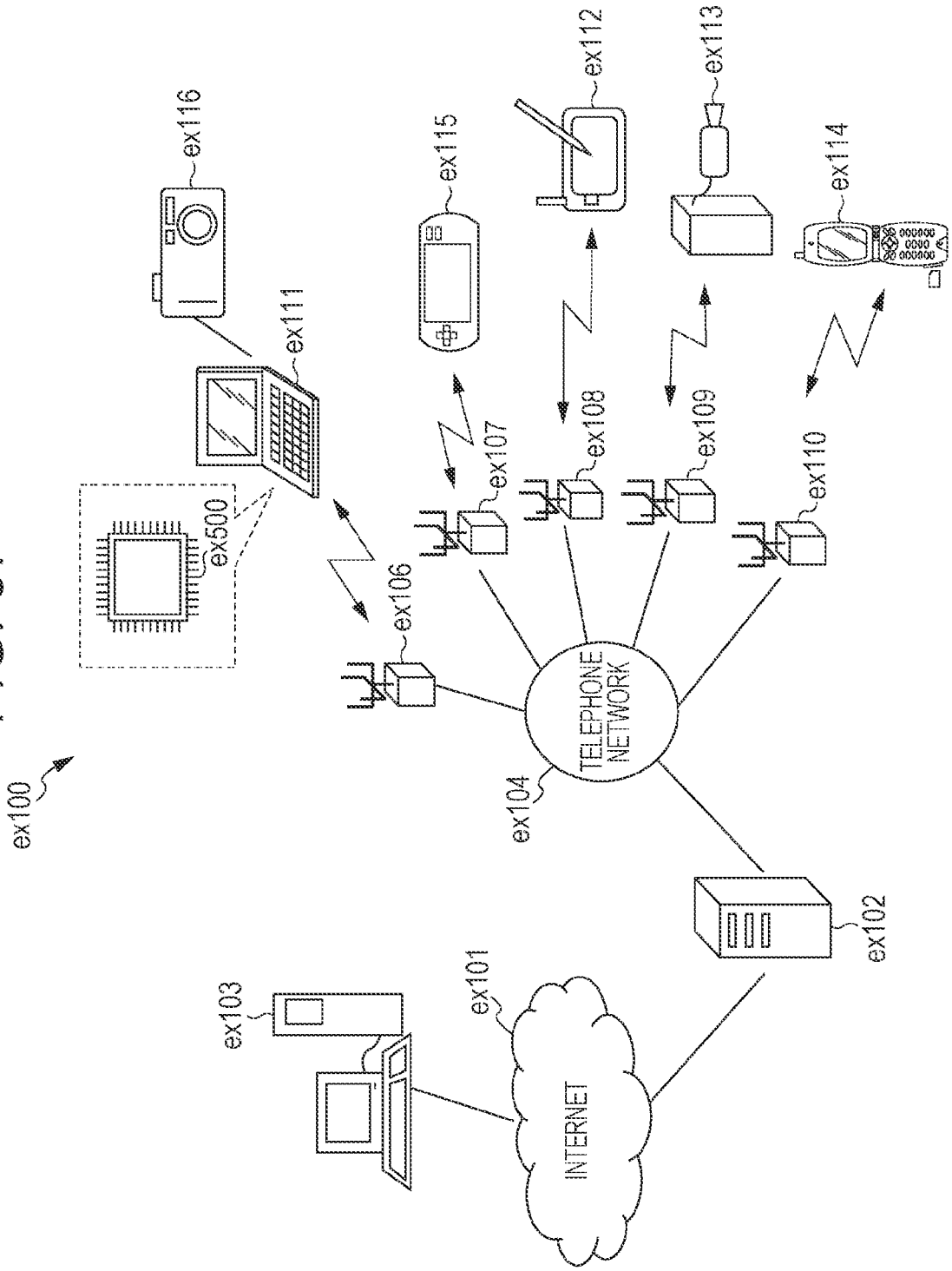
FIG. 37 is an entire configuration diagram illustrating a content supply system that implements a content distribution service.

FIG. 37 is a view illustrating a whole configuration of content supply system ex100 that implements content distribution services. An area in which communication services are provided is divided into cells of a desired size. Base stations ex106, ex107, ex108, ex109, and ex110, which are fixed wireless stations, are installed in the respective cells.

In content supply system ex100, various devices, such as computer ex111, PDA (Personal Digital Assistant) ex112, camera ex113, mobile phone ex114, game machine ex115 are connected to Internet ex101 through Internet service provider ex102, telephone network ex104, and base stations ex106 to ex110.

The configuration of content providing system ex100 is not limited to the configuration illustrated in FIG. 37, but any given combination of the elements may be connected. The individual device may directly be connected to telephone network ex104 with no use of base stations ex106 to ex110 which are fixed wireless stations. Alternatively, the individual devices may directly be interconnected through near field communication or the like.

Camera ex113 is a device capable of capturing video images, such as a digital camcorder. Camera ex116 is a device capable of capturing still images and video images, such as a digital camera. Also, mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In content providing system ex100, camera ex113 or the like is connected to streaming server ex103 through base station ex109 and telephone network ex104. In this way, live streaming is implemented. During live streaming, the coding process is performed on content (for example, video of a music event) obtained by the user using camera ex113 in a manner as described in each of the above exemplary embodiments (that is, camera ex113 functions as an image coding apparatus according to one aspect of the present disclosure) and the resulting content is transmitted to streaming server ex103. Streaming server ex103 in turn distributes the received content as a stream to a client that has made a request. Examples of the client include computer ex111, PDA ex112, camera ex113, mobile phone ex114, and game machine ex115 capable of decoding the data that has undergone the coding process. Each device that has received the distributed data performs the decoding process on the received data to play back the data (that is, the device functions as an image decoding apparatus according to one aspect of the present disclosure).

Note that the coding process may be performed on the obtained data by camera ex113, by streaming server ex103 that performs a data transmission process, or by both of them on a processing-sharing basis. Similarly, the decoding process may be performed on the distributed data by the client, by streaming server ex103, or by both of them on a processing-sharing basis. Also, in addition to still and/or video image data obtained by camera ex113, still and/or video image data obtained by camera ex116 may be transmitted to streaming server ex103 through computer ex111. In this case, the coding process may be performed by any of camera ex116, computer ex111, and streaming server ex103, or by all of them on a processing-sharing basis.

These coding and decoding processes are performed in general by LSI ex500 included in computer ex111 or each device. LSI ex500 may be formed as a 1 chip or a plurality of chips. Alternatively, software for video coding/decoding may be recorded on a recording medium (such as a CD-ROM, a flexible disk, and a hard disk) that is readable by computer ex111 or the like, and the coding and decoding processes may be performed using the software. Further, in the case where mobile phone ex114 is equipped with a camera, video image data obtained with the camera may be transmitted. The video image data is data that has been coded by LSI ex500 included in mobile phone ex114.

Also, streaming server ex103 may be constituted by a plurality of servers or a plurality of computers that process, record, and distribute data in a distributed manner.

In the above-described manner, content providing system ex100 allows the client to receive and play back coded data. Accordingly, content providing system ex100 allows the client to receive, decode, and play back information transmitted by a user in real time, and thus allows a user not having a special right or equipment to implement personal broadcasting.

Figure 38:
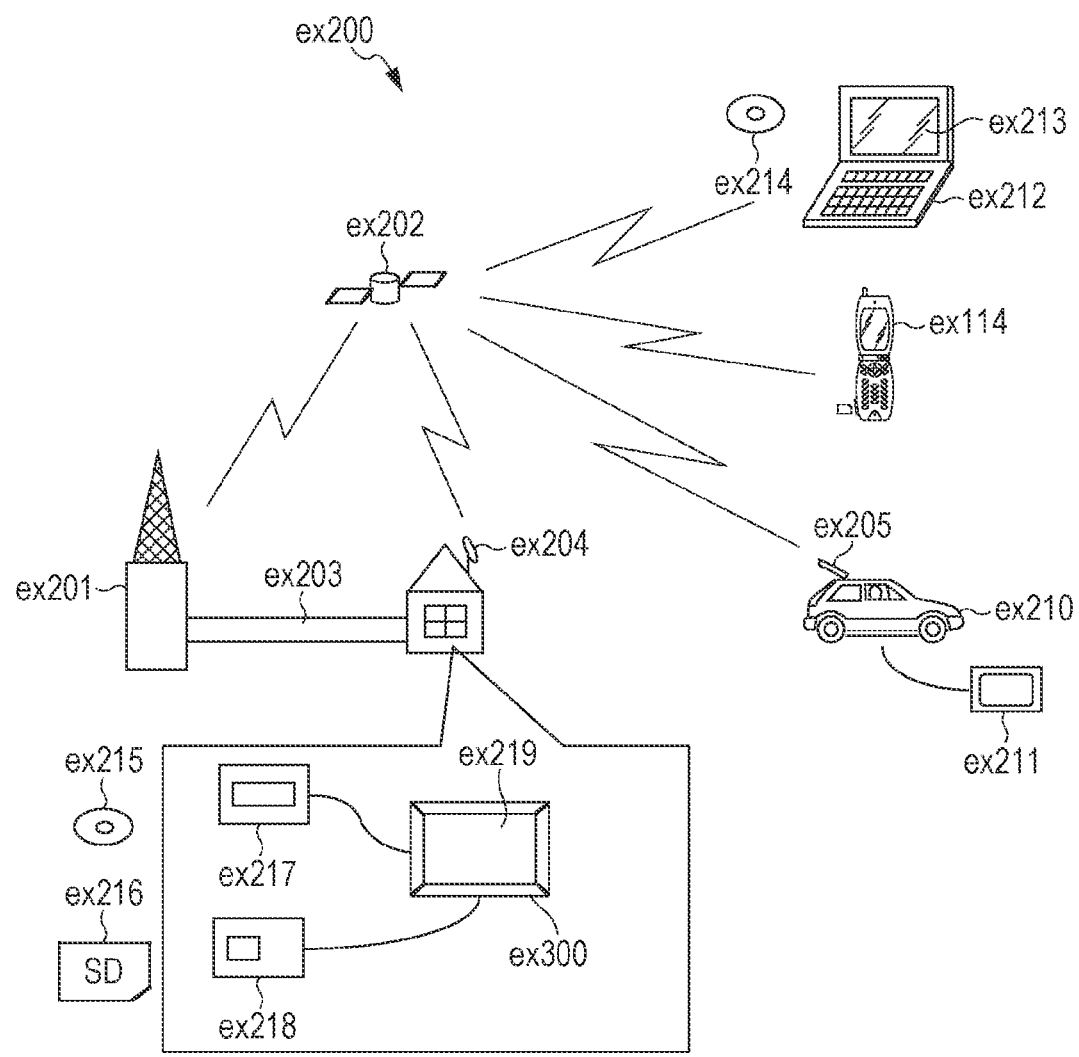
FIG. 38 is an entire configuration diagram of a digital broadcasting system.

In addition to the example of content providing system ex100, at least one of the video coding apparatus (image coding apparatus) and the video decoding apparatus (image decoding apparatus) according to each of the above exemplary embodiments can be incorporated in digital broadcasting system ex200 as illustrated in FIG. 38. Specifically, broadcasting station ex201 transmits a radio wave of multiplexed data obtained by multiplexing video data, music data, and the like, through communication to broadcasting satellite ex202. This video data is data coded using the video coding method described in each of the above exemplary embodiments (that is, data coded by the image coding apparatus according to one aspect of the present disclosure). Upon receipt of this data, broadcasting satellite ex202 transmits a broadcasting radio wave, and home antenna ex204 capable of receiving satellite broadcasting receives this radio wave. An apparatus such as television (receiver) ex300 or set top box (STB) ex217 decodes and plays back the received multiplexed data (that is, the apparatus functions as the image decoding apparatus according to one aspect of the present disclosure).

Also, the video decoding apparatus or video coding apparatus described in each of the above exemplary embodiments can be implemented in reader/recorder ex218 that reads and decodes the multiplexed data recorded on recording medium ex215 such as a DVD (Digital Versatile Disc) or a BD (Blu-ray Disc); or that codes a video signal and further multiplexes a music signal with the video signal depending on circumstances, and writes the resulting signal on recording medium ex215. In this case, the played-back video signal is displayed on monitor ex219, and the video signal can be played back by another apparatus or system using recording medium ex215 having the multiplexed data recorded thereon. Alternatively, the video decoding apparatus may be implemented in set top box ex217 connected to cable ex203 for cable television or home antenna ex204 for satellite/terrestrial broadcasting, and the video signal may be displayed on monitor ex219 of television ex300. At this time, the video decoding apparatus may be incorporated into television ex300 instead of set top box ex217.

Figure 39:
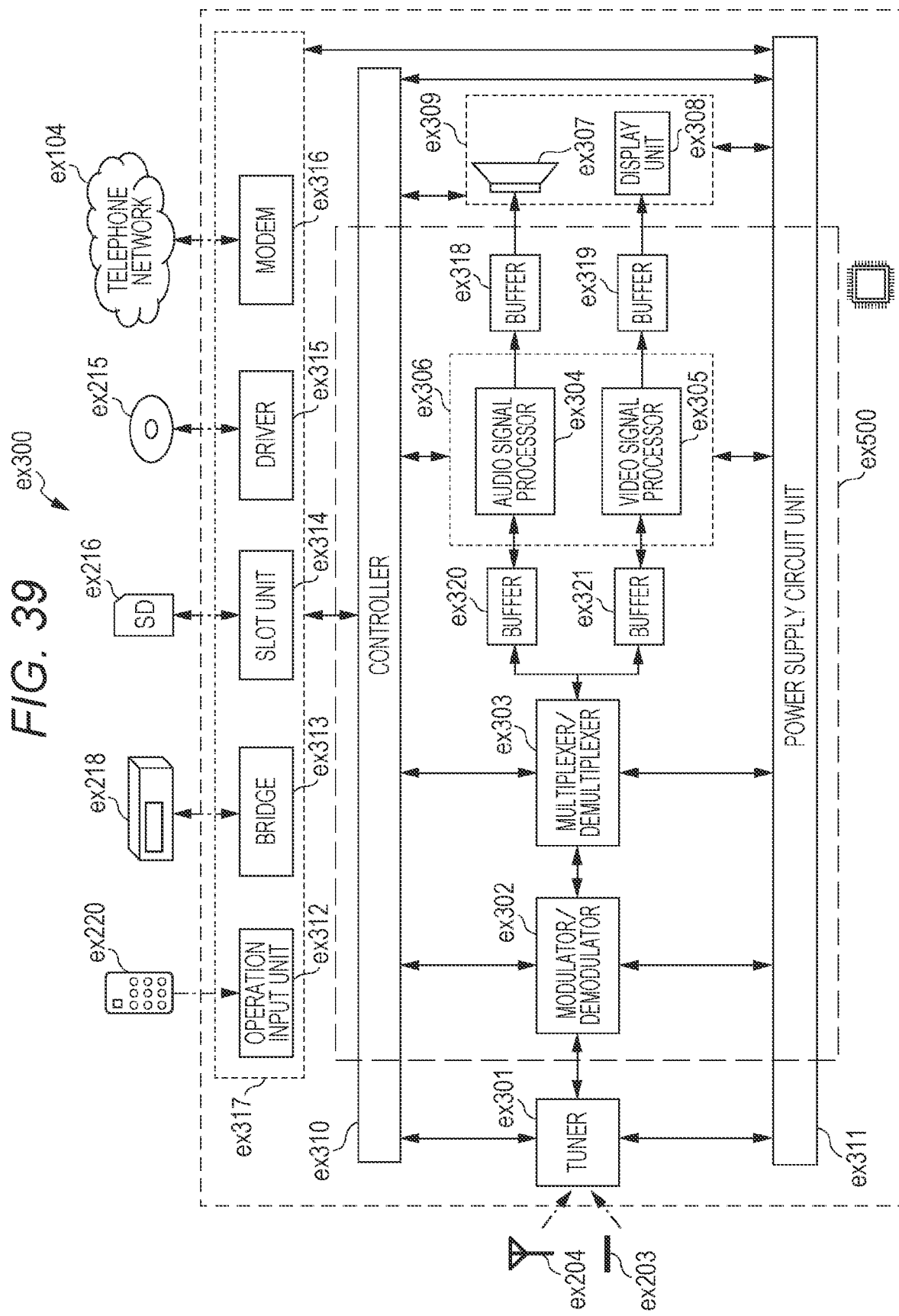
FIG. 39 is a block diagram illustrating a configuration example of a television.

FIG. 39 is a view illustrating television (receiver) ex300 that employs the video decoding method and video coding method described in each of the above exemplary embodiments. Television ex300 includes tuner ex301 that obtains or outputs, through antenna ex204 or cable ex203 that receives broadcasting, multiplexed data in which video data and audio data are multiplexed together; modulator/demodulator ex302 that performs demodulation on the received multiplexed data or modulation on multiplexed data to be transmitted to outside; and multiplexer/demultiplexer ex303 that demultiplexes the demodulated multiplexed data into video data and audio data, or multiplexes video data and audio data that have been coded by signal processor ex306.

Television ex300 also includes signal processor ex306 and output unit ex309. Signal processor ex306 includes audio signal processor ex304 that decodes or codes audio data, and video signal processor ex305 that decodes or codes video data (video signal processor ex305 functions as the image coding apparatus or the image decoding apparatus according to one aspect of the present disclosure). Output unit ex309 includes speaker ex307 that outputs the decoded audio signal, and display unit ex308, such as a display, which displays the decoded video signal. Television ex300 further includes interface unit ex317 which includes operation input unit ex312 that accepts input of a user operation. Television ex300 further includes controller ex310 that controls the individual units in an integrated manner, and power supply circuit unit ex311 that supplies electric power to the individual units. Interface unit ex317 may include bridge ex313 to be connected to an external device, such as reader/recorder ex218; slot unit ex314 that enables connection of recording medium ex216 such as an SD card; driver ex315 for connection to external recording medium ex215, such as a hard disk; and modem ex316 for connection to telephone network ex104 as well as operation input unit ex312. Recording medium ex216 is capable of electrically storing information by using a nonvolatile/volatile semiconductor memory included therein. The individual units of television ex300 are connected to one another through a synchronization bus.

A configuration that allows television ex300 to decode and play back multiplexed data obtained from outside with antenna ex204 or the like will be described. Television ex300 receives a user operation from remote control ex220 or the like. Based on control performed by controller ex310 including a CPU or the like, multiplexer/demultiplexer ex303 demultiplexes multiplexed data that has been demodulated by modulator/demodulator ex302. In television ex300, audio signal processor ex304 decodes the separated audio data and video signal processor ex305 decodes the separated video data using the image decoding method described in each of the above exemplary embodiments. Further, the decoded audio signal and video signal are output to outside from output unit ex309. When the audio signal and the video signal are output, these signals may be temporarily stored in buffers ex318 and ex319 or the like so that they are played back in synchronization with each other.

Television ex300 may read multiplexed data from recording mediums ex215 and ex216 such as a magnetic/optical disk and an SD card as well as from broadcasting. Next, a configuration that allows television ex300 to code an audio signal and a video signal and to transmit the resulting signals to outside or write the resulting signals on a recording medium or the like will be described. Television ex300 receives a user operation from remote control ex220 or the like. Based on control performed by controller ex310, audio signal processor ex304 codes the audio signal, and video signal processor ex305 codes the video signal using the image coding method described in each of the above exemplary embodiments. The coded audio signal and video signal are multiplexed by multiplexer/demultiplexer ex303 and the resulting multiplexed signal is output to outside. When the audio signal and the video signal are multiplexed, these signals may be temporarily stored in buffers ex320 and ex321 or the like so that they are synchronized with each other. A plurality of buffers may be provided as illustrated as buffers ex318, ex319, ex320, and ex321, or one or more buffers may be shared. Further, in addition to the illustrated buffers, for example, data may be stored in a buffer that serves as a buffering member for avoiding an overflow or underflow in the system between modulator/demodulator ex302 and multiplexer/demultiplexer ex303 or the like.

Television ex300 may also include a configuration for receiving audio/video input of a microphone or a camera in addition to the configuration for obtaining audio data and video data from broadcasting, a recording medium, or the like; and may perform the coding process on the data obtained therefrom. Although television ex300 has been described as the configuration capable of performing the above-described coding process, multiplexing, and outputting to outside, television ex300 may be a configuration incapable of performing these processes and only capable of the reception, decoding process, and outputting to outside.

In the case where multiplexed data is read from and written to a recording medium by reader/recorder ex218, the decoding process or the coding process may be performed by television ex300, by reader/recorder ex218, or by both television ex300 and reader/recorder ex218 on a processing-sharing basis.

Figure 40:
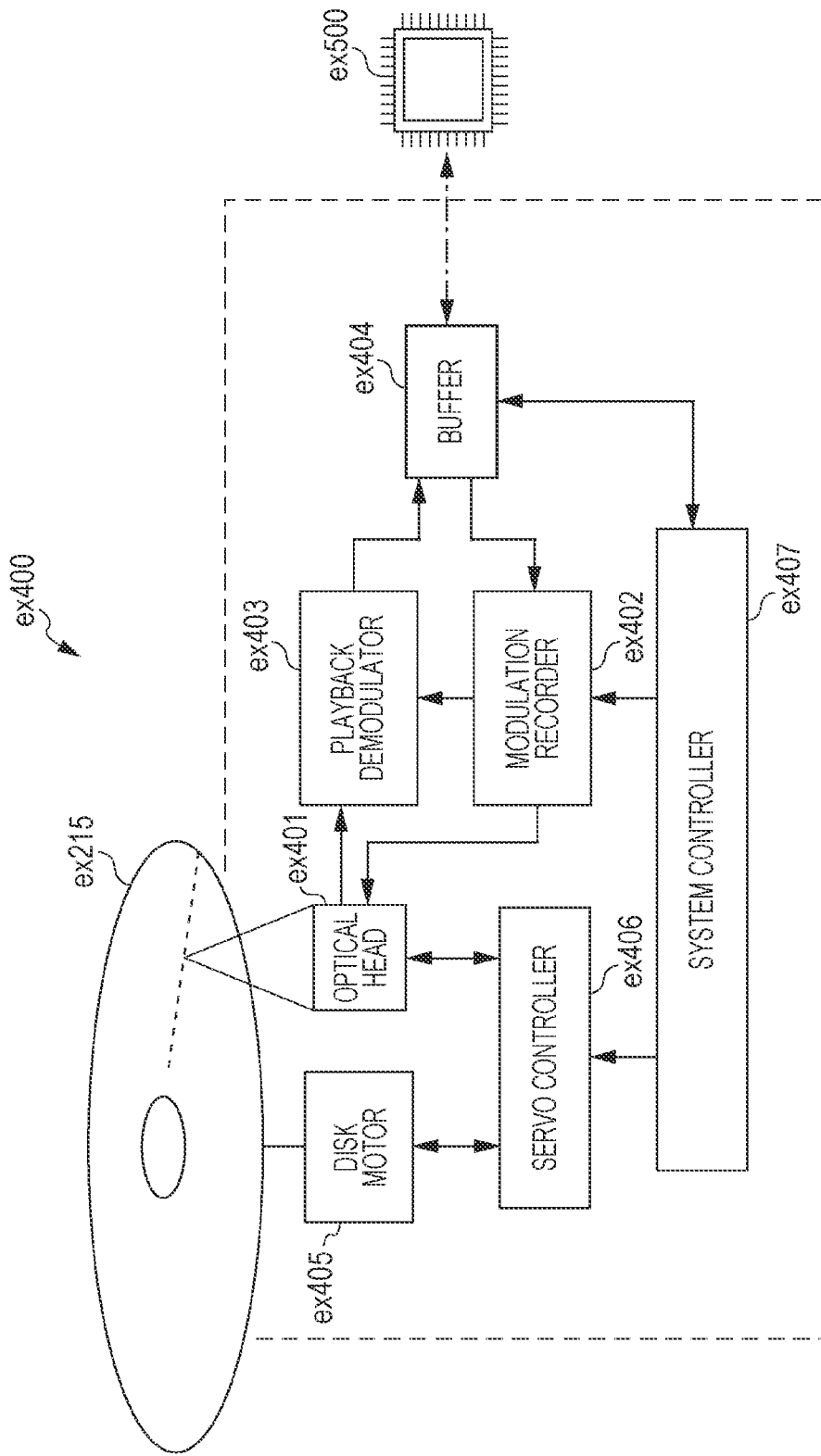
FIG. 40 is a block diagram illustrating a configuration example of an information playback/recording unit that reads and writes information from and to a recording medium which is of an optical disk.

FIG. 40 illustrates an example of a configuration of information playback/recording unit ex400 in the case that the data is read or written from and in an optical disk. Information playback/recording unit ex400 includes optical head ex401, modulation recorder ex402, playback demodulator ex403, buffer ex404, disk motor ex405, servo controller ex406, and system controller ex407. Optical head ex401 irradiates a recording surface of recording medium ex215, which is an optical disc, with a laser spot to write information thereon; and detects reflected light from the recording surface of recording medium ex215 to read information. Modulation recorder ex402 electrically drives a semiconductor laser included in optical head ex401 to modulate a laser beam in accordance with to-be-recorded data. Playback demodulator ex403 amplifies a played-back signal which is obtained by electrically detecting reflected light from the recording surface by a photodetector included in optical head ex401, separates and demodulates signal components recorded on recording medium ex215, and plays back necessary information. Buffer ex404 temporarily stores information to be recorded on recording medium ex215 and information played back from recording medium ex215. Disk motor ex405 rotates recording medium ex215. Servo controller ex406 moves optical head ex401 to a certain information track while controlling rotational driving of disk motor ex405 to perform a laser spot tracking process. System controller ex407 controls information playback/recording unit ex400. The above-described reading and writing processes are implemented as a result of system controller ex407 performing recording/playback of information through optical head ex401 while causing modulation recorder ex402, playback demodulator ex403, and servo controller ex406 to operate in cooperation with one another and using various pieces of information held in buffer ex404 and generating/adding new information as needed. System controller ex407 includes, for example, a microprocessor and performs these processes by executing a read/write program.

Although optical head ex401 that irradiates the recording surface with a laser spot has been described above, optical head ex401 may include a configuration for performing high-density recording using near field light.

Figure 41:
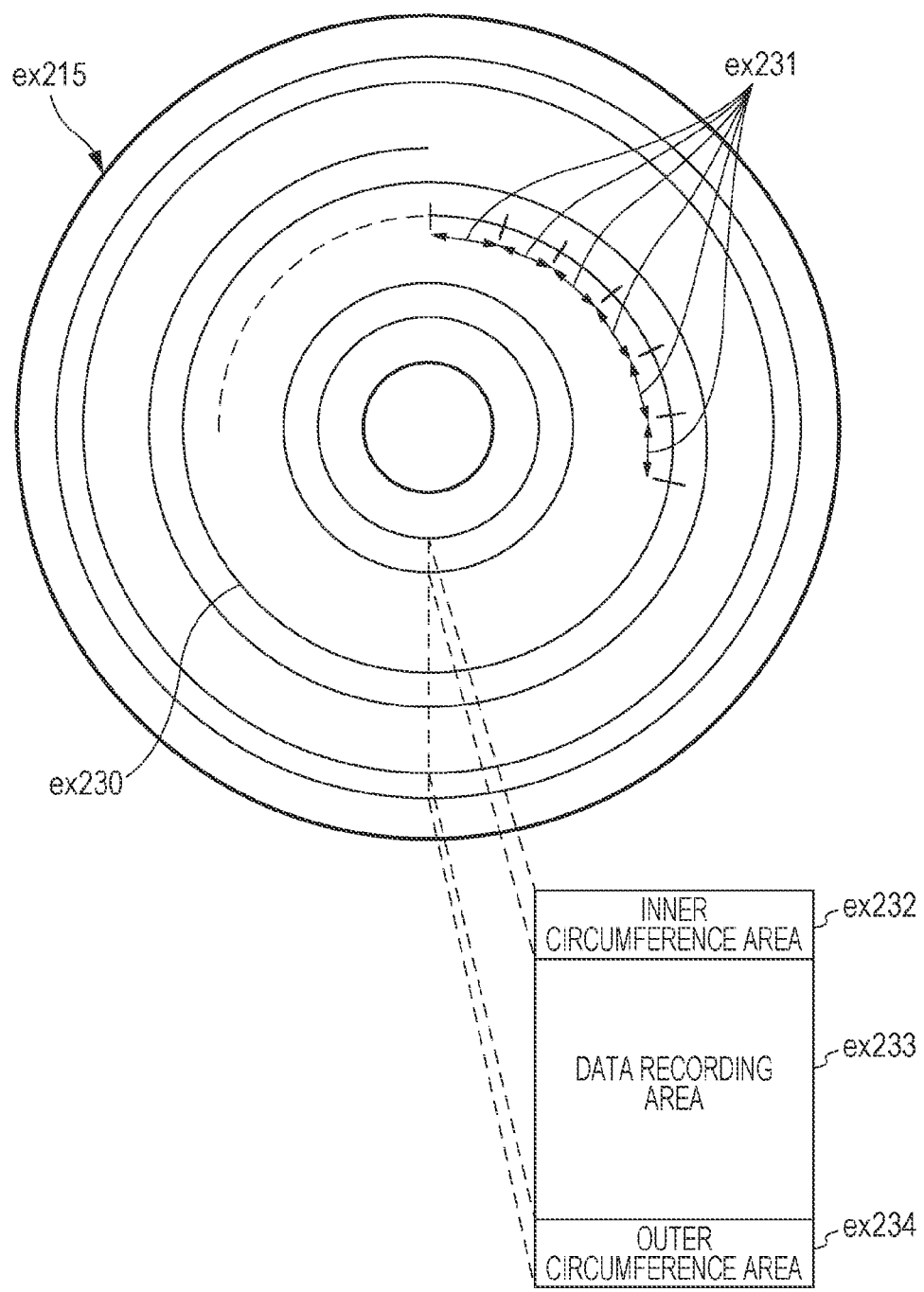
FIG. 41 is a view illustrating a structural example of the recording medium that is of the optical disk.

FIG. 41 is a schematic diagram of recording medium ex215 which is an optical disc. On the recording surface of recording medium ex215, a guide groove (groove) is spirally formed. In information track ex230, address information that represents an absolute position on the disk is pre-recorded by a change in the shape of the groove. This address information includes information identifying positions of recording blocks ex231 which are units in which data is recorded. An apparatus that performs the recording and the playback can identify a recording block by playing back information track ex230 and reading the address information. Also, recording medium ex215 includes data recording area ex233, inner circumference area ex232, and outer circumference area ex234. Data recording area ex233 is an area used to record user data. Inner circumference area ex232 and outer circumference area ex234, which are located on the inner and the outer sides of data recording area ex233, are used in a specific application other than recording of the user data. Information playback/recording unit ex400 performs reading/writing of coded audio data, coded video data, or multiplexed data of these pieces of data on data recording area ex233 of recording medium ex215 thus configured.

The description has been given using a one-layer optical disk such as a DVD or BD by way of example above, but the optical disk used is not limited to such a disk and may be a multi-layered optical disk for which recording can be performed on part other than the surface. Alternatively, the optical disk used may be an optical disk on which multi-dimensional recording/playback can be performed by recording information at the same position of the disk using light of various waveforms different from one another, by recording information on different layers at various angles, or the like.

In addition, in digital broadcasting system ex200, the data may be received by vehicle ex210 equipped with antenna ex205 from broadcasting satellite ex202 or the like and the video image may be played back on a display device of car navigation system ex211 mounted on vehicle ex210. It is conceivable that the configuration illustrated in FIG. 39 additionally including a GPS reception unit is conceivable as the configuration of car navigation system ex211, and the same applies to computer ex111, mobile phone ex114, or the like.

Figure 42A:
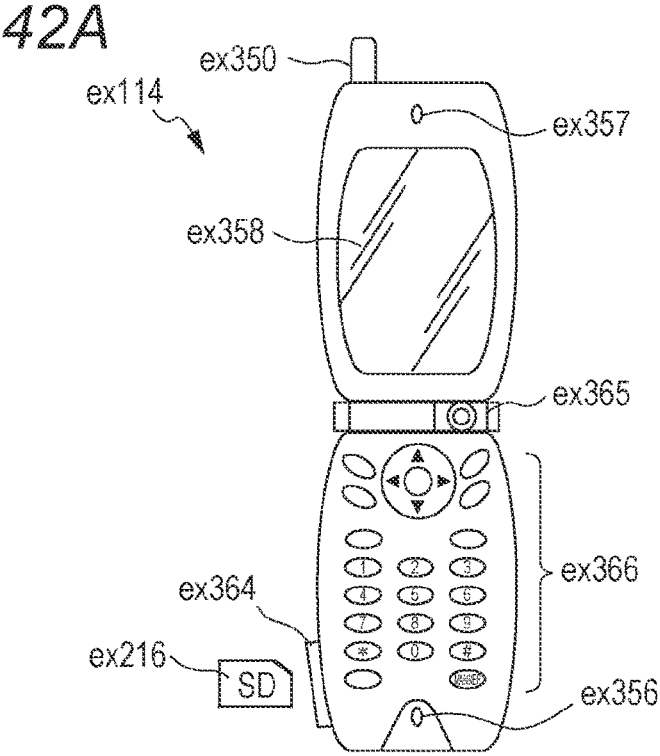
FIG. 42A is a view illustrating an example of a mobile phone.

FIG. 42A is a view illustrating mobile phone ex114 that employs the video decoding method and the video coding method described in the above exemplary embodiments. Mobile phone ex114 includes antenna ex350 that transmits and receives a radio wave to and from base station ex110; camera unit ex365 capable of capturing video and still images; and display unit ex358, such as a liquid crystal display, that displays the video captured by camera unit ex365 and data obtained by decoding video or the like received with antenna ex350. Mobile phone ex114 further includes a body including operation key unit ex366; audio output unit ex357 such as a speaker for outputting audio; audio input unit ex356 such as a microphone for inputting audio; memory unit ex367 that stores coded data or decoded data of captured video, captured still images, recorded audio, received video, received still images, or received emails; and slot unit ex364 which is an interface to a recording medium which similarly stores data thereon.

Figure 42B:
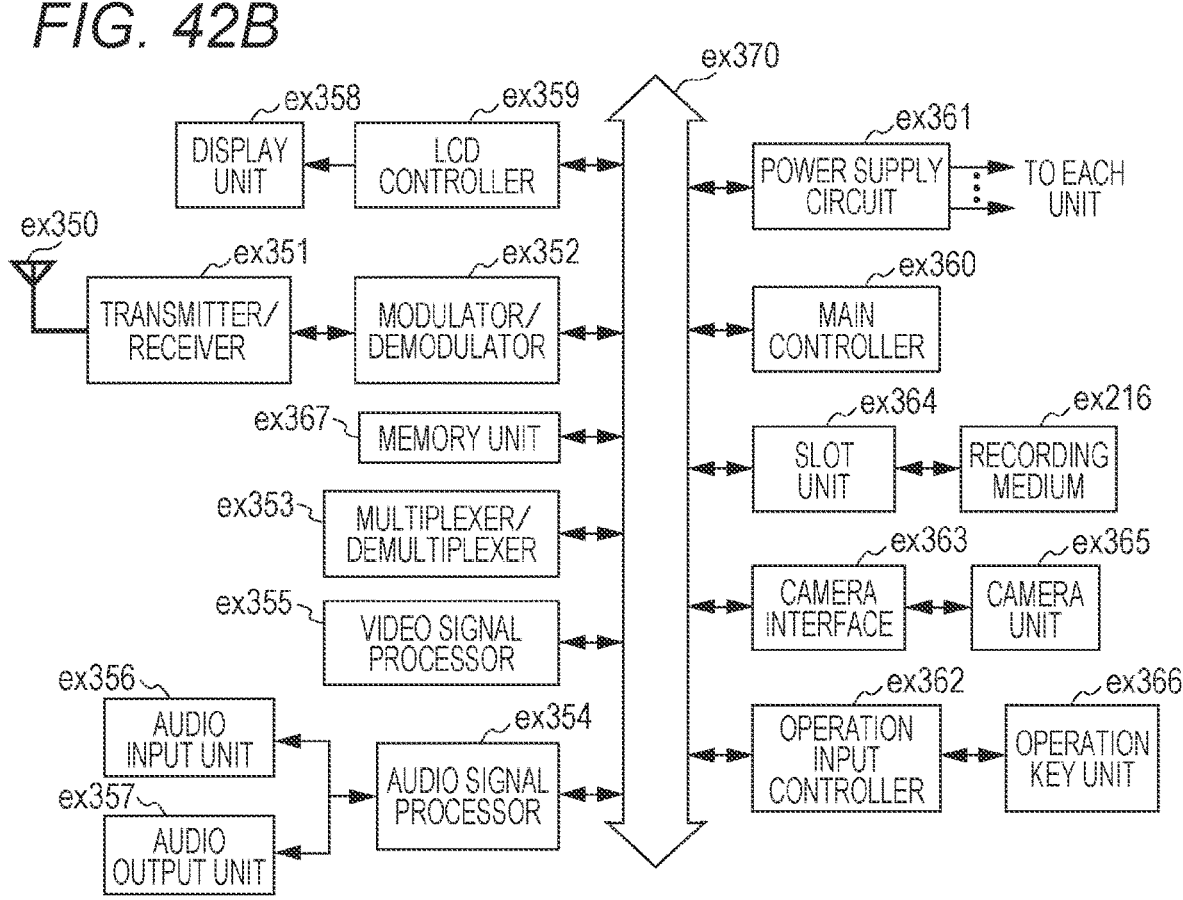
FIG. 42B is a block diagram illustrating a configuration example of the mobile phone.

A configuration example of mobile phone ex114 will be described with reference to FIG. 42B. Mobile phone ex114 includes main controller ex360 that controls individual units of the body which includes display unit ex358 and operation key unit ex366 in an integrated manner. Mobile phone ex114 also includes power supply circuit unit ex361, operation input controller ex362, video signal processor ex355, camera interface unit ex363, LCD (Liquid Crystal Display) controller ex359, modulator/demodulator ex352, multiplexer/demultiplexer ex353, audio signal processor ex354, slot unit ex364, and memory unit ex367 which are connected to main controller ex360 through bus ex370.

When an on-hook/power key is turned on through a user operation, power supply circuit unit ex361 supplies electric power to individual units from a battery pack to activate mobile phone ex114 into an operable state.

In mobile phone ex114, in a voice call mode, audio signal processor ex354 converts an audio signal obtained by audio input unit ex356 into a digital audio signal, modulator/demodulator ex352 performs spread spectrum processing on this digital audio signal, and transmitter/receiver ex351 performs digital-to-analog conversion processing and frequency conversion processing on this signal and then transmits the resulting signal through antenna ex350 in accordance with control performed by main controller ex360 which includes a CPU, a ROM, and a RAM.

Also, in mobile phone ex114, in the voice call mode, transmitter/receiver ex351 amplifies reception data received through antenna ex350 and performs frequency conversion processing and analog-to-digital conversion processing, modulator/demodulator ex352 performs spread spectrum processing on the resulting signal, audio signal processor ex354 converts the resulting signal into an analog audio signal. The analog audio signal is then output from audio output unit ex357.

In the case where an email is transmitted in a data communication mode, text data of the email input through operation of operation key unit ex366 of the body or the like is sent to main controller ex360 through operation input controller ex362. Main controller ex360 performs control such that modulator/demodulator ex352 performs spread spectrum processing on the text data and transmitter/receiver ex351 performs digital-to-analog conversion processing and frequency conversion processing on the text data and then transmits the resulting text data to base station ex110 through antenna ex350. In the case of receiving an email, substantially the opposite processing is performed on the received data, and the resulting text data is output to display unit ex358.

In the case where video, a still image, or a combination of video and audio are transmitted in the data communication mode, video signal processor ex355 compresses and codes a video signal supplied from camera unit ex365 using the video coding method described in each of the above exemplary embodiments (that is, video signal processor ex355 functions as the image coding apparatus according to one aspect of the present disclosure), and sends the coded video data to multiplexer/demultiplexer ex353. Also, audio signal processor ex354 codes an audio signal obtained by audio input unit ex356 while the video, still image, or the like is being captured by camera unit ex365, and sends the coded audio data to multiplexer/demultiplexer ex353.

Multiplexer/demultiplexer ex353 multiplexes the coded video data supplied from video signal processor ex355 and the coded audio data supplied from audio signal processor ex354 in accordance with a certain scheme. Modulator/demodulator (modulation/demodulation circuit unit) ex352 performs spread spectrum processing on the resulting multiplexed data. Transmitter/receiver ex351 performs digital-to-analog conversion processing and frequency conversion processing on the multiplexed data, and then transmits the resulting data through antenna ex350.

In the case that data of a video file linked to a website or the like is received in the data communication mode, multiplexer/demultiplexer ex353 demultiplexes multiplexed data into a bitstream of video data and a bitstream of audio data in order to decode the multiplexed data received through antenna ex350. Multiplexer/demultiplexer ex353 supplies the coded video data to video signal processor ex355 and the coded audio data to audio signal processor ex354 through synchronization bus ex370. Video signal processor ex355 performs decoding using a video decoding method corresponding to the video coding method described in each of the above exemplary embodiments to decode the video signal (that is, video signal processor ex355 functions as the image decoding apparatus according to one aspect of the present disclosure). Then, for example, video or still image included in the video file linked to the website is displayed on display unit ex358 through LCD controller ex359. Audio signal processor ex354 decodes the audio signal, and the resulting audio is output by audio output unit ex357.

Like television ex300, three implementation forms, that is, a transmission/reception terminal including both an encoder and a decoder, a transmission terminal only including an encoder, and a reception terminal only including a decoder, are conceivable for a terminal such as mobile phone ex114. Further, the case has been described in which multiplexed data in which video data, audio data, and so forth are multiplexed is received and transmitted in digital broadcasting system ex200; however, the multiplexed data may be data in which text data related to the video is multiplexed other than audio data or video data alone may be used instead of the multiplexed data.

As described above, the video coding method or video decoding method described in each of the above exemplary embodiments is applicable to any of the aforementioned devices and systems. In such a way, advantages described in each of the above exemplary embodiments can be obtained.

Also, the present disclosure is not limited to the exemplary embodiments above, and various modifications and corrections can be made without departing from the scope of the present disclosure.

Fifth Exemplary Embodiment

Video data can also be generated by switching between the video coding method or apparatus described in each of the above exemplary embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above exemplary embodiments will be described below. Multiplexed data is a digital stream in the MPEG-2 transport stream format.

FIG. 43 is a view illustrating a structure of multiplexed data. As illustrated in FIG. 43, the multiplexed data is obtained by multiplexing at least one of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above exemplary embodiments and using the video coding method or apparatus pursuant to existing standards such as MPEG-2, MPEG-4 AVC, and VC-1. The audio stream is coded using standards such as Dolby AC-3 (Audio Code number 3), Dolby Digital Plus, MLP (Meridian Lossless Packing), DTS (Digital Theater Systems), DTS-HD, and linear PCM (Pulse Code Modulation).

Each stream included in multiplexed data is identified by a PID (Packet Identifier). For example, 0x1011 is assigned to a video stream to be used as video of a movie. Any one of 0x1100 to 0x111F is assigned to an audio stream. Any one of 0x1200 to 0x121F is assigned to a presentation graphics stream. Any one of 0x1400 to 0x141F is assigned to an interactive graphics stream. Any one of 0x1B00 to 0x1B1F is assigned to a video stream to be used as sub video of the movie. Any one of 0x1A00 to 0x1A1F is assigned to an audio stream to be used as sub audio to be mixed with main audio.

Figure 44:
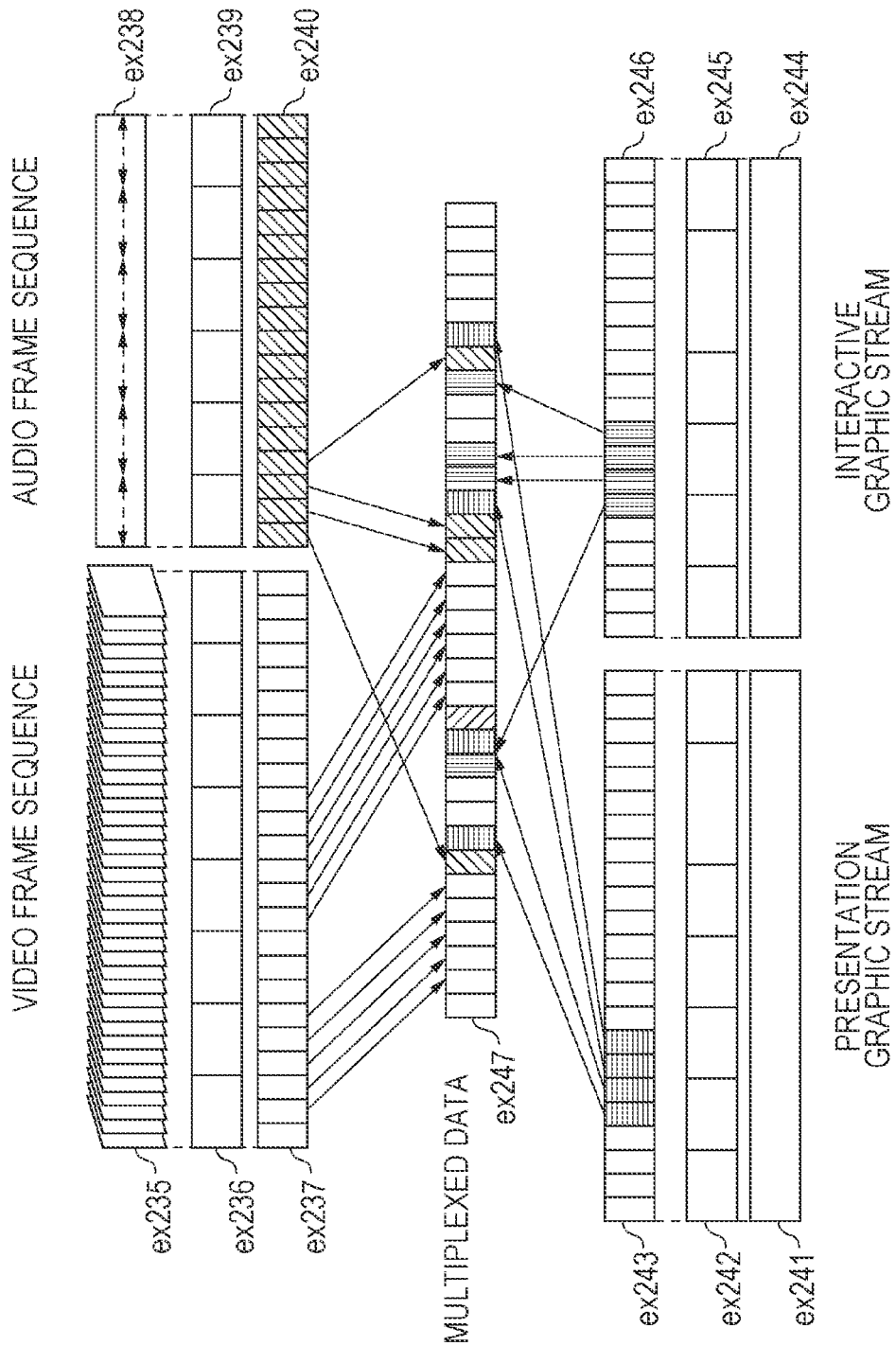
FIG. 44 is a schematic diagram illustrating how to multiplex each stream in the multiplexed data.

FIG. 44 is a view schematically illustrating how individual streams are multiplexed into multiplexed data. Video stream ex235 made up of a plurality of video frames and audio stream ex238 made up of a plurality of audio frames are converted into PES (Packetized Elementary Stream) packet sequences ex236 and ex239, and then into TS (Transport Stream) packets ex237 and ex240, respectively.

Likewise, data of presentation graphics stream ex241 and data of interactive graphics stream ex244 are converted into PES packet sequences ex242 and ex245, and further into TS packets ex243 and ex246, respectively. Multiplexed data ex247 is formed by multiplexing these TS packets into one stream.

Figure 45:
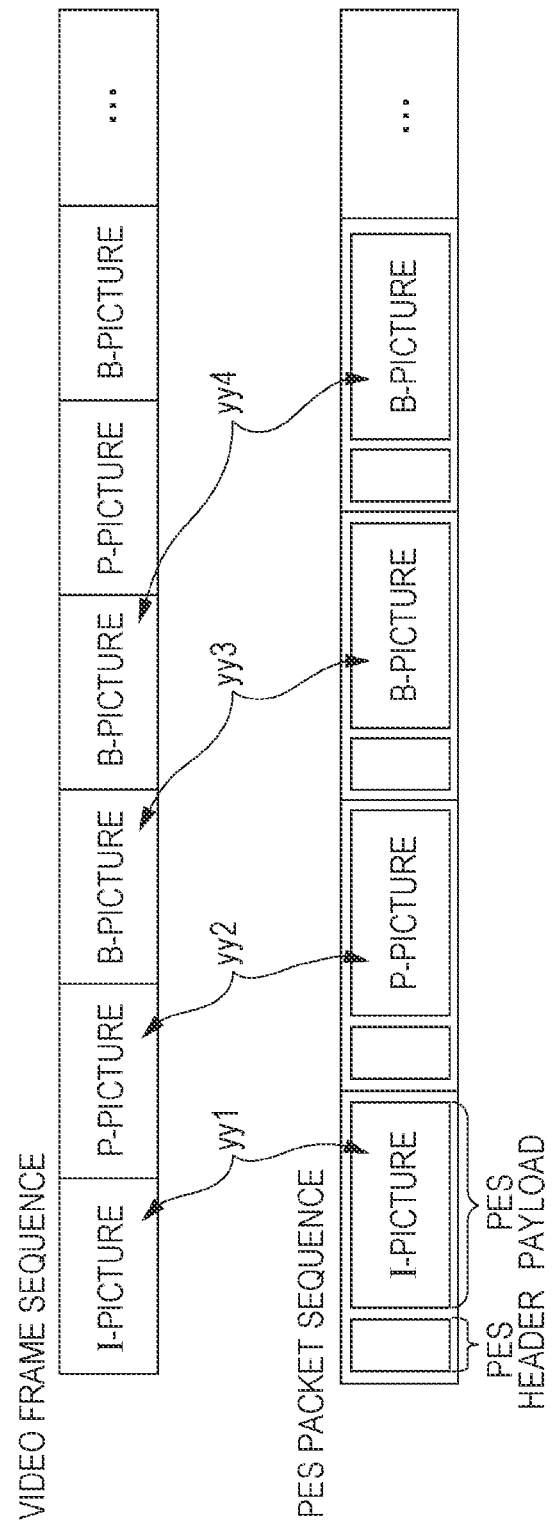
FIG. 45 is a view illustrating how to store a video stream in a PES packet sequence in more detailed.

FIG. 45 illustrates how a video stream is stored in a PES packet sequence in detail. The upper row in FIG. 46 illustrates a video frame sequence of the video stream. The lower row illustrates a PES packet sequence. As denoted by arrows yy1, yy2, yy3, and yy4 in FIG. 45, I-pictures, B-pictures, and P-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

FIG. 46 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 46, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 47:
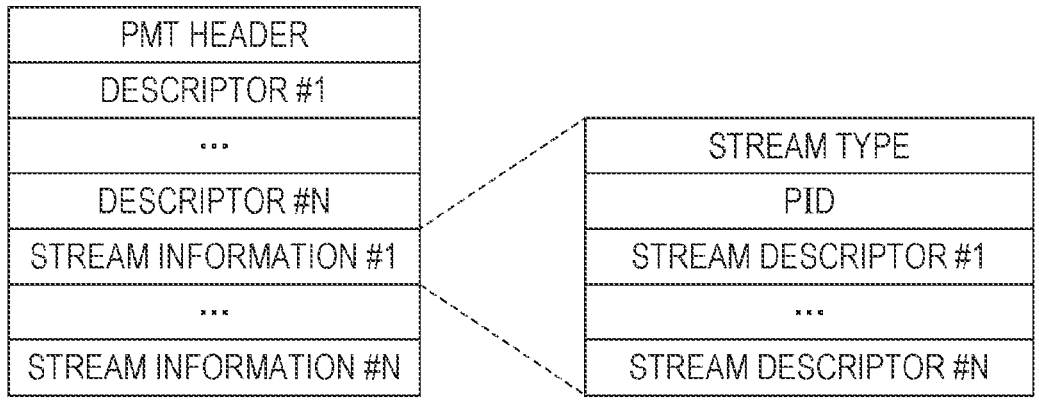
FIG. 47 is a view illustrating a data configuration of a PMT.

FIG. 47 is a view illustrating the detailed data structure of the PMT. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 48:
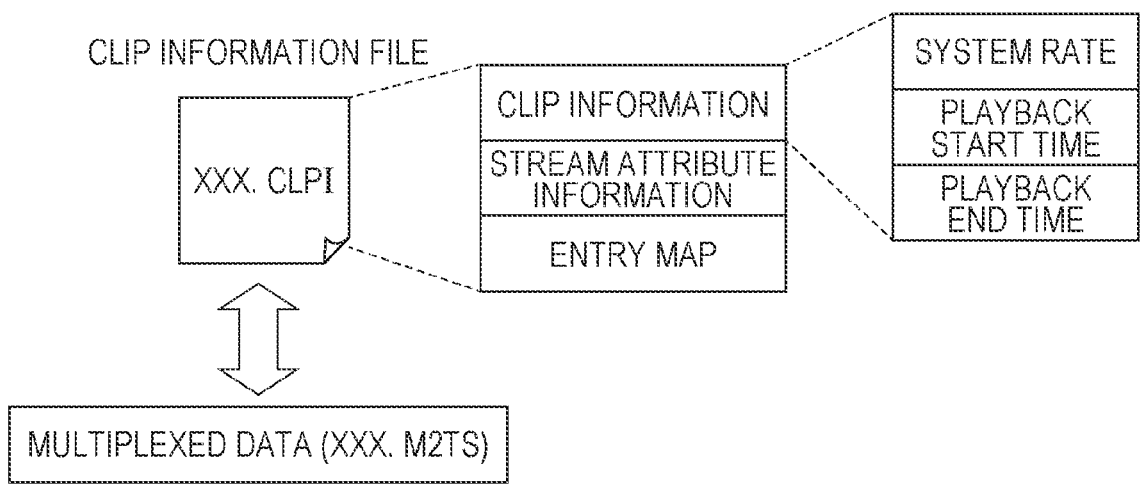
FIG. 48 is a view illustrating an internal configuration of multiplexed data information.

As illustrated in FIG. 48, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 48. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

For each PID, attribute information of a corresponding stream included in the multiplexed data is registered in the stream attribute information as illustrated in FIG. 49. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information is used in the initialization of the decoder before a player performs the playback.

In the fifth exemplary embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above exemplary embodiments includes a step or unit for setting unique information which indicates whether the video data has been generated by the video coding method or apparatus described in each of the above exemplary embodiments, in the stream type contained in the PMT or the video stream attribute information. Therefore, the video data generated using the video coding method or apparatus described in each of the above exemplary embodiments and video data based on another standard can be distinguished from each other.

FIG. 50 illustrates steps included in a video decoding method of the fifth exemplary embodiment. In Step exS100, the stream type contained in the PMT or the video stream attribute information contained in the multiplexed data information is obtained from the multiplexed data. Then, in Step exS101, it is determined whether or not the stream type or the video stream attribute information indicates that the multiplexed data is data that is generated by the video coding method or apparatus described in each of the above exemplary embodiments. When it is determined from the stream type or the video stream attribute information that the multiplexed data is generated by the video coding method or apparatus described in each of the above exemplary embodiments, the decoding is performed by the video decoding method described in each of the above exemplary embodiments in Step exS102. When the stream type or the video stream attribute information indicates that the multiplexed data is pursuant to existing standards such as MPEG-2, MPEG-4 AVC, and VC-1, the decoding is performed by the video decoding method pursuant to the existing standard in Step exS103.

By setting a new unique value in the stream type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the fifth exemplary embodiment is applicable to any of the aforementioned devices and systems.

Sixth Exemplary Embodiment

Figure 51:
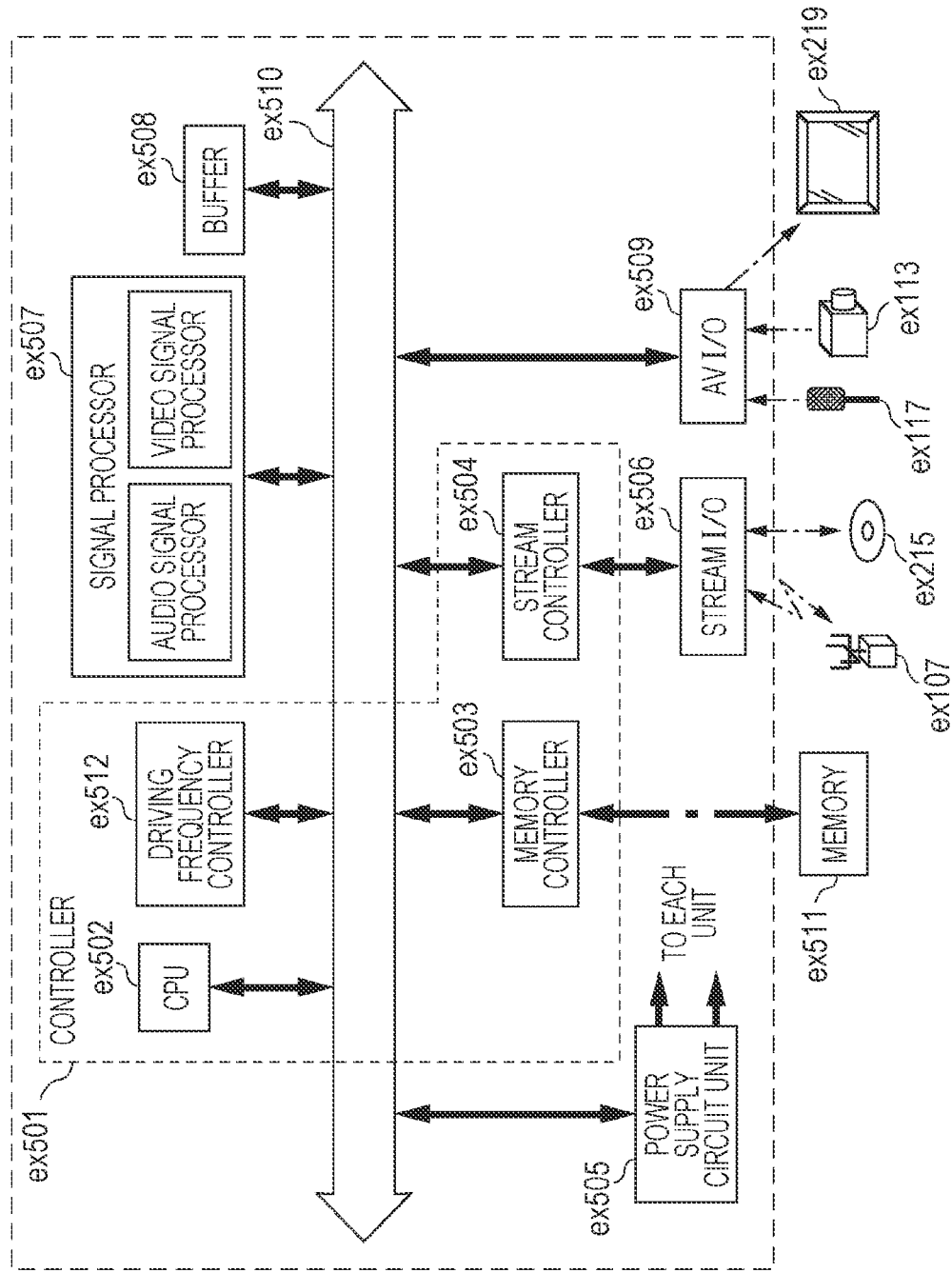
FIG. 51 is a block diagram illustrating a configuration example of an integrated circuit that implements a video coding method and a video decoding method according to each of the exemplary embodiments.

The video coding method and apparatus and the video decoding method and apparatus described in each of the above exemplary embodiments are typically implemented using an LSI which is an integrated circuit. FIG. 51 illustrates an example of a configuration of LSI ex500 that is formed as one chip. LSI ex500 includes controller ex601, CPU ex502, memory controller ex503, stream controller ex504, power supply circuit unit ex505, stream input/output (I/O) ex506, signal processor ex507, buffer ex508, and audio/video (AV) I/O ex509, which are connected to one another through bus ex510. Upon power-on, power supply circuit unit ex505 supplies electric power to the individual units to activate the individual units into an operable state.

For example, in the case of performing a coding process, LSI ex500 receives an AV signal from microphone ex117, camera ex113, or the like through AV I/O ex509 in accordance with control performed by controller ex501 which includes CPU ex502, memory controller ex503, stream controller ex504, and driving frequency controller ex512. The input AV signal is temporarily stored in external memory ex511, such as an SDRAM (Synchronous Dynamic Random Access Memory). In accordance with control performed by controller ex501, the stored data is divided into a plurality of portions in accordance with a quantity of processing or a processing speed, and the plurality of portions are sent to signal processor ex507. Then, signal processor ex507 codes the audio signal and/or the video signal. The coding process performed on the video signal here is the coding process described in each of the above exemplary embodiments. Signal processor ex507 performs processing such as multiplexing of the coded audio data and the coded video data depending on circumstances, and outputs the multiplexed data to outside through stream I/O ex506. This output multiplexed data is transmitted to base station ex107 or written to recording medium ex215. Note that the audio data and the video data may be temporarily stored in buffer ex508 at the time of multiplexing so that these pieces of data are synchronized with each other.

Although memory ex511 has been described as a device provided outside LSI ex500 above, memory ex511 may be included in LSI ex500. The number of buffers ex508 is not limited to one, but a plurality of buffers may be provided. LSI ex500 may be formed in one chip or a plurality of chips.

Although controller ex501 includes CPU ex502, memory controller ex503, stream controller ex504, and driving frequency controller ex512, the configuration of controller ex501 is not limited to this one. For example, signal processor ex507 may further include a CPU. A CPU is also provided in signal processor ex507, which allows the processing speed to be further enhanced. Alternatively, CPU ex502 may include signal processor ex507 or, for example, an audio signal processor which is part of signal processor ex507. In such a case, controller ex501 includes CPU ex502 which includes signal processor ex507 or part of signal processor ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used. Such a programmable logic device can execute the video coding method or the video decoding method described in each of the above exemplary embodiments typically by loading or reading from a memory or the like a program constituting software or firmware.

When an advance in the semiconductor technology or another related technology yields a circuit integration technology that may substitute for LSI, the functional blocks may be integrated using such a technology obviously. Adaptation of the biotechnology may be possible.

Seventh Exemplary Embodiment

It is considered that a quantity of processing increases in the case of decoding video data generated using the video coding method or apparatus described in each of the above exemplary embodiments, compared with the case of decoding video data pursuant to existing standards such as MPEG-2, MPEG-4 AVC, and VC-1. Accordingly, in LSI ex500, a higher driving frequency needs to be set in CPU ex502 than that used when video data based on an existing standard is decoded. However, making the driving frequency higher undesirably increases power consumption.

Figure 52:
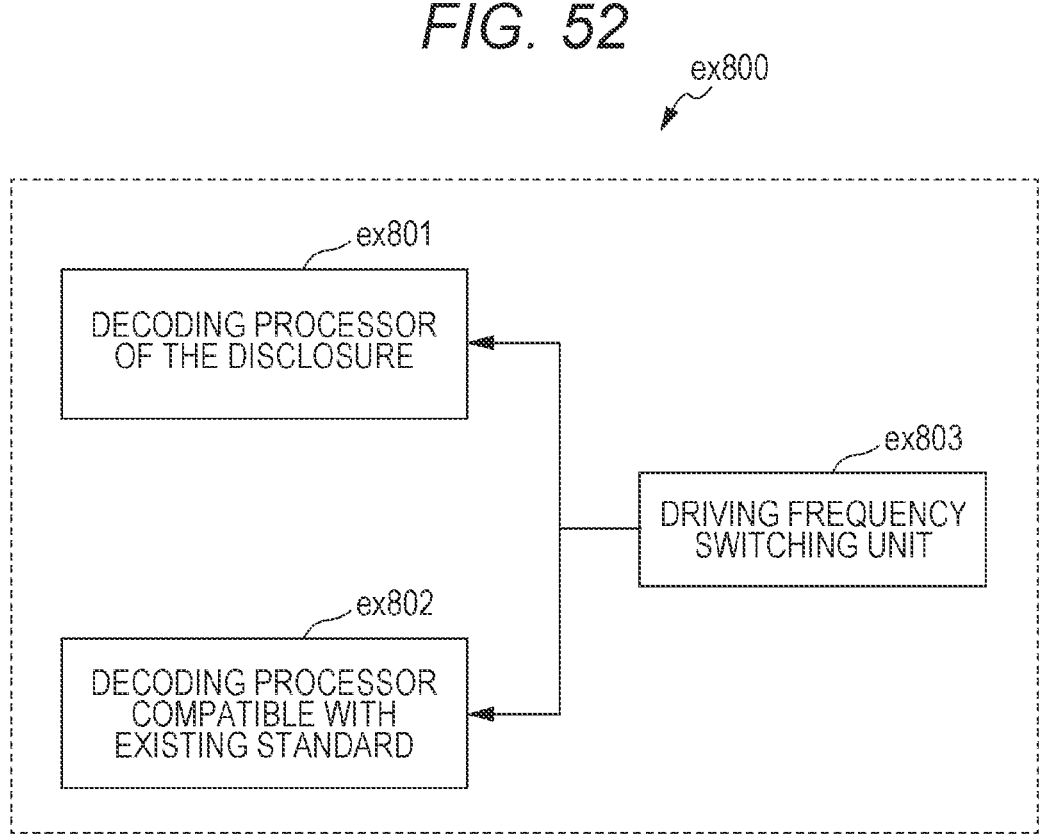
FIG. 52 is a view illustrating a configuration that switches a driving frequency.

To address this issue, the video decoding apparatus, such as television ex300 or LSI ex500, is configured to identify a standard which video data is based on, and to switch between the driving frequencies in accordance with the standard. FIG. 52 illustrates configuration ex800 according to a seventh exemplary embodiment. Driving frequency switching unit ex803 sets the driving frequency high in the case where video data is data that has been generated using the video coding method or apparatus described in each of the above exemplary embodiments. Driving frequency switching unit ex803 also instructs decoding processor ex801 which executes the video decoding method described in each of the above exemplary embodiments to decode the video data. On the other hand, in the case where the video data is data based on an existing standard, driving frequency switching unit ex803 sets the driving frequency lower than that of the case where the video data is data that is generated by the video coding method or apparatus described in each of the above exemplary embodiments. Then, driving frequency switching unit ex803 instructs decoding processor ex802 pursuant to the existing standard to decode the video data.

More specifically, driving frequency switching unit ex803 includes CPU ex502 and driving frequency controller ex512 illustrated in FIG. 51. Decoding processor ex801 that executes the video decoding method described in each of the above exemplary embodiments and decoding processor ex802 pursuant to an existing standard correspond to signal processor ex507 illustrated in FIG. 51. CPU ex502 identifies which standard the video data is pursuant to. Based on a signal from CPU ex502, driving frequency controller ex512 sets the driving frequency. Also, based on a signal from CPU ex502, signal processor ex507 decodes the video data. At this point, for example, it is conceivable that the use of the identification information described in the fifth exemplary embodiment in identification of the video data is conceivable. The identification information is not limited to the one described in the fifth exemplary embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. For example, it is also conceivable to select the driving frequency of CPU ex502 in accordance with a lookup table in which the standard for the video data and the driving frequency are associated with each other as illustrated in FIG. 54. The lookup table is stored in buffer ex508 or an internal memory of LSI ex500, and CPU ex502 refers to this lookup table, so that the driving frequency can be selected.

Figure 53:
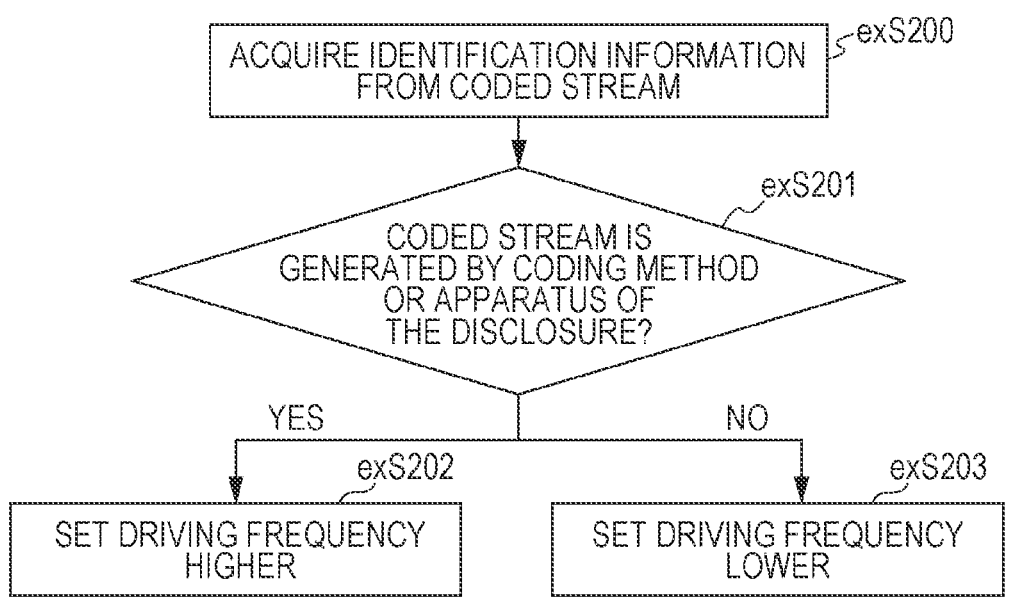
FIG. 53 is a view illustrating steps of identifying the video data to switch the driving frequency.

FIG. 53 illustrates steps of performing the method of the seventh exemplary embodiment. In Step exS200, signal processor ex507 obtains identification information from multiplexed data. In Step exS201, based on the identification information, CPU ex502 identifies whether or not video data is video data that has been generated using the video coding method or apparatus described in each of the above exemplary embodiments. If the video data is video data that has been generated using the video coding method or apparatus described in each of the above exemplary embodiments, CPU ex502 sends a signal for setting a high driving frequency to driving frequency controller ex512 in Step exS202. Then, driving frequency controller ex512 sets a high driving frequency. On the other hand, if the identification information indicates that the video data is video data pursuant to existing standards such as MPEG-2, MPEG-4 AVC, and VC-1, CPU ex502 sends a signal for setting a low driving frequency to driving frequency controller ex512 in Step exS203. Then, driving frequency controller ex512 sets a lower driving frequency than that used when the video data is video data that has been generated using the video coding method or apparatus described in each of the above exemplary embodiments.

Further, by changing a voltage supplied to LSI ex500 or an apparatus including II ex500 in conjunction with switching of the driving frequency, the power-saving effect can be further increased. For example, it is conceivable that in the case where a low driving frequency is set, a voltage supplied to LSI ex500 or an apparatus including LSI ex500 is set to be lower in response to this setting than that of the case where a high driving frequency is set.

It is sufficient that the driving frequency is set to be higher in the case where a quantity of decoding processing is large and set to be lower in the case where a quantity of decoding processing is small. Accordingly, the driving frequency setting method is not limited to the above-described setting method. For example, in the case that a processing quantity for decoding the video data pursuant to MPEG-4 AVC is larger than a processing quantity for decoding the video data generated by the video coding method or apparatus described in each of the above exemplary embodiments, the settings of the driving frequencies can be made opposite to the settings of the above-described case.

The driving frequency setting method is not limited to a configuration for setting the driving frequency low. For example, in the case where the identification information indicates that the video data is video data that has been generated using the video coding method or apparatus described in each of the above exemplary embodiments, a voltage supplied to LSI ex500 or an apparatus including LSI ex500 may be set to be high. In the case where the identification information indicates that the video data is video data pursuant to existing standards such as MPEG-2, MPEG-4 AVC, and VC-1, a voltage supplied to LSI ex500 or an apparatus including LSI ex500 may be set to be low. Alternatively, in another example, in the case where the identification information indicates that the video data is video data that has been generated using the video coding method or apparatus described in each of the above exemplary embodiments, driving of CPU ex502 is not stopped. In the case where the identification information indicates that the video data is video data pursuant to existing standards such as MPEG-2, MPEG-4 AVC, and VC-1, driving of CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above exemplary embodiments, driving of CPU ex502 may be temporarily stopped. In this case, a period over which CPU ex502 is stopped may be set to be shorter than that of the case where the identification information indicates that the video data is video data pursuant to existing standards such as MPEG-2, MPEG-4 AVC, and VC-1.

By switching between the driving frequencies in accordance with the standard which the video data is based on in this manner, electric power can be saved. Also, in the case where LSI ex500 or an apparatus including LSI ex500 is driven with a battery, the battery can be made last longer as a result of power-saving.

Eighth Exemplary Embodiment

A plurality of pieces of video data based on different standards are sometimes input to the aforementioned devices and systems, such as television ex300 and mobile phone ex114. In order to enable decoding even in the case where a plurality of pieces of video data based on different standards are input, signal processor ex507 of LSI ex500 needs to support the plurality of standards. However, the use of signal processors ex507 for the respective standards undesirably makes the circuit scale of LSI ex500 larger and increases the cost.

To address this issue, a decoding processor that executes the video decoding method described in each of the above exemplary embodiments and a decoding processor pursuant to existing standards such as MPEG-2, MPEG-4 AVC, and VC-1, share some of their components. FIG. 55A illustrates an example of configuration ex900. For example, the video decoding method described in each of the above exemplary embodiments and the video decoding method pursuant to MPEG-4 AVC share some processing contents such as entropy decoding, inverse quantization, deblocking filtering, and motion compensation. Accordingly, the following configuration is conceivable. As to the shared processing contents, decoding processor ex902 pursuant to MPEG-4 AVC is shared. As to other processing contents that are not pursuant to MPEG-4 AVC but unique to an aspect of the present disclosure, dedicated decoding processor ex901 may be used. In particular, an aspect of the present disclosure includes a feature in motion compensation. Thus, for example, dedicated decoding processor ex901 may be used for motion compensation and decoding processor ex902 may be used in common for any of or all of inverse quantization, entropy decoding, and deblocking filtering. Alternatively, as for sharing of the decoding processor, a configuration may be used in which a decoding processor that executes the video decoding method described in each of the above exemplary embodiments is used for the common processing contents and a dedicated decoding processor is used for processing contents unique to MPEG-4 AVC.

FIG. 55B illustrates another example ex1000 that implements sharing of part of processing. In this example, dedicated decoding processor ex1001 that handles processing contents unique to an aspect of the present disclosure, dedicated decoding processor ex1002 that handles processing contents unique to an existing standard, and shared decoding processor ex1003 that handles processing contents that are common to the video decoding method according to the aspect of the present disclosure and the video decoding method according to the existing standard are used. At this point, dedicated decoding processors ex1001 and ex1002 are not necessarily specialized for the processing contents unique to the aspect of the present disclosure and the existing standard, respectively, and may be also capable of executing other general processing. Also, the configuration according to the eighth exemplary embodiment can be implemented using LSI ex500.

By sharing a decoding processor for processing contents that are common to the video decoding method according to an aspect of the present disclosure and the video decoding method according to an existing standard, the circuit scale and cost of LSI ex500 can be reduced.

The present disclosure can be applied to an image processing device, an image capturing device, and an image playback device. Specifically, for example, the present disclosure can be applied to a digital still camera, a digital movie camera, a camera-equipped mobile phone, and a smartphone.

What is claimed is:

1. A decoder, comprising:
a memory; and
a processor coupled to the memory, the processor configured to
obtain first information from a bitstream, the first information being associated with a number of feature points of a current block, the number of the feature points being variable, the feature points being usable in performing an affine prediction;
obtain a flag from the bitstream, the flag indicating a first value or a second value different from the first value;
obtain second information from the bitstream, the second information specifying first points to be used among the feature points, in response to the flag indicating the first value;
determine third information provided for each of the first points based on the second information, the third information indicating a difference between a coordinate value of a first point, which is one of the first points, and a coordinate value of a corresponding second point, the corresponding second point being included in a reference picture; and
generate a prediction image of the current block according to the determined third information,
wherein the processor is configured to refrain from obtaining the second information from the bitstream, in response to the flag indicating the second value.

2. A non-transitory recording medium storing a bitstream, the bitstream including (i) coded data of a current block, (ii) first information being associated with a number of feature points of a current block, the feature points being usable in performing an affine prediction, and (iii) a flag indicating a first value or a second value different from the first value, and the bitstream causing a processor to perform decoding operations, comprising:
obtaining the first information from the bitstream;
obtaining the flag from the bitstream;
obtaining second information from the bitstream, the second information specifying first points to be used among the feature points, in response to the flag indicating the first value;
determining third information provided for each of the first points based on the second information, the third information indicating a difference between a coordinate value of a first point, which is one of the first points, and a coordinate value of a corresponding second point, the corresponding second point being included in a reference picture; and
generating a prediction image of the current block according to the determined third information,
wherein the processor is configured to refrain from obtaining the second information from the bitstream, in response to the flag indicating the second value.

3. An encoder, comprising:
a memory; and
a processor coupled to the memory, the processor configured to
determine first information being associated with a number of feature points of a current block, the feature points being usable in performing an affine prediction;
determine a flag indicating a first value or a second value different from the first value;
determine second information specifying first points to be used among the feature points, in response to the flag indicating the first value;
determine third information provided for each of the first points based on the second information, the third information indicating a difference between a coordinate value of a first point, which is one of the first points, and a coordinate value of a corresponding second point, the corresponding second point being included in a reference picture; and
generate a prediction image of the current block according to the determined third information,
wherein the processor is configured to refrain from obtaining the second information from the bitstream, in response to the flag indicating the second value, and
wherein the bitstream includes coded data of the current block, the first information, and the flag.

4. A decoder, comprising:
a memory; and
a processor coupled to the memory, the processor configured to
obtain first information from a bitstream, the first information being associated with a number of feature points of a current block, the feature points being usable in performing an affine prediction;
obtain a flag from the bitstream, the flag indicating a first value or a second value different from the first value,
obtain second information from the bitstream, the second information specifying first points to be used among the feature points, in response to the flag indicating the first value,
determine third information provided for each of the first points based on the second information, the third information indicating a difference between a coordinate value of a first point, which is one of the first points, and a coordinate value of a corresponding second point, the corresponding second point being included in a reference picture; and
generate a prediction image of the current block by performing an affine prediction according to the determined third information,
wherein the processor is configured to refrain from obtaining the second information from the bitstream, in response to the flag indicating the second value.

* * * * *